(12) United States Patent
Chen et al.

(10) Patent No.: US 12,687,698 B2
(45) Date of Patent: Jul. 21, 2026

(54) OPTICAL IMAGING LENS ASSEMBLY, IMAGE CAPTURING UNIT AND ELECTRONIC DEVICE

(71) Applicant: LARGAN PRECISION CO., LTD., Taichung City (TW)

(72) Inventors: Po-Wei Chen, Taichung City (TW); Chun-Yen Chen, Taichung City (TW); Cheng-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 359 days.

(21) Appl. No.: 18/380,978

(22) Filed: Oct. 17, 2023

(65) Prior Publication Data

US 2025/0067960 A1     Feb. 27, 2025

(30) Foreign Application Priority Data

Aug. 25, 2023     (TW) .................................. 112131996

(51) Int. Cl.
| | |
|---|---|
| *G02B 13/00* | (2006.01) |
| *G02B 9/64* | (2006.01) |
| *H04N 23/55* | (2023.01) |

(52) U.S. Cl.
CPC ........... *G02B 13/0045* (2013.01); *G02B 9/64* (2013.01); *H04N 23/55* (2023.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 4,948,238 A | 8/1990 | Araki et al. | |
| 5,547,457 A | 8/1996 | Tsuyuki et al. | |
| 10,564,395 B2 | 2/2020 | Jia et al. | |
| 10,996,444 B2 | 5/2021 | Yang et al. | |

(Continued)

FOREIGN PATENT DOCUMENTS

| | | |
|---|---|---|
| CN | 111025570 A | 4/2020 |
| CN | 111474689 A | 7/2020 |

(Continued)

OTHER PUBLICATIONS

EP Office Action dated Aug. 12, 2024 in application 23206631.6.

*Primary Examiner* — Ricky L Mack
*Assistant Examiner* — Natasha Nigam
(74) *Attorney, Agent, or Firm* — Maschoff Brennan

(57) ABSTRACT

An optical imaging lens assembly includes seven lens elements which are, in order from an object side to an image side along an optical path: a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The second lens element has negative refractive power. The object-side surface of the third lens element is concave in a paraxial region thereof. The fourth lens element has positive refractive power. The image-side surface of the fifth lens element is concave in a paraxial region thereof. The sixth lens element has positive refractive power, and the image-side surface of the sixth lens element is convex in a paraxial region thereof.

29 Claims, 36 Drawing Sheets

(56)     References Cited

U.S. PATENT DOCUMENTS

| | | | |
|---|---|---|---|
| 11,561,376 B2 | 1/2023 | Wang et al. | |
| 2017/0254985 A1 | 9/2017 | Lai et al. | |
| 2017/0254986 A1 | 9/2017 | Lai et al. | |
| 2019/0187443 A1 | 6/2019 | Jia et al. | |
| 2019/0324232 A1* | 10/2019 | Yang ........................ | G02B 9/64 |
| 2020/0285135 A1 | 9/2020 | Sun | |
| 2021/0181486 A1* | 6/2021 | Yeh .................... | G02B 13/0045 |
| 2021/0364744 A1* | 11/2021 | Wang ..................... | G02B 13/18 |
| 2023/0083945 A1 | 3/2023 | Lai et al. | |
| 2024/0219686 A1 | 7/2024 | Chen et al. | |

FOREIGN PATENT DOCUMENTS

| | | | |
|---|---|---|---|
| CN | 111580252 A | | 8/2020 |
| CN | 112198626 A | | 1/2021 |
| CN | 213987004 U | * | 8/2021 |
| CN | 114236779 A | | 3/2022 |
| CN | 217443632 U | | 9/2022 |
| CN | 116256874 A | | 6/2023 |
| JP | H06-222263 A | | 8/1994 |
| JP | 2015-025951 A | | 2/2015 |
| TW | 202034009 A | | 9/2020 |
| TW | 202144853 A | | 12/2021 |
| WO | 2018/010433 A1 | | 1/2018 |
| WO | 2021/128149 A1 | | 7/2021 |

* cited by examiner

100

101

102

103

104

701

701

701

701

OPTICAL IMAGING LENS ASSEMBLY, IMAGE CAPTURING UNIT AND ELECTRONIC DEVICE

RELATED APPLICATIONS

This application claims priority to Taiwan Application 112131996, filed on Aug. 25, 2023, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the second lens element has negative refractive power. Preferably, the object-side surface of the third lens element is concave in a paraxial region thereof. Preferably, the fourth lens element has positive refractive power. Preferably, the image-side surface of the fifth lens element is concave in a paraxial region thereof. Preferably, the sixth lens element has positive refractive power. Preferably, the image-side surface of the sixth lens element is convex in a paraxial region thereof.

When an axial distance between the third lens element and the fourth lens element is T34, an axial distance between the fourth lens element and the fifth lens element is T45, a curvature radius of the object-side surface of the first lens element is R1, a curvature radius of the object-side surface of the third lens element is R5, an Abbe number of the seventh lens element is V7, and half of a maximum field of view of the optical imaging lens assembly is HFOV, the following conditions are preferably satisfied:

$$0<T34/T45<0.50;$$

$$0<(R1+R5)/(R1-R5)<10.00;$$

$$5.0<V7<50.0; \text{ and}$$

$$0<1/|\tan (HFOV)|<0.500.$$

According to another aspect of the present disclosure, an optical imaging lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the first lens element has negative refractive power. Preferably, the second lens element has negative refractive power. Preferably, the object-side surface of the third lens element is concave in a paraxial region thereof. Preferably, the fourth lens element has positive refractive power. Preferably, the image-side surface of the fifth lens element is concave in a paraxial region thereof. Preferably, the sixth lens element has positive refractive power.

When an axial distance between the third lens element and the fourth lens element is T34, an axial distance between the fourth lens element and the fifth lens element is T45, a focal length of the fifth lens element is f5, a focal length of the sixth lens element is f6, a central thickness of the first lens element is CT1, a central thickness of the seventh lens element is CT7, a curvature radius of the object-side surface of the fourth lens element is R7, and a curvature radius of the object-side surface of the seventh lens element is R13, the following conditions are preferably satisfied:

$$0<T34/T45<0.50;$$

$$0.08<|f6/f5|<0.90;$$

$$1.50<CT1/CT7<10.00; \text{ and}$$

$$-5.00<(R7+R13)/(R7-R13)<0.80.$$

According to another aspect of the present disclosure, an optical imaging lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the first lens element has negative refractive power. Preferably, the second lens element has negative refractive power. Preferably, the object-side surface of the third lens element is concave in a paraxial region thereof. Preferably, the sixth lens element has positive refractive power. Preferably, the image-side surface of the sixth lens element is convex in a paraxial region thereof.

When an axial distance between the second lens element and the third lens element is T23, an axial distance between the third lens element and the fourth lens element is T34, an axial distance between the fourth lens element and the fifth lens element is T45, a central thickness of the third lens element is CT3, an Abbe number of the seventh lens element is V7, a curvature radius of the object-side surface of the third lens element is R5, and a curvature radius of the image-side surface of the fifth lens element is R10, the following conditions are preferably satisfied:

$$0<T34/T45<0.50;$$

$$0<CT3/T23<1.00;$$

$$5.0<V7<50.0; \text{ and}$$

$$0.10<|R5/R10|<5.00.$$

According to another aspect of the present disclosure, an image capturing unit includes one of the aforementioned optical imaging lens assemblies and an image sensor, wherein the image sensor is disposed on an image surface of the optical imaging lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

4

Figure 18:
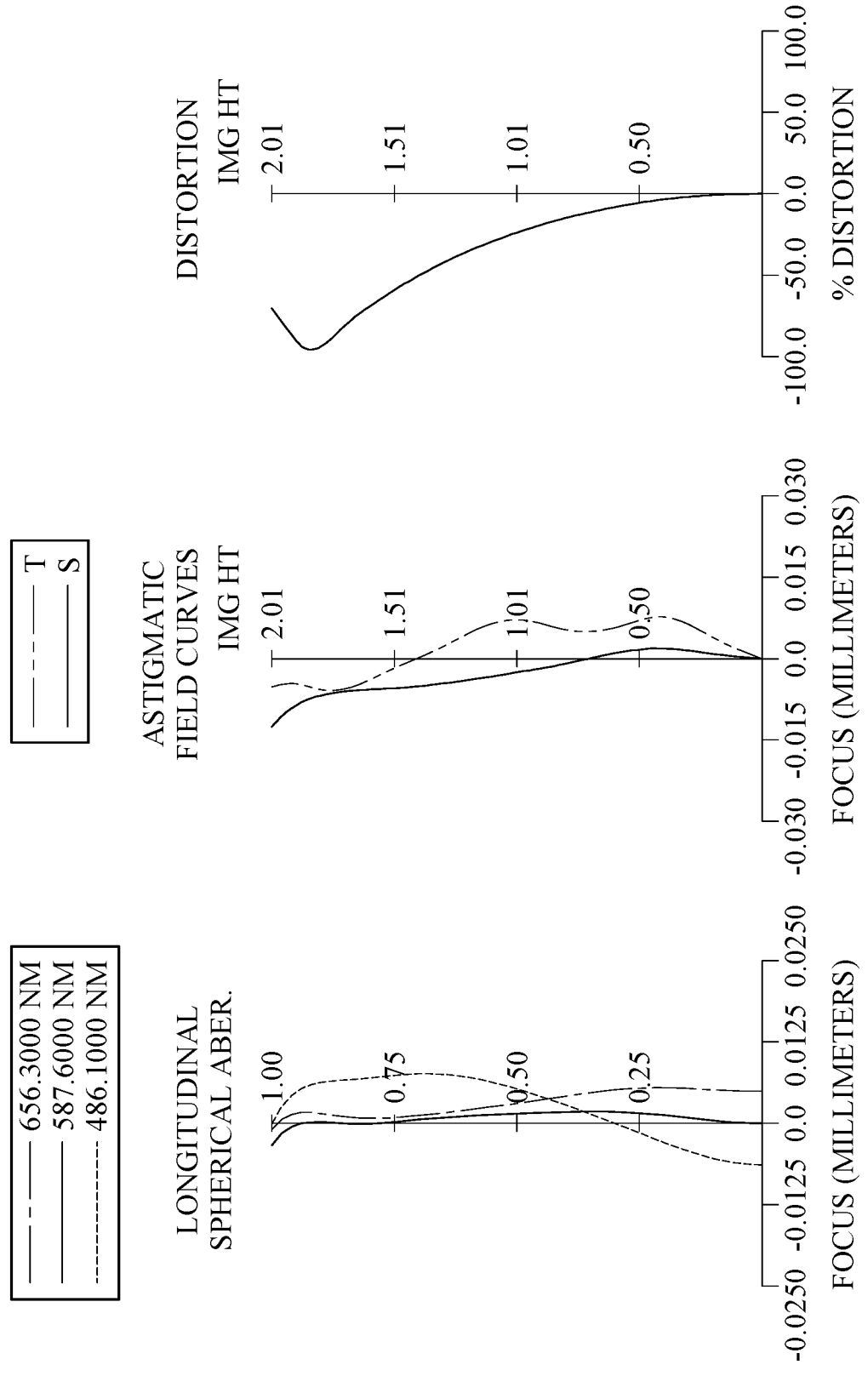
Figure 19:
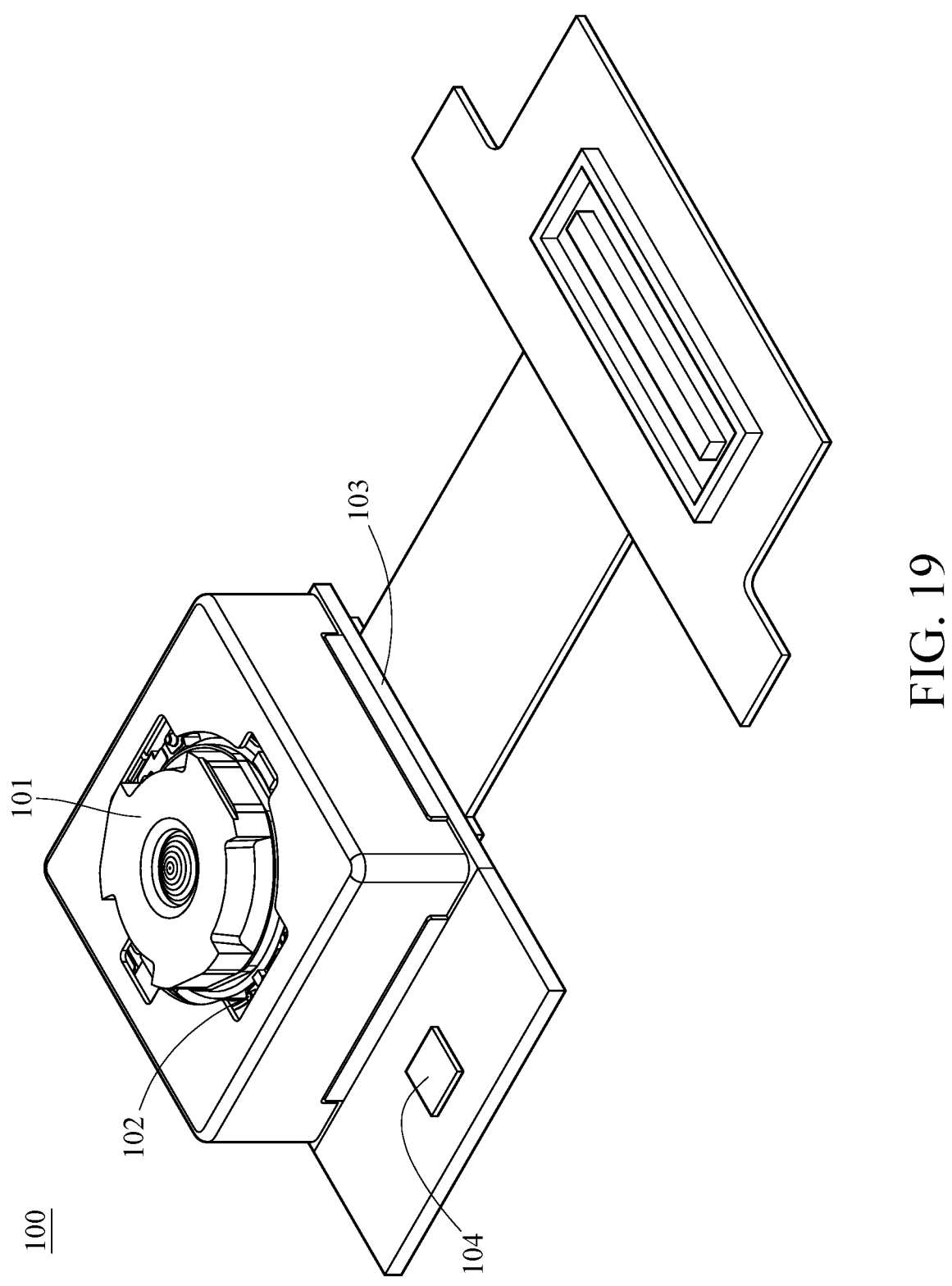
Figure 20:
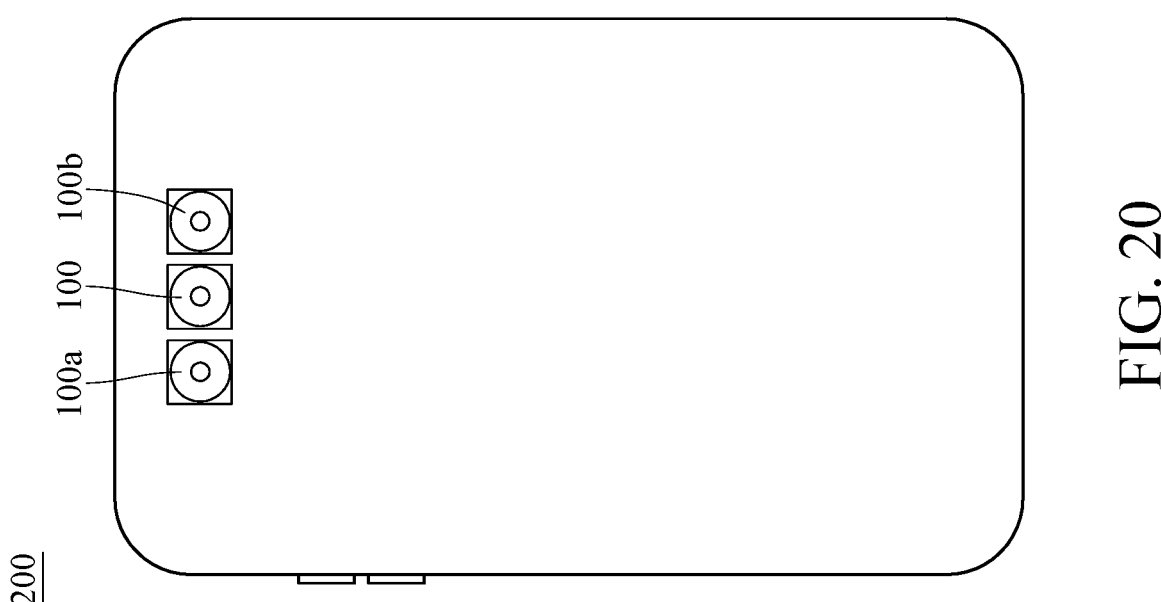
Figure 21:
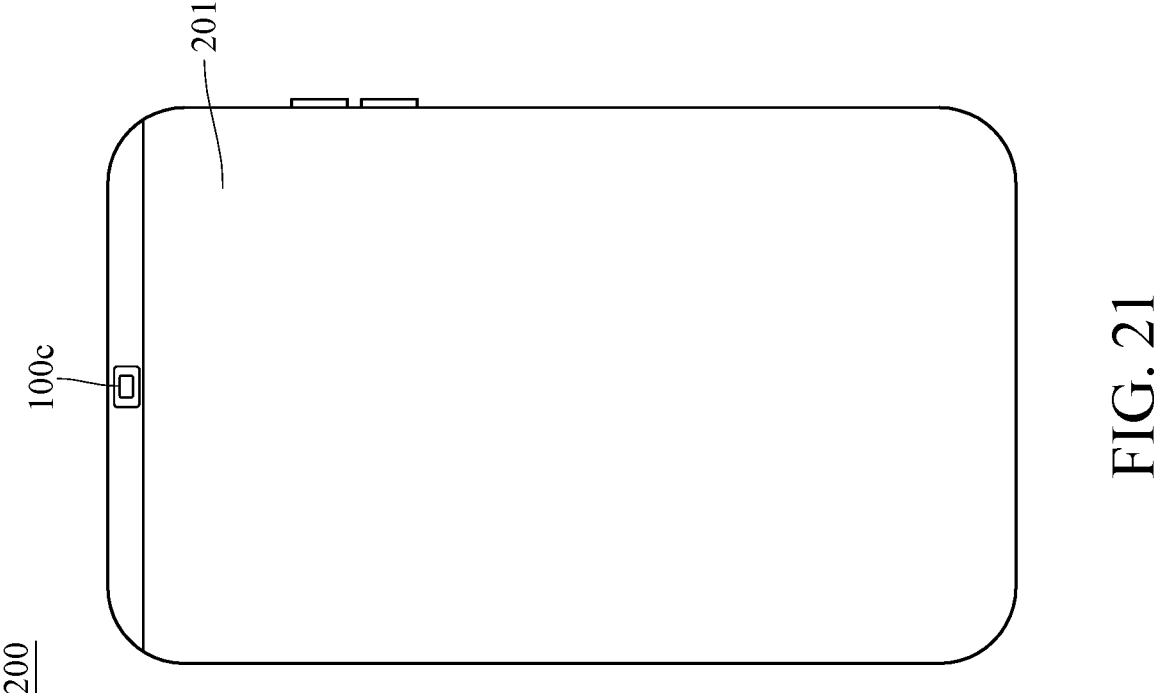
Figure 22:
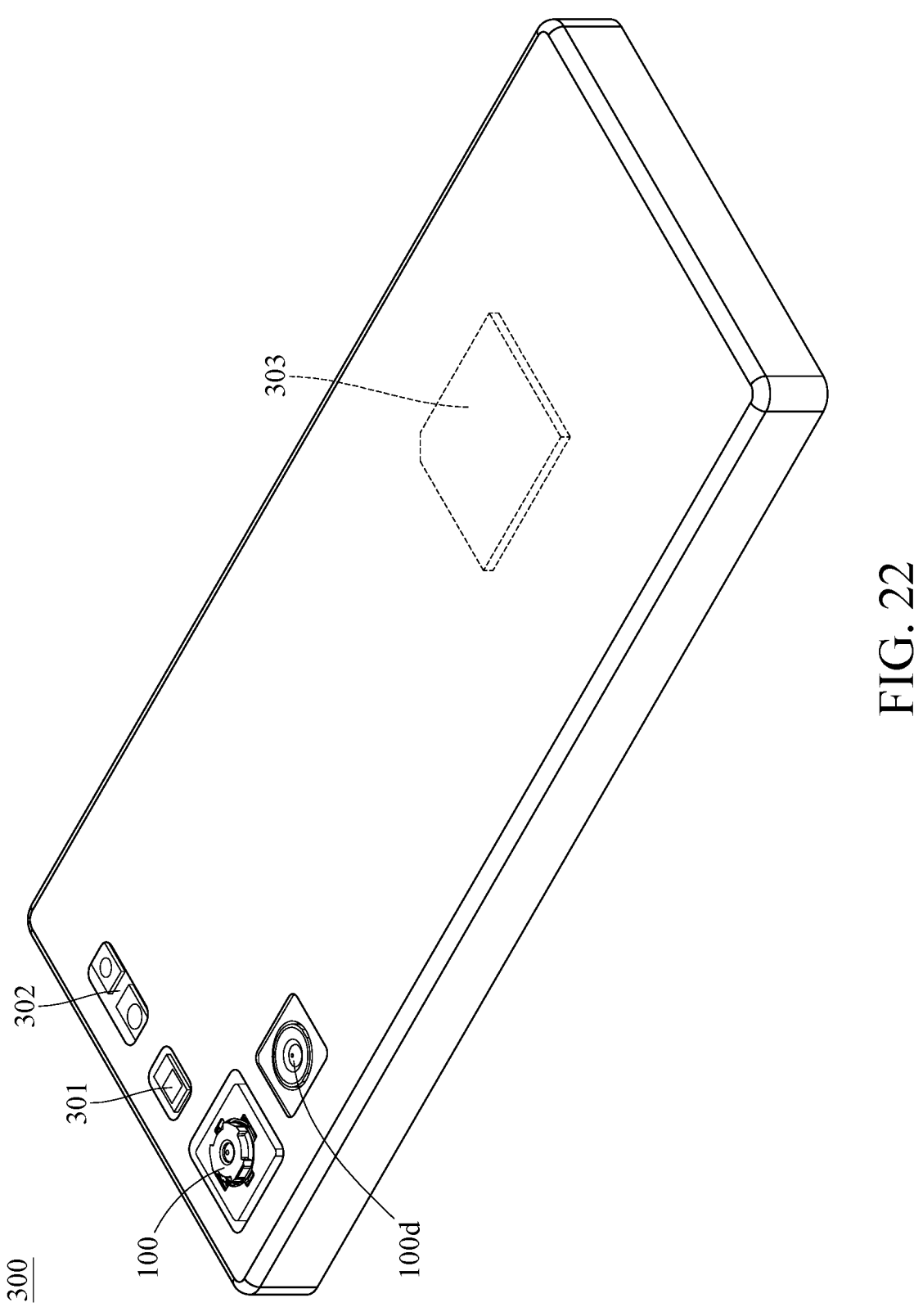
Figure 23:
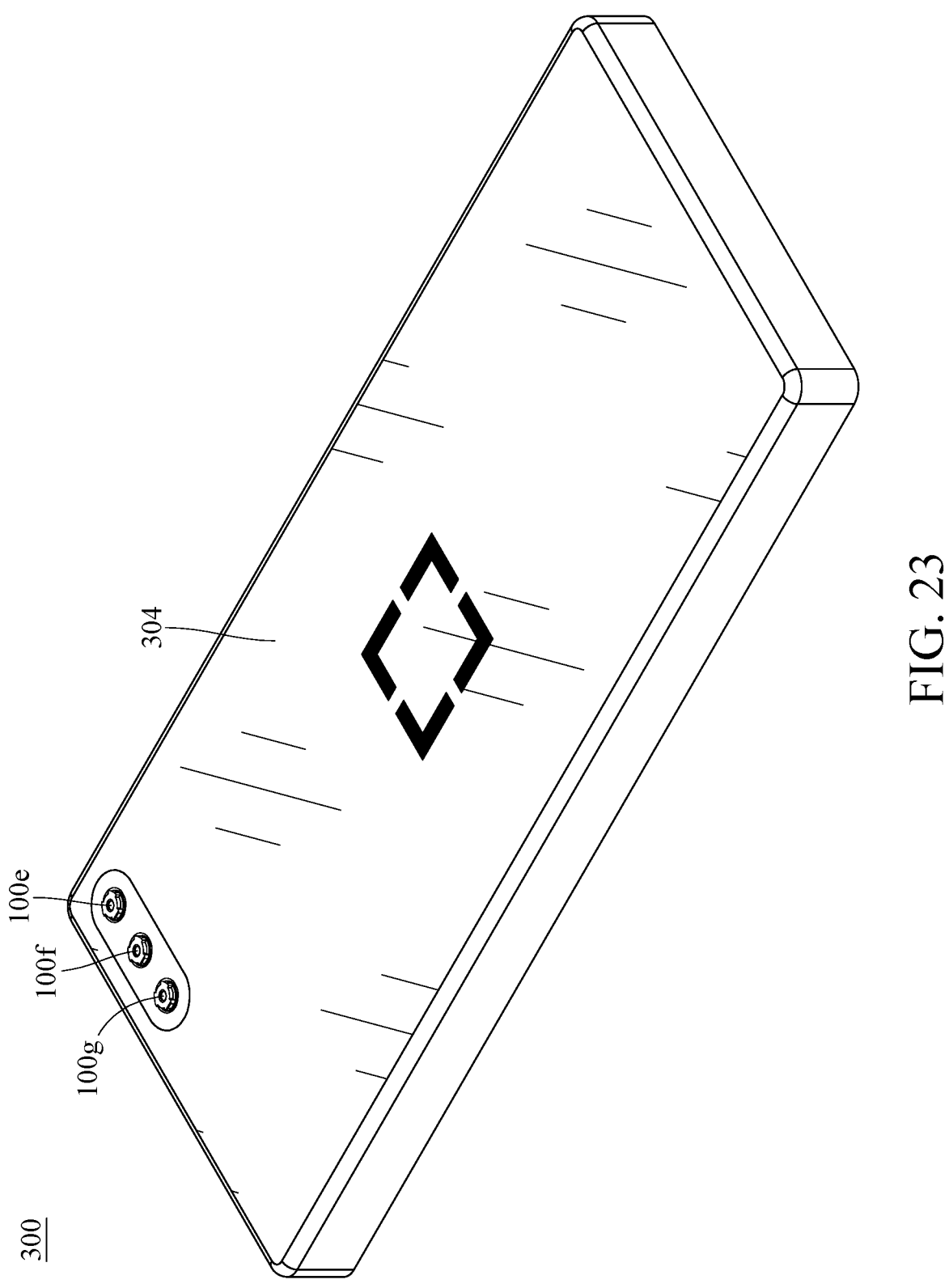
Figure 24:
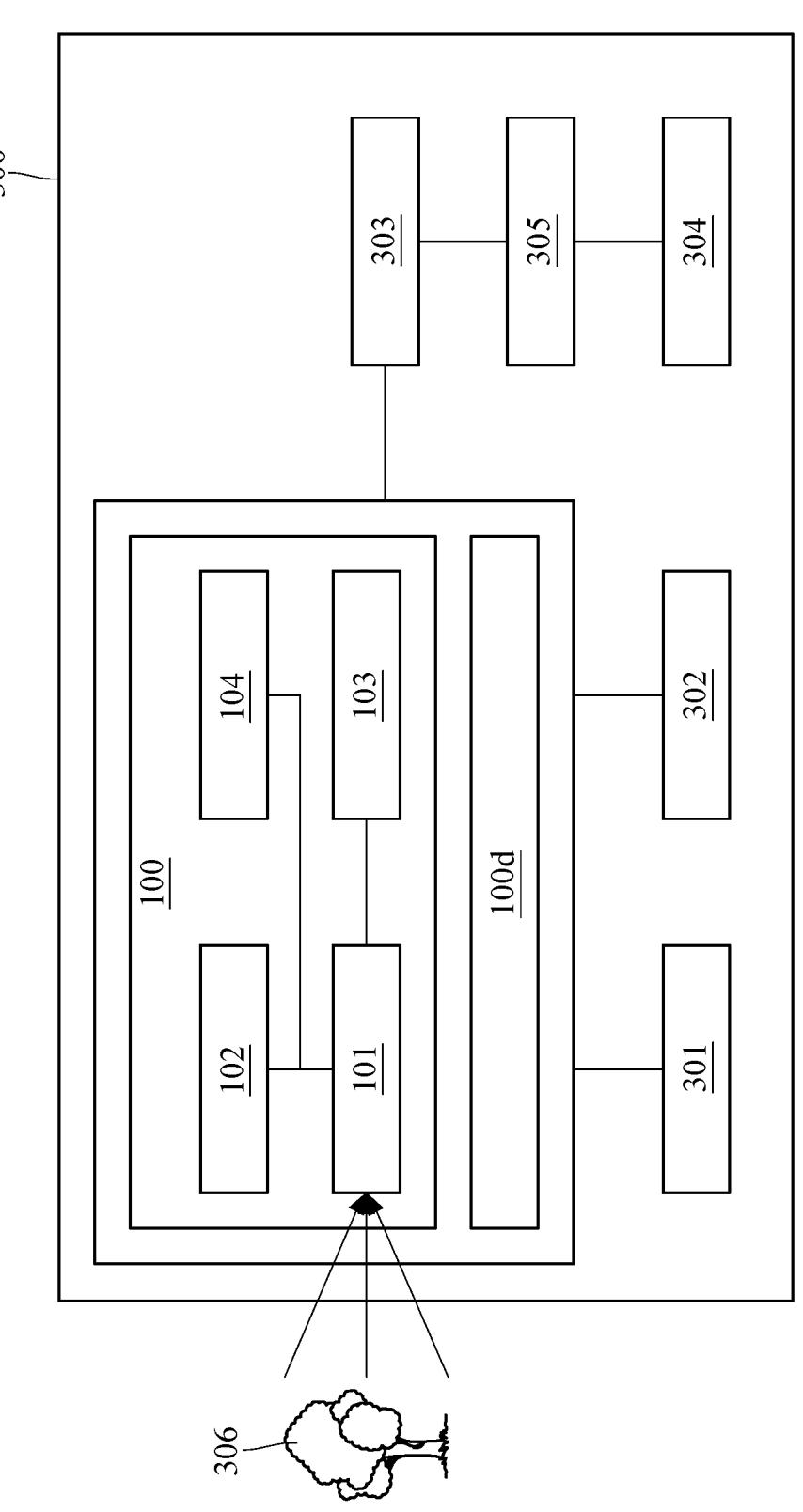
Figure 25:
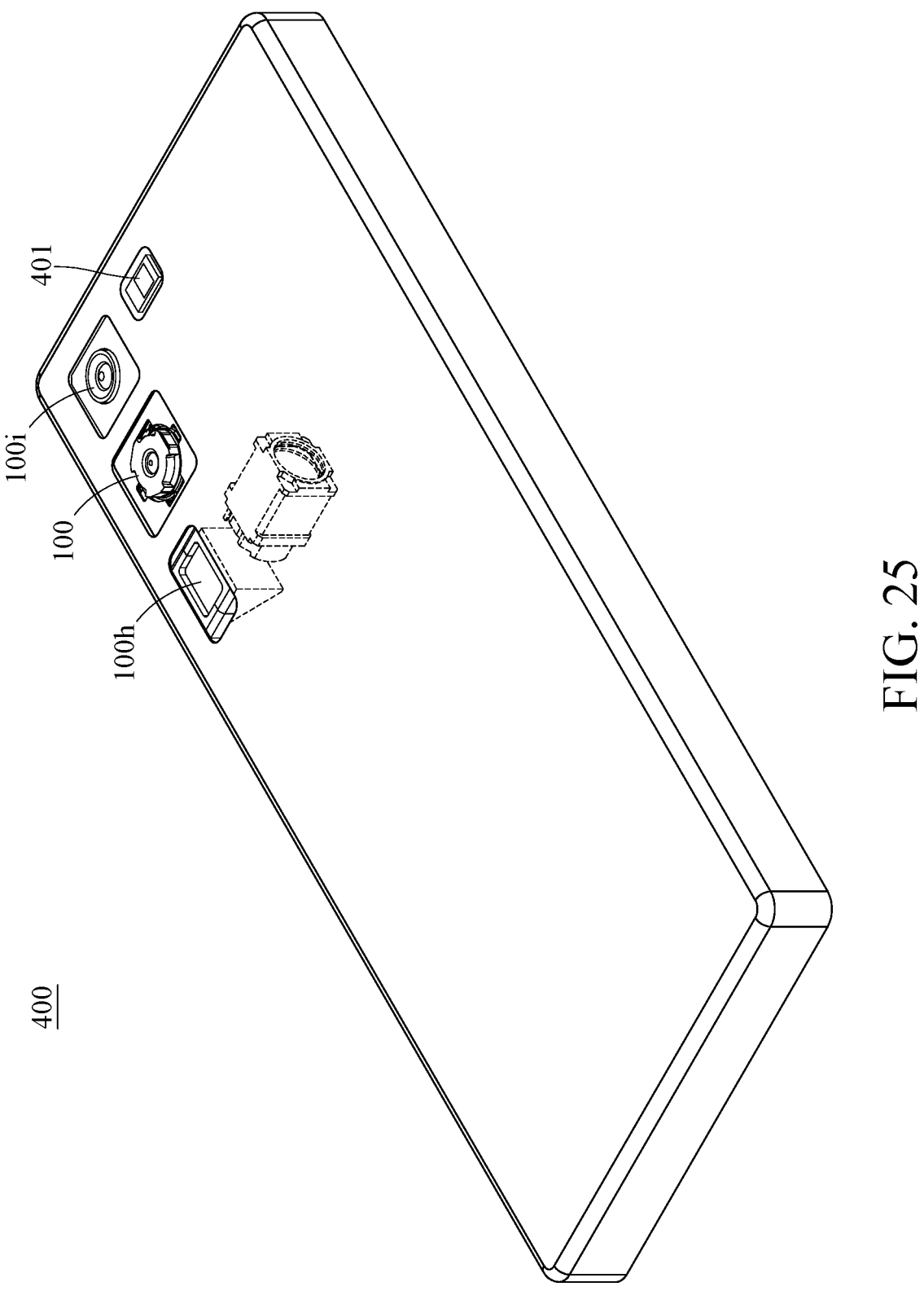
Figure 26:
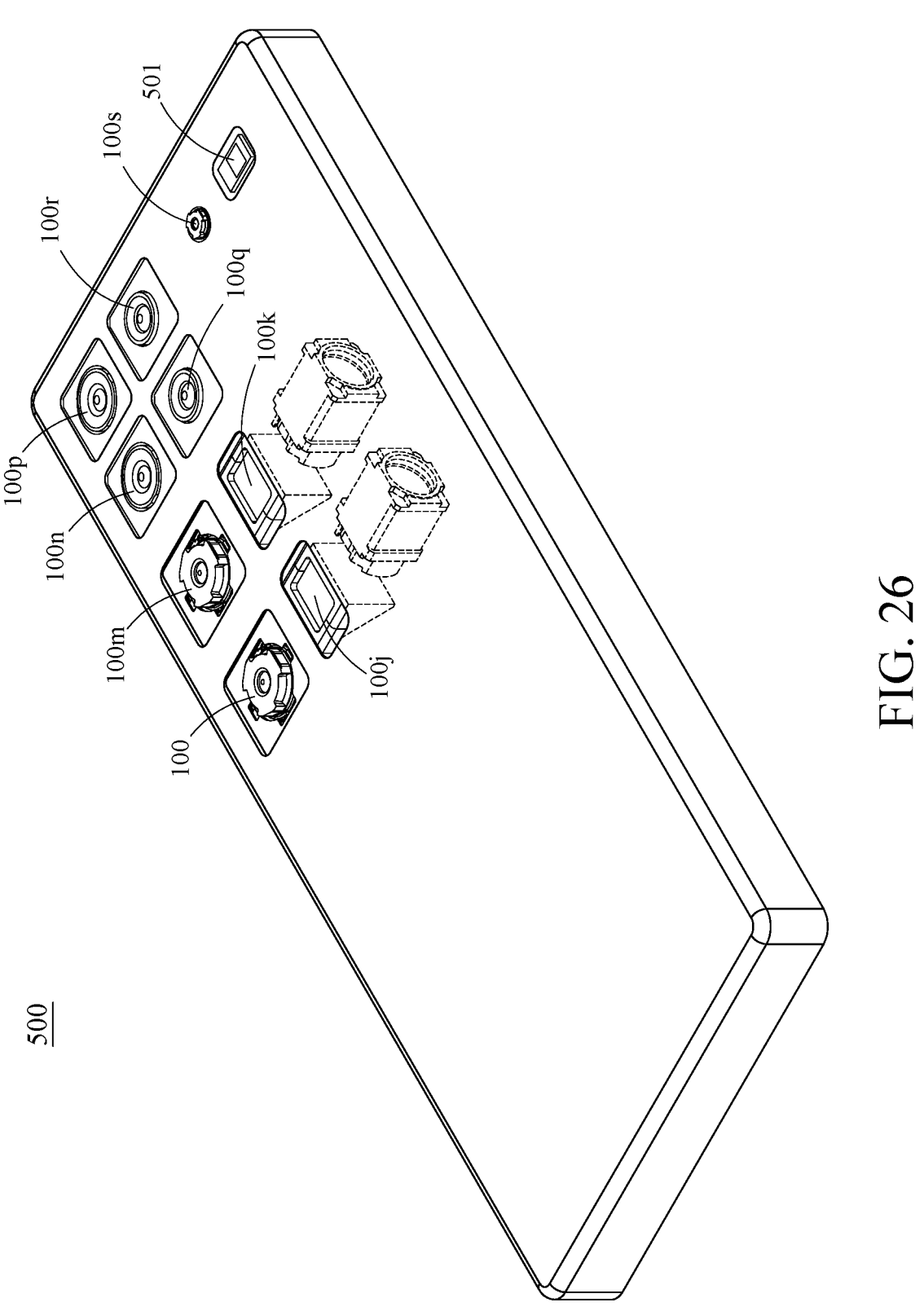
Figure 27:
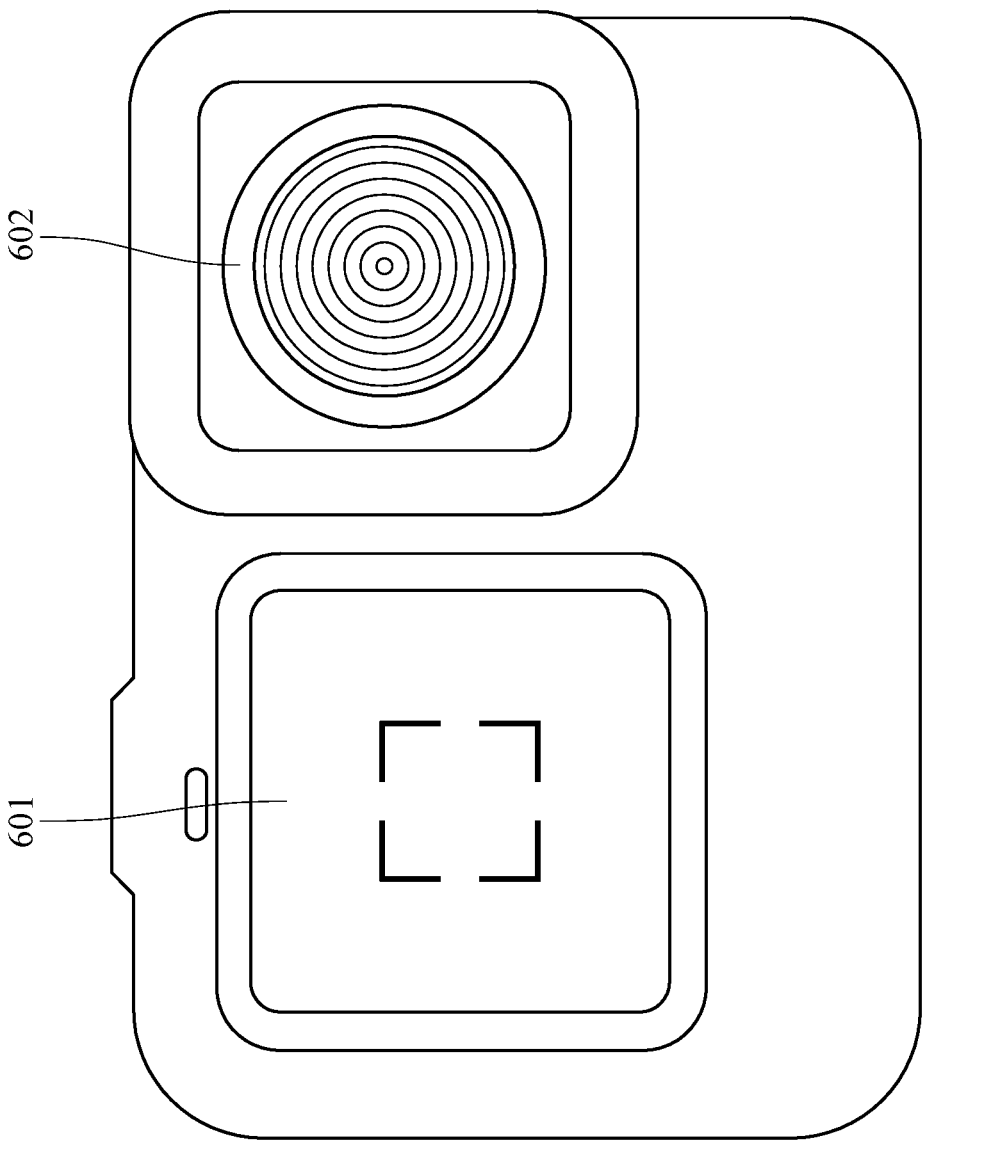
Figure 28:
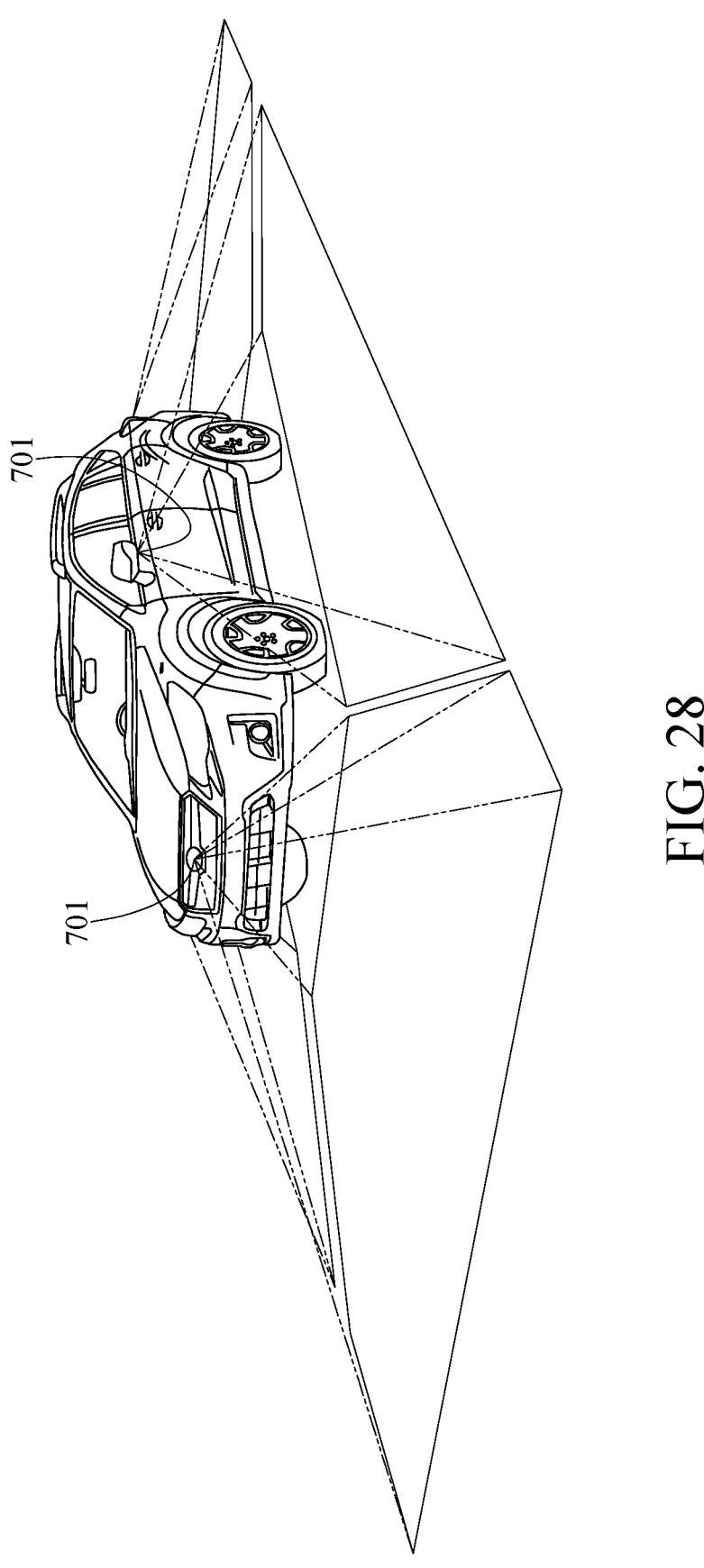
Figure 29:
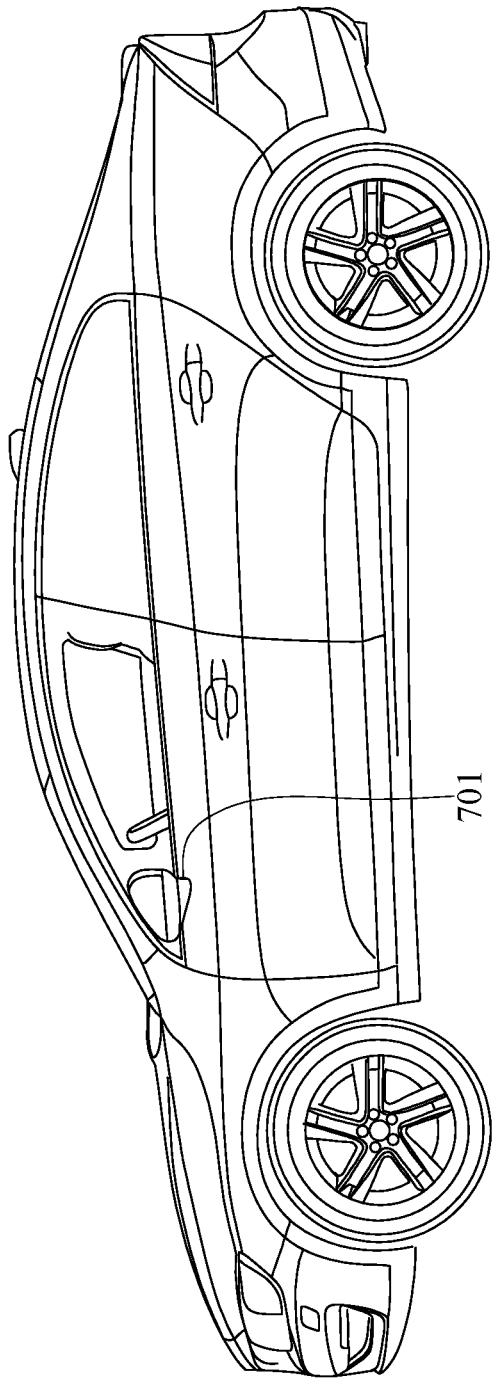
Figure 30:
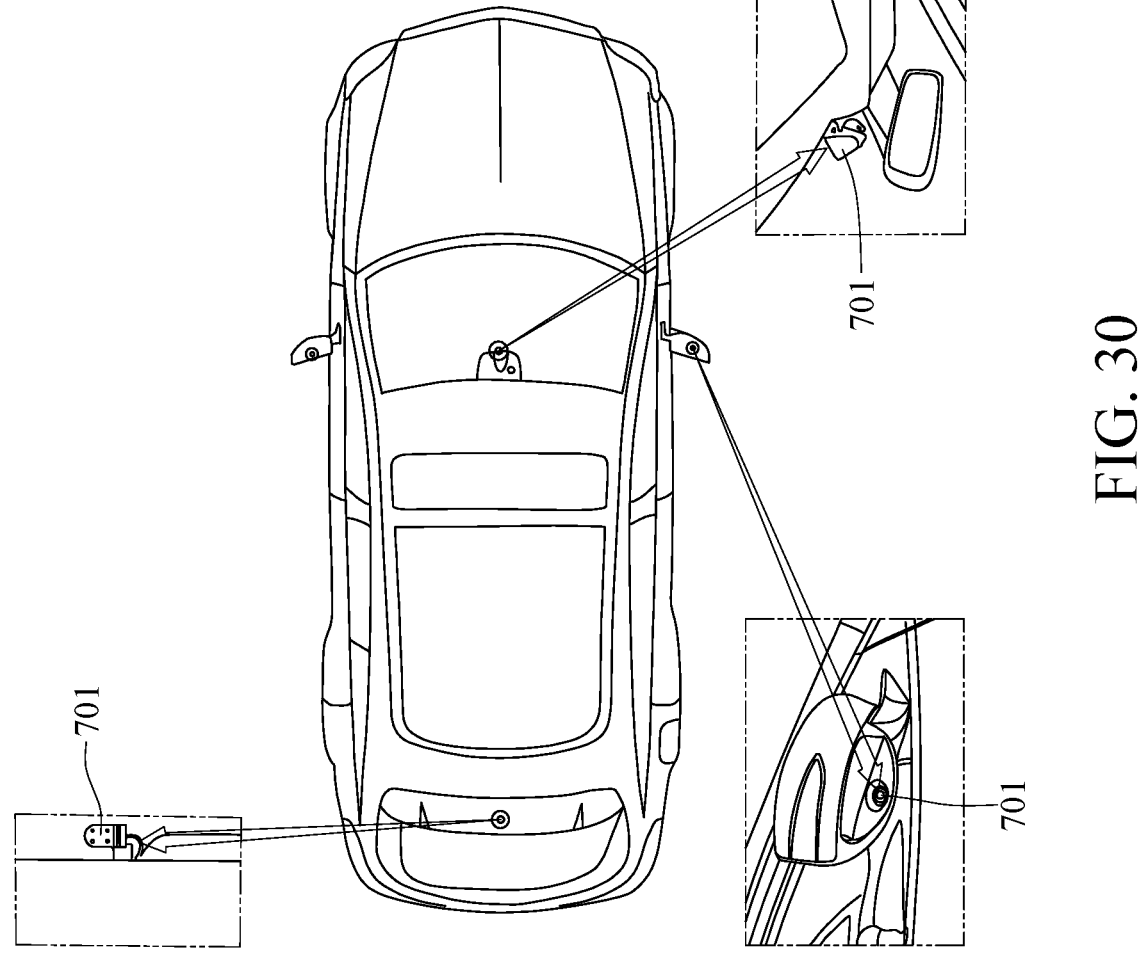
Figure 31:
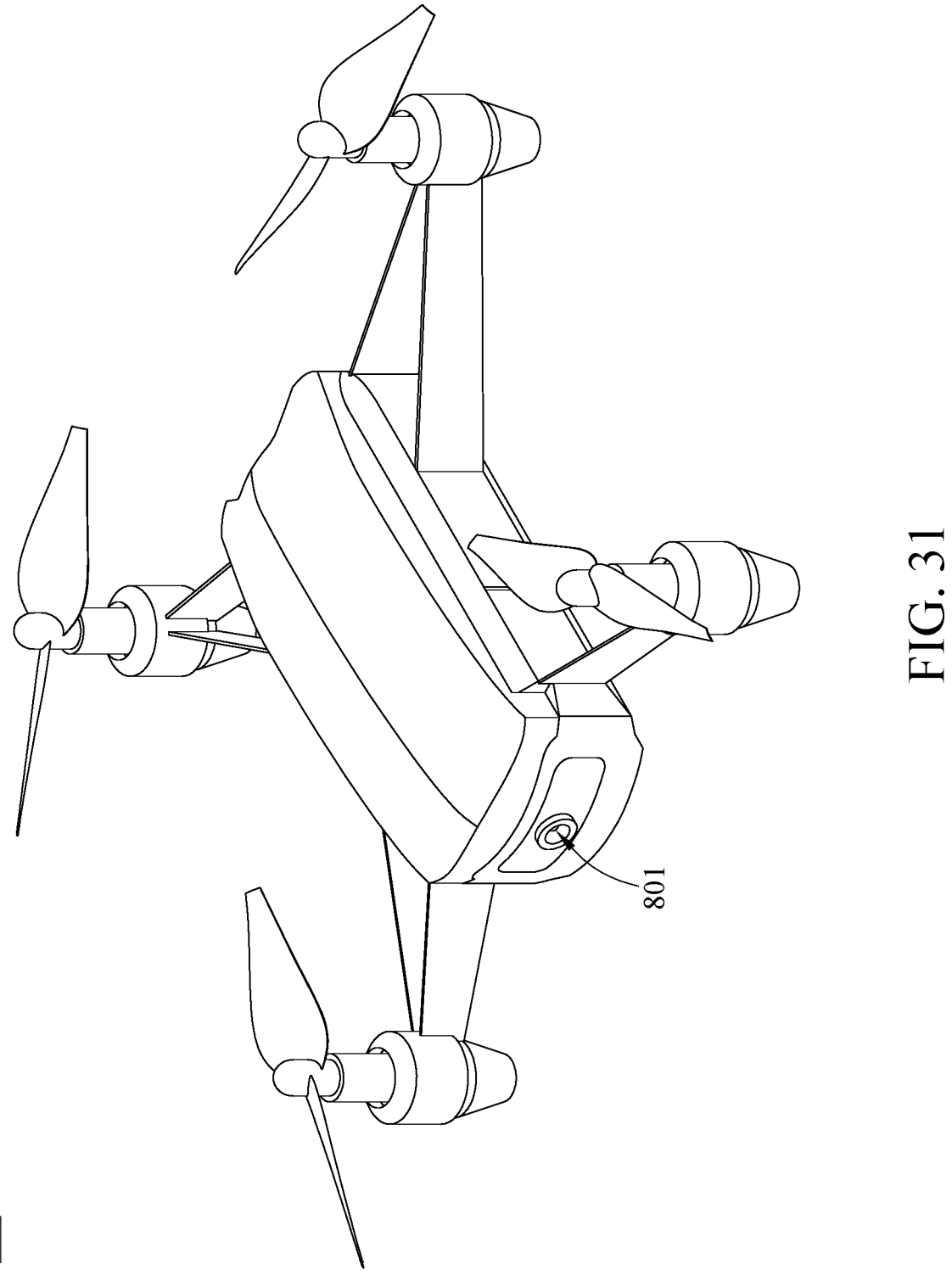
Figure 32:
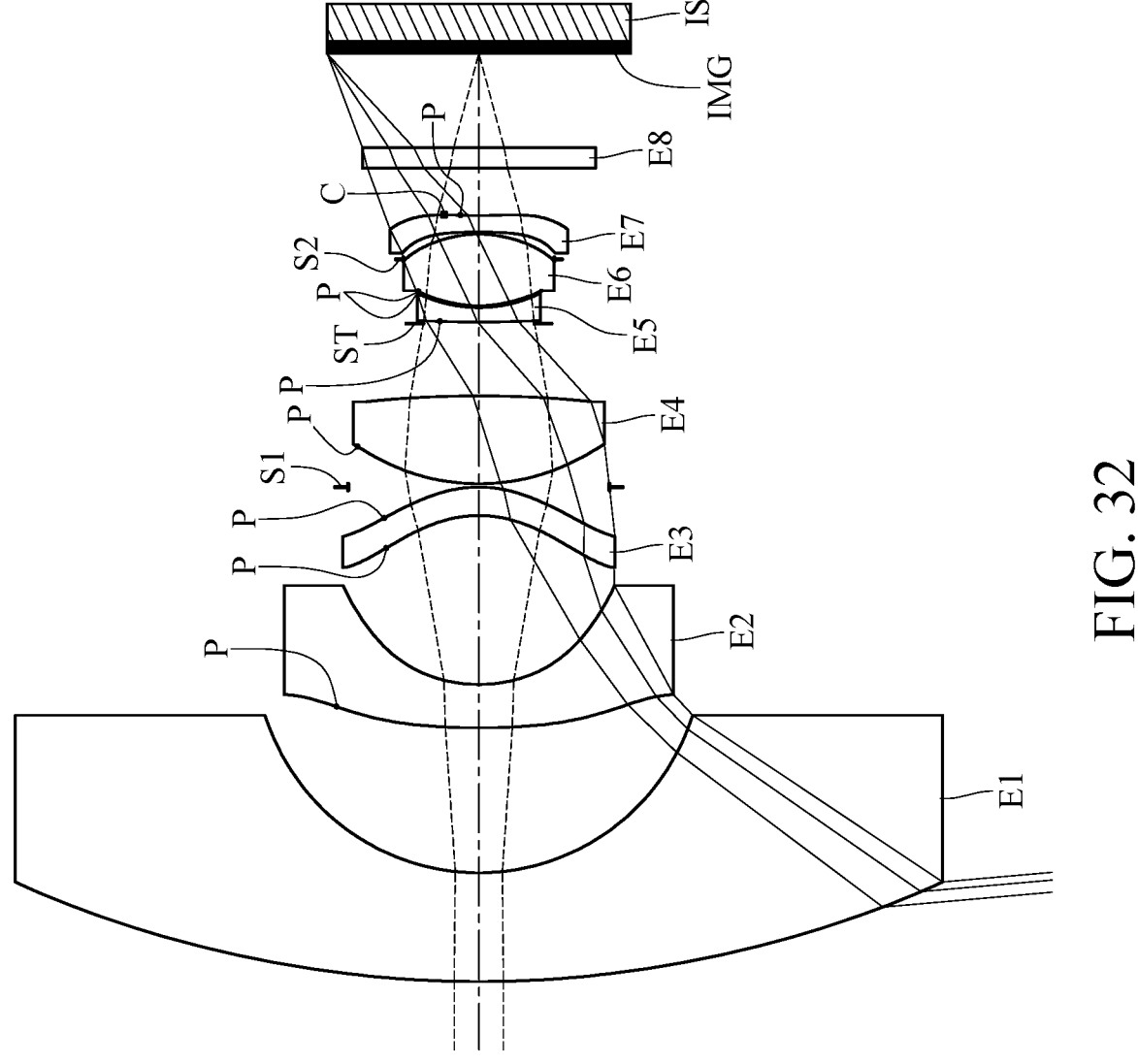
Figure 33:
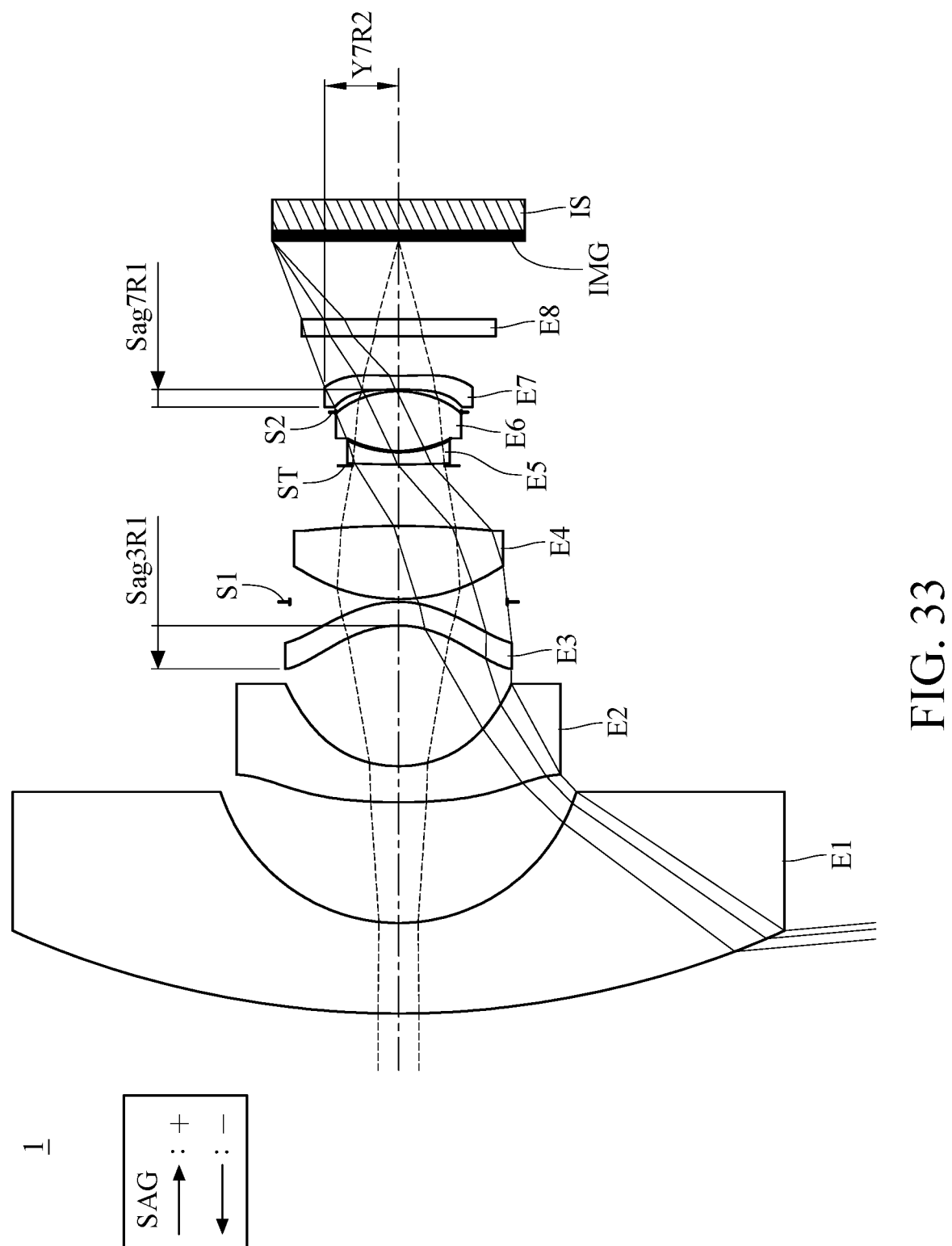
Figure 34:
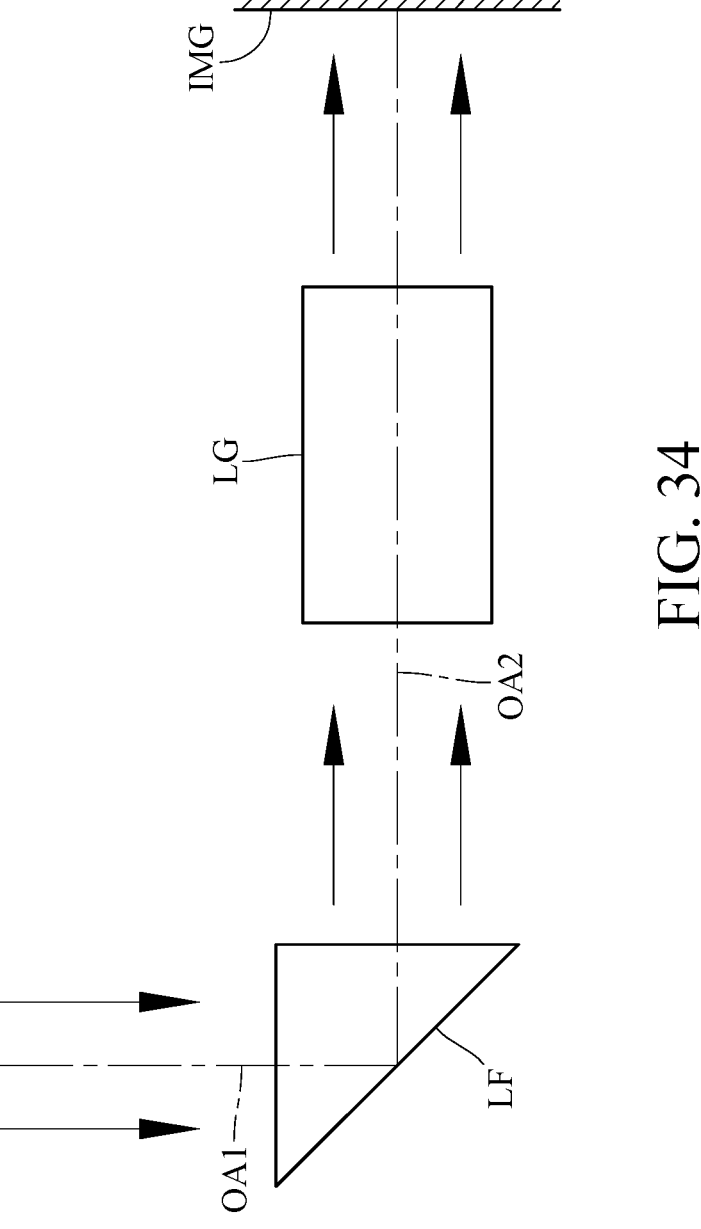
Figure 35:
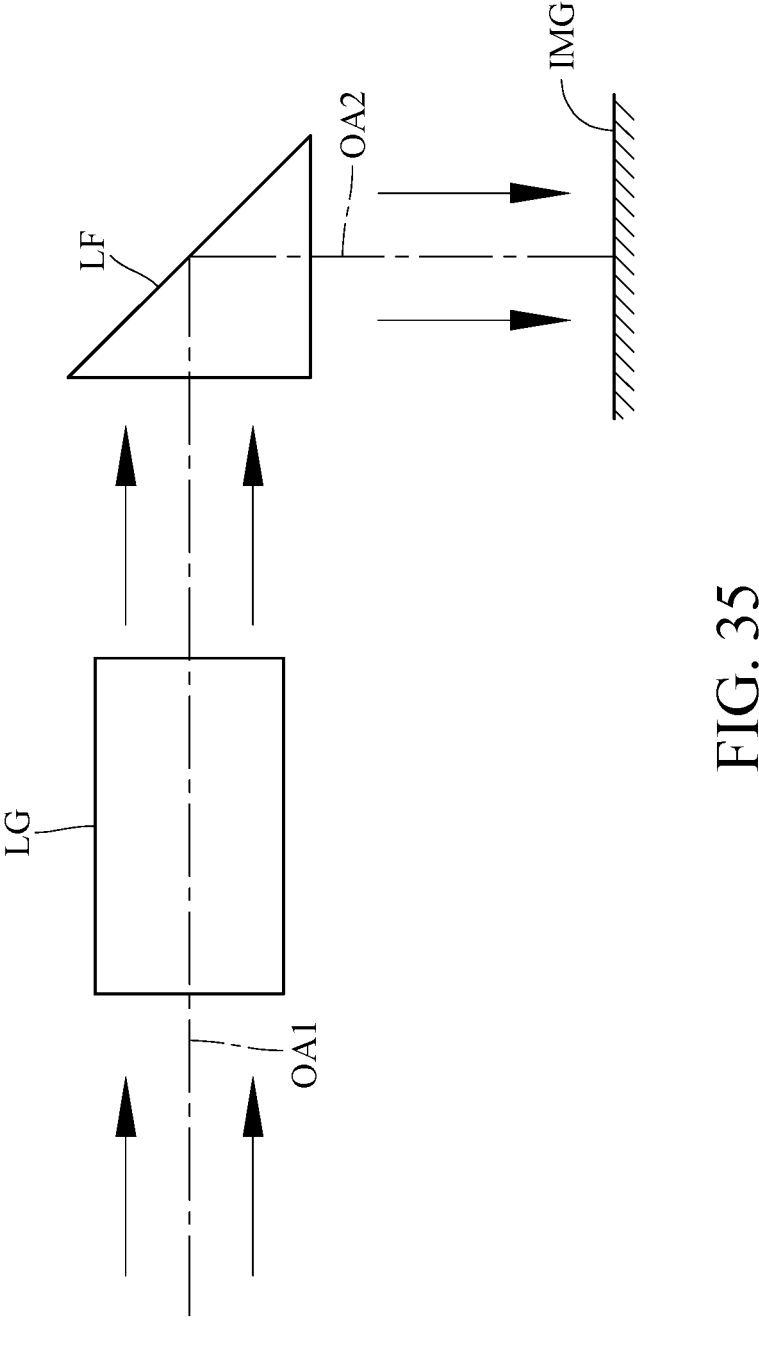
Figure 36:
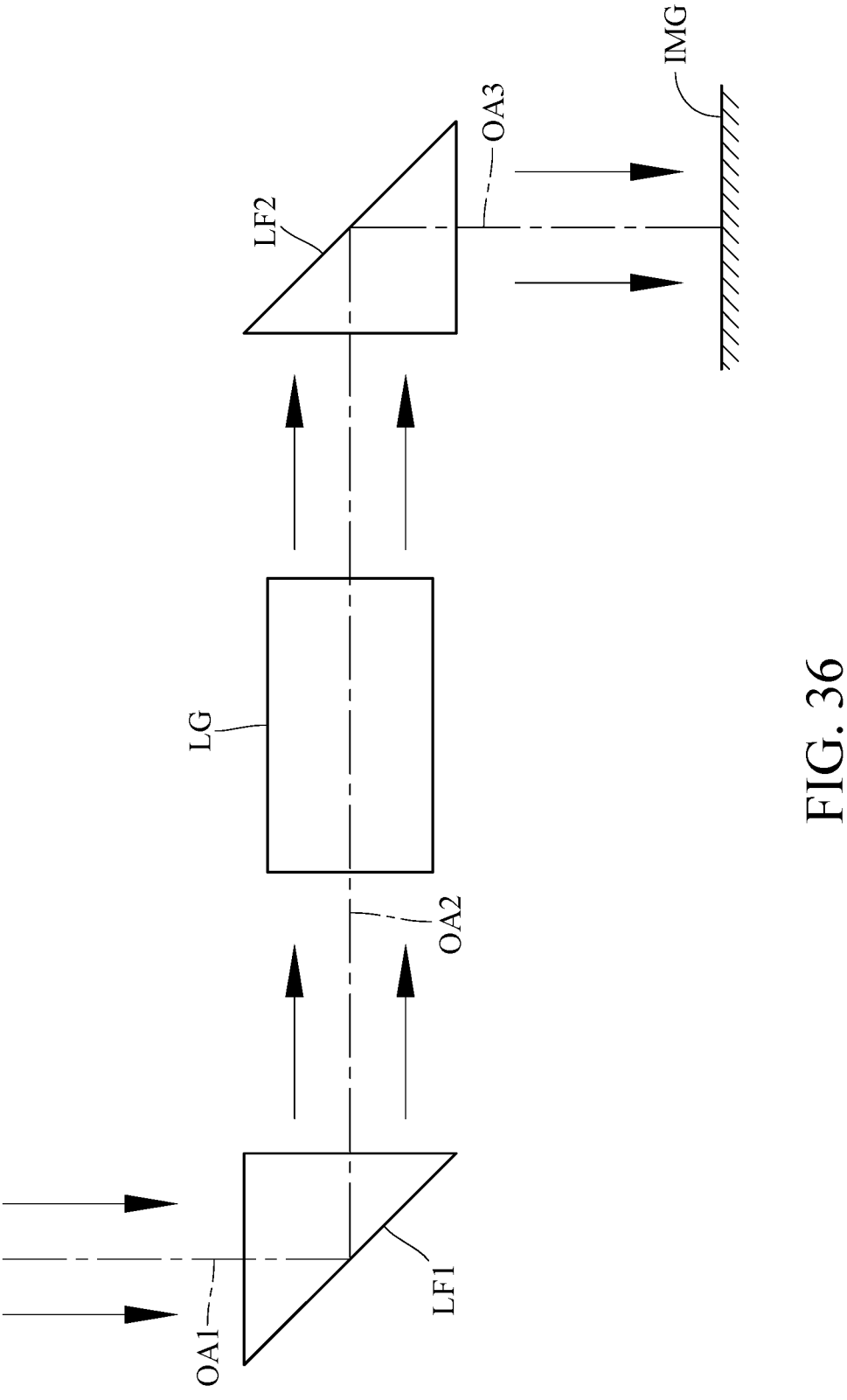

FIG. 18 shows spherical aberration curves, astigmatic field curves and a distortion curve of the image capturing unit according to the 9th embodiment;

FIG. 19 is a perspective view of an image capturing unit according to the 10th embodiment of the present disclosure;

FIG. 20 is one perspective view of an electronic device according to the 11th embodiment of the present disclosure;

FIG. 21 is another perspective view of the electronic device in FIG. 20;

FIG. 22 is one perspective view of an electronic device according to the 12th embodiment of the present disclosure;

FIG. 23 is another perspective view of the electronic device in FIG. 22;

FIG. 24 is a block diagram of the electronic device in FIG. 22;

FIG. 25 is one perspective view of an electronic device according to the 13th embodiment of the present disclosure;

FIG. 26 is one perspective view of an electronic device according to the 14th embodiment of the present disclosure;

FIG. 27 is a schematic view of an electronic device according to the 15th embodiment of the present disclosure;

FIG. 28 is a perspective view of an electronic device according to the 16th embodiment of the present disclosure;

FIG. 29 is a side view of the electronic device in FIG. 28;

FIG. 30 is a top view of the electronic device in FIG. 28;

FIG. 31 is a schematic view of an electronic device according to the 17th embodiment of the present disclosure;

FIG. 32 shows a schematic view of inflection points on lens surfaces and critical points on lens surfaces according to the 1st embodiment of the present disclosure;

FIG. 33 shows a schematic view of Sag3R1, Sag7R1 and Y7R2 according to the 1st embodiment of the present disclosure;

FIG. 34 shows a schematic view of a configuration of a light-folding element in an optical imaging lens assembly according to one embodiment of the present disclosure;

FIG. 35 shows a schematic view of another configuration of a light-folding element in an optical imaging lens assembly according to one embodiment of the present disclosure; and FIG. 36 shows a schematic view of a configuration of two light-folding elements in an optical imaging lens assembly according to one embodiment of the present disclosure.

DETAILED DESCRIPTION

An optical imaging lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element can have negative refractive power. Therefore, it is favorable for enlarging the field of view so as to obtain a relatively large range of image information.

The second lens element has negative refractive power. Therefore, it is favorable for effectively sharing the intensity of the refractive power of the first lens element so as to prevent excessive aberrations due to an overly large curvature of the first lens element.

The object-side surface of the third lens element is concave in a paraxial region thereof. Therefore, it is favorable for balancing the incident angle of light with a large field of view onto the third lens element so as to prevent light divergence.

The fourth lens element can have positive refractive power. Therefore, it is favorable for converging light so as to reduce the overall size of the optical imaging lens assembly.

The fifth lens element can have negative refractive power. Therefore, it is favorable for balancing the refractive power of the sixth lens element and reducing the back focal length. The image-side surface of the fifth lens element can be concave in a paraxial region thereof. Therefore, it is favorable for adjusting the lens shape of the image-side surface of the fifth lens element, thereby being combined with the sixth lens element to correct chromatic aberration.

The sixth lens element has positive refractive power. Therefore, it is favorable for converging light so as to effectively control the optical path and obtain a proper balance between the field of view and the size distribution. The image-side surface of the sixth lens element can be convex in a paraxial region thereof. Therefore, it is favorable for providing a light convergence ability of the sixth lens element so as to prevent generating stray light due to an overly large incident angle at the periphery.

The seventh lens element can have negative refractive power. Therefore, it is favorable for effectively controlling the back focal length of the optical imaging lens assembly so as to reduce the total track length of the optical lens. The image-side surface of the seventh lens element can be concave in a paraxial region thereof. Therefore, it is favorable for reducing the back focal length while correcting aberrations in an off-axis region.

According to the present disclosure, the fifth lens element can be cemented to the sixth lens element, the image-side surface of the fifth lens element can be aspheric, and the object-side surface of the sixth lens element can be aspheric. Therefore, it is favorable for utilizing cementation to reduce the refractive index difference at the interval between two aspheric lens elements so as to effectively reduce light reflection generated at the same time as light refraction, thereby preventing ghost image, etc.

According to the present disclosure, at least one of the object-side surface and the image-side surface of the third lens element can have at least one inflection point. Therefore, it is favorable for adjusting the design of lens shape at the periphery of the third lens element so as to facilitate astigmatism correction. Moreover, the image-side surface of the third lens element can have at least one inflection point. Moreover, at least one of the object-side surface of the image-side surface of the seventh lens element can also have at least one inflection point. Therefore, it is favorable for enhancing the aberration correction ability at the periphery of the seventh lens element. Moreover, the image-side surface of the seventh lens element can have at least one inflection point. Therefore, it is favorable for adjusting the incident angle onto the image surface and controlling the angle of light beam at the periphery, thereby preventing vignetting at the image periphery and eliminating distortion. Please refer to FIG. 32, which shows a schematic view of all inflection points P on lens elements according to the 1st embodiment of the present disclosure. The abovementioned one or more inflection points P on any lens surface of the second through seventh lens elements in FIG. 32 are only exemplary. Each of lens surfaces in various embodiments of the present disclosure may also have one or more inflection points.

According to the present disclosure, at least one of the object-side surface and the image-side surface of the seventh lens element can have at least one critical point in an off-axis region thereof. Therefore, it is favorable for increasing flexibility of the lens surface, thereby reducing the overall size and correcting aberrations. Please refer to FIG. 32, which shows a schematic view of a critical point C on a lens element according to the 1st embodiment of the present disclosure. The abovementioned critical point C on the image-side surface of the seventh lens element in FIG. 32 is only exemplary. Each of lens surfaces in various embodiments of the present disclosure may also have one or more critical points in an off-axis region thereof.

When an axial distance between the third lens element and the fourth lens element is T34, and an axial distance between the fourth lens element and the fifth lens element is T45, the following condition is satisfied: 0<T34/T45<0.50. Therefore, it is favorable for balancing the distance between the third lens element and the fourth lens element and the distance between the fourth lens element and the fifth lens element so as to reduce the light incident angle onto the object-side surface of the fifth lens element, thereby preventing total reflection and stray light while balancing the space arrangement of the lens elements. Moreover, the following condition can also be satisfied: 0<T34/T45<0.40. Moreover, the following condition can also be satisfied: 0<T34/T45<0.30. Moreover, the following condition can also be satisfied: 0.01<T34/T45<0.10. Moreover, the following condition can also be satisfied: $0.02 \leq T34/T45 \leq 0.20$.

When a curvature radius of the object-side surface of the first lens element is R1, and a curvature radius of the object-side surface of the third lens element is R5, and the following condition can be satisfied: 0<(R1+R5)/(R1−R5)<10.00. Therefore, it is favorable for effectively balancing the curvature radius of the object-side surface of the first lens element, thereby allowing light with a large field of view to enter the optical imaging lens assembly; also, it is favorable for effectively balancing the curvature radius of the object-side surface of the third lens element so as to balance the angle of light beam from the first lens element to prevent excessive aberrations. Moreover, the following condition can also be satisfied: 0.10<(R1+R5)/(R1−R5)<5.00. Moreover, the following condition can also be satisfied: 0.30<(R1+R5)/(R1−R5)<2.00. Moreover, the following condition can also be satisfied: $0.58 \leq (R1+R5)/(R1−R5) \leq 1.05$.

When an Abbe number of the seventh lens element is V7, the following condition can be satisfied: 5.0<V7<50.0. Therefore, a proper material selection of the seventh lens element is favorable for effectively correcting chromatic aberration of the optical imaging lens assembly and preventing overlayed images so as to improve image quality. Moreover, the following condition can also be satisfied: 10.0<V7<50.0. Moreover, the following condition can also be satisfied: 10.0<V7<40.0. Moreover, the following condition can also be satisfied: 15.0<V7<30.0. Moreover, the following condition can also be satisfied: $19.5 \leq V7 \leq 28.3$.

When half of a maximum field of view of the optical imaging lens assembly is HFOV, the following condition can be satisfied: 0<1/|tan(HFOV)|<0.500. Therefore, it is favorable for the optical imaging lens assembly to have sufficient imaging range so as to meet viewing angle requirements of the applied device. Moreover, the following condition can also be satisfied: 0<1/|tan(HFOV)|<0.350. Moreover, the following condition can also be satisfied: 0<1/|tan(HFOV)|<0.250. Moreover, the following condition can also be satisfied: $0.002 \leq 1/|tan(HFOV)| \leq 0.220$.

When a focal length of the fifth lens element is f5, and a focal length of the sixth lens element is f6, the following condition can be satisfied: 0.08<|f6/f5|<0.90. Therefore, it is favorable for adjusting a refractive power ratio of the fifth and sixth lens elements, such that the sixth lens element can have a proper light convergence ability which can be balanced by the fifth lens element, and thus the optical path at the peripheral can be effectively controlled. Moreover, the following condition can also be satisfied: $0.15<|f6/f5|<0.70$. Moreover, the following condition can also be satisfied: $0.27\leq|f6/f5|\leq0.53$.

When a central thickness of the first lens element is CT1, and a central thickness of the seventh lens element is CT7, the following condition can be satisfied: $1.50<CT1/CT7<10.00$. Therefore, it is favorable for taking the manufacturing limitation of the first lens element into account by balancing the central thickness ratio of the first and seventh lens elements, and reducing the size of the optical imaging lens assembly by adjusting the central thickness of the seventh lens element. Moreover, the following condition can also be satisfied: $1.65<CT1/CT7<8.00$. Moreover, the following condition can also be satisfied: $1.81\leq CT1/CT7\leq6.58$.

When a curvature radius of the object-side surface of the fourth lens element is R7, and a curvature radius of the object-side surface of the seventh lens element is R13, the following condition can be satisfied: $-5.00<(R7+R13)/(R7-R13)<0.80$. Therefore, it is favorable for effectively balancing the curvature radius of the object-side surface of the fourth lens element and the curvature radius of the object-side surface of the seventh lens element so as to adjust the travelling direction of peripheral light beam, thereby reducing the light incident angle onto the image surface. Moreover, the following condition can also be satisfied: $-4.00<(R7+R13)/(R7-R13)<0.50$. Moreover, the following condition can also be satisfied: $-2.00<(R7+R13)/(R7-R13)<0.30$. Moreover, the following condition can also be satisfied: $-3.02\leq(R7+R13)/(R7-R13)\leq0.19$.

When a central thickness of the third lens element is CT3, and an axial distance between the second lens element and the third lens element is T23, the following condition can be satisfied: $0<CT3/T23<1.00$. Therefore, it is favorable for balancing the central thickness of the third lens element and the distance between the second and third lens elements so as to provide a sufficient distance for refracting light with a large field of view, thereby preventing total reflection. Moreover, the following condition can also be satisfied: $0.05<CT3/T23<0.70$. Moreover, the following condition can also be satisfied: $0.10<CT3/T23<0.40$. Moreover, the following condition can also be satisfied: $0.13\leq CT3/T23\leq0.28$.

When the curvature radius of the object-side surface of the third lens element is R5, and a curvature radius of the image-side surface of the fifth lens element is R10, the following condition can be satisfied: $0.10<|R5/R10|<5.00$. Therefore, it is favorable for adjusting the curvature radius of the object-side surface of the third lens element and the curvature radius of the image-side surface of the fifth lens element, thereby improving convergence quality of imaging light and effectively correcting field curvature and spherical aberration. Moreover, the following condition can also be satisfied: $0.40<|R5/R10|<3.50$. Moreover, the following condition can also be satisfied: $0.67\leq|R5/R10|\leq2.86$.

When an f-number of the optical imaging lens assembly is Fno, the following condition can be satisfied: $1.00<Fno<2.15$. Therefore, it is favorable for obtaining a proper balance between illuminance and the depth of field and increasing the light incident amount to improve image quality. Moreover, the following condition can also be satisfied: $1.40<Fno<2.10$. Moreover, the following condition can also be satisfied: $1.60<Fno<2.00$.

When the central thickness of the third lens element is CT3, and a central thickness of the fourth lens element is CT4, the following condition can be satisfied: $0<CT3/CT4<1.00$. Therefore, it is favorable for controlling the central thickness ratio of the third and fourth lens elements so as to reduce manufacturing errors. Moreover, the following condition can also be satisfied: $0.10<CT3/CT4<0.80$.

When a sum of central thicknesses of all lens elements of the optical imaging lens assembly is $\Sigma CT$, and a sum of axial distances between each of all adjacent lens elements of the optical imaging lens assembly is $\Sigma AT$, the following condition can be satisfied: $0.10<\Sigma CT/\Sigma AT<1.60$. Therefore, it is favorable for adjusting a ratio of the sum of the central thicknesses to the sum of axial distances, thereby increasing space utilization efficiency. Moreover, the following condition can also be satisfied: $0.40<\Sigma CT/\Sigma AT<1.30$.

When the axial distance between the second lens element and the third lens element is T23, and an axial distance between the image-side surface of the seventh lens element and an image surface is BL, the following condition can be satisfied: $0.60<T23/BL<2.50$. Therefore, it is favorable for adjusting the distance between the second and third lens elements and the back focal length, thereby reducing the overall size. Moreover, the following condition can also be satisfied: $0.75<T23/BL<2.00$.

When an axial distance between the object-side surface of the first lens element and the image-side surface of the fourth lens element is Dr1r8, and an axial distance between the object-side surface of the fifth lens element and the image-side surface of the seventh lens element is Dr9r14, the following condition can be satisfied: $2.60<Dr1r8/Dr9r14<6.20$. Therefore, it is favorable for adjusting the central thicknesses at the object side and the image side of the lens assembly so as to balance the space arrangement of the lens elements, thereby reducing the sensitivity of the optical imaging lens assembly. Moreover, the following condition can also be satisfied: $3.50<Dr1r8/Dr9r14<6.00$.

When the focal length of the fifth lens element is f5, and a focal length of the seventh lens element is f7, the following condition can be satisfied: $0.30<f5/f7<5.00$. Therefore, it is favorable for effectively balancing the refractive powers of the fifth and seventh lens elements, thereby enlarging the viewing angle of photography and correcting aberrations in an off-axis region. Moreover, the following condition can also be satisfied: $0.36<f5/f7<3.50$. Moreover, the following condition can also be satisfied: $0.42<f5/f7<2.00$.

When a focal length of the fourth lens element is f4, and the focal length of the sixth lens element is f6, the following condition can be satisfied: $1.20<f4/f6<5.00$. Therefore, it is favorable for adjusting the intensity ratio of the refractive powers of the fourth and sixth lens elements so as to effectively control the optical path, thereby enlarging the image surface. Moreover, the following condition can also be satisfied: $1.40<f4/f6<3.00$.

When the curvature radius of the object-side surface of the third lens element is R5, and a curvature radius of the image-side surface of the seventh lens element is R14, the following condition can be satisfied: $-1.20<(R5+R14)/(R5-R14)<0$. Therefore, it is favorable for effectively balancing the curvature radius of the object-side surface of the third lens element and the curvature radius of the image-side surface of the seventh lens element, thereby correcting aberration caused by light incident with a large field of view. Moreover, the following condition can also be satisfied: $-0.80<(R5+R14)/(R5-R14)<-0.05$.

When a displacement in parallel with an optical axis from an axial vertex on the object-side surface of the seventh lens element to a maximum effective radius position on the object-side surface of the seventh lens element is Sag7R1, and a central thickness of the sixth lens element is CT6, the following condition can be satisfied: $-0.50<\text{Sag7R1/CT6}<0$. Therefore, it is favorable for controlling the light incident angle onto the object-side surface of the seventh lens element so as to prevent light divergence and poor relative illuminance at the periphery caused by an overly large incident angle. Moreover, the following condition can also be satisfied: $-0.40<\text{Sag7R1/CT6}<-0.10$. Please refer to FIG. 33, which shows a schematic view of Sag7R1 according to the 1st embodiment of the present disclosure. When the direction from the axial vertex of one surface to the maximum effective radius position of the same surface is facing towards the image side of the optical imaging lens assembly, the value of displacement is positive; when the direction from the axial vertex of the surface to the maximum effective radius position of the same surface is facing towards the object side of the optical imaging lens assembly, the value of displacement is negative.

When a displacement in parallel with the optical axis from an axial vertex on the object-side surface of the third lens element to a maximum effective radius position on the object-side surface of the third lens element is Sag3R1, and the central thickness of the third lens element is CT3, the following condition can be satisfied: $-2.50<\text{Sag3R1/CT3}<-0.80$. Therefore, it is favorable for balancing the degree of curvature at the peripheral object-side surface of the third lens element, thereby increasing the field of view and correcting aberrations such as distortion. Moreover, the following condition can also be satisfied: $-2.20<\text{Sag3R1/CT3}<-1.00$. Please refer to FIG. 33, which shows a schematic view of Sag3R1 according to the 1st embodiment of the present disclosure. When the direction from the axial vertex of one surface to the maximum effective radius position of the same surface is facing towards the image side of the optical imaging lens assembly, the value of displacement is positive; when the direction from the axial vertex of the surface to the maximum effective radius position of the same surface is facing towards the object side of the optical imaging lens assembly, the value of displacement is negative.

When a maximum image height of the optical imaging lens assembly (which can be half of a diagonal length of an effective photosensitive area of the image sensor) is ImgH, and a maximum effective radius of the image-side surface of the seventh lens element is Y7R2, the following condition can be satisfied: $1.20<\text{ImgH/Y7R2}<2.50$. Therefore, it is favorable for adjusting the optical effective radius of the seventh lens element and the image height, thereby increasing image surface and improving image quality. Moreover, the following condition can also be satisfied: $1.40<\text{ImgH/Y7R2}<2.00$. Please refer to FIG. 33, which shows a schematic view of Y7R2 according to the 1st embodiment of the present disclosure.

When the focal length of the fourth lens element is f4, and the focal length of the fifth lens element is f5, the following condition can be satisfied: $-1.80<\text{f4/f5}<-0.20$. Therefore, it is favorable for effectively balancing the refractive powers of the fourth and fifth lens elements, thereby correcting aberrations and adjusting the field of view. Moreover, the following condition can also be satisfied: $-1.50<\text{f4/f5}<-0.40$.

When a focal length of the second lens element is f2, and the focal length of the fourth lens element is f4, the following condition can be satisfied: $-1.00<\text{f4/f2}<-0.10$. Therefore, it is favorable for adjusting the intensity ratio of the refractive powers of the second and fourth lens elements so as to form a lens structure with a wide field of view, which is favorable for receiving light with a large field of view and correcting aberrations. Moreover, the following condition can also be satisfied: $-0.85<\text{f4/f2}<-0.40$.

When the central thickness of the third lens element is CT3, and the axial distance between the fourth lens element and the fifth lens element is T45, the following condition can be satisfied: $0.05<\text{CT3/T45}<1.50$. Therefore, it is favorable for balancing the thickness of the third lens element and the distance between the fourth and fifth lens elements, thereby increasing design flexibility while controlling the size of the optical imaging lens assembly. Moreover, the following condition can also be satisfied: $0.15<\text{CT3/T45}<1.20$.

When the curvature radius of the object-side surface of the fourth lens element is R7, and a curvature radius of the object-side surface of the sixth lens element is R11, the following condition can be satisfied: $0<\text{R11/R7}<1.30$. Therefore, it is favorable for adjusting the curvature radius of the object-side surface of the fourth lens element and the curvature radius of the object-side surface of the sixth lens element, thereby controlling the optical path at the periphery and effectively converging light with a large field of view. Moreover, the following condition can also be satisfied: $0.10<\text{R11/R7}<1.00$.

According to the present disclosure, the optical imaging lens assembly can further include an aperture stop. When an axial distance between the object-side surface of the first lens element and an image surface is TL, and an axial distance between the aperture stop and the image surface is SL, the following condition can be satisfied: $2.50<\text{TL/SL}<5.00$. Therefore, it is favorable for adjusting the total track length of the optical imaging lens assembly and the distance on the optical axis between the aperture stop and the image surface, thereby increasing the field of view and illuminance at the peripheral field of view. Moreover, the following condition can also be satisfied: $2.75<\text{TL/SL}<4.50$.

When an Abbe number of the third lens element is V3, and an Abbe number of the fifth lens element is V5, the following condition can be satisfied: $2.0<\text{V3/V5}<4.0$. Therefore, proper material selections of the third and fifth lens elements are favorable for balancing convergence ability to light with different wavelengths and correcting chromatic aberration. Moreover, the following condition can also be satisfied: $2.4<\text{V3/V5}<3.5$.

When a focal length of the optical imaging lens assembly is f, the focal length of the second lens element is f2, the focal length of the fifth lens element is f5, and the focal length of the seventh lens element is f7, the following condition can be satisfied: $1.00<(|\text{f/f2}|+|\text{f/f5}|)/|\text{f/f7}|<3.60$. Therefore, it is favorable for adjusting the refractive powers of the second, fifth and seventh lens elements so as to balancing convergence or divergence of incident light with a large field of view, thereby improving convergence quality at the whole field of view. Moreover, the following condition can also be satisfied: $1.20<(|\text{f/f2}|+|\text{f/f5}|)/|\text{f/f7}|<3.30$.

When the axial distance between the object-side surface of the fifth lens element and the image-side surface of the seventh lens element is Dr9r14, and the axial distance between the second lens element and the third lens element is T23, the following condition can be satisfied: $0.10<\text{Dr9r14/T23}<1.65$. Therefore, it is favorable for balancing the central thicknesses at the image side of the lens assembly and the distance between the second and third lens elements, thereby maintaining a proper space arrangement. Moreover, the following condition can also be satisfied: $0.30<\text{Dr9r14/T23}<1.30$.

When an axial distance between the fifth lens element and the sixth lens element is T56, the following condition can be satisfied: 0.010 mm<T56<0.050 mm. Therefore, it is favorable for maintaining a proper interval between the two cemented aspheric lens elements so as to prevent uneven distribution of adhesive at the peripheries of lens elements caused by an overly short distance between the lens elements. Moreover, the following condition can also be satisfied: 0.015 mm<T56<0.035 mm.

When the curvature radius of the image-side surface of the fifth lens element is R10, the curvature radius of the object-side surface of the sixth lens element is R11, and the focal length of the optical imaging lens assembly is f, the following condition can be satisfied: 0.04<|R10−R11|×10/f<8.00. Therefore, it is favorable for the adhesion surfaces of the two cemented aspheric lens elements to have different curvature radii, thereby increasing design flexibility. Moreover, the following condition can also be satisfied: 0.10<|R10−R11|×10/f<5.00.

When the focal length of the optical imaging lens assembly is f, a focal length of the first lens element is f1, the focal length of the second lens element is f2, a focal length of the third lens element is f3, the focal length of the fourth lens element is f4, the focal length of the fifth lens element is f5, the focal length of the sixth lens element is f6, the focal length of the seventh lens element is f7, and a focal length of the i-th lens element is fi, the following condition can be satisfied: $1.00 < \Sigma |f/fi| < 3.00$, wherein i=1, 2, 3, 4, 5, 6 and 7. Therefore, it is favorable for adjusting the overall refractive power of the optical imaging lens assembly, which is favorable for controlling the optical path and balancing the total track length of the optical imaging lens assembly. Moreover, the following condition can also be satisfied: $1.50 < \Sigma |f/fi| < 2.75$, wherein i=1, 2, 3, 4, 5, 6 and 7.

When the central thickness of the first lens element is CT1, and a central thickness of the fifth lens element is CT5, the following condition can be satisfied: 0.05<CT5/CT1<1.10. Therefore, it is favorable for controlling the central thickness ratio of the first and fifth lens elements, such that the first lens element has a larger central thickness, which is favorable for enhancing the mechanical strength of the first lens element and therefore effectively increasing lifespan of the electronic product. Moreover, the following condition can also be satisfied: 0.10<CT5/CT1<1.00.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, at least one light-folding element, such as a prism or a mirror which can have a surface being planar, spherical, aspheric or in free-form, can be optionally disposed between an imaged object and the image surface on the imaging optical path, such that the optical imaging lens assembly can be more flexible in space arrangement, and therefore the dimensions of an electronic device is not restricted by the total track length of the optical imaging lens assembly. Specifically, please refer to FIG. 34 and FIG. 35. FIG. 34 shows a schematic view of a configuration of a light-folding element in an optical imaging lens assembly according to one embodiment of the present disclosure, and FIG. 35 shows a schematic view of another configuration of a light-folding element in an optical imaging lens assembly according to one embodiment of the present disclosure. In FIG. 34 and FIG. 35, the optical imaging lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the optical imaging lens assembly as shown in FIG. 34 or disposed between a lens group LG of the optical imaging lens assembly and the image surface IMG as shown in FIG. 35. Furthermore, please refer to FIG. 36, which shows a schematic view of a configuration of two light-folding elements in an optical imaging lens assembly according to one embodiment of the present disclosure. In FIG. 36, the optical imaging lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging lens assembly, the second light-folding element LF2 is disposed between the lens group LG of the optical imaging lens assembly and the image surface IMG, and the travelling direction of light on the first optical axis OA1 can be the same direction as the travelling direction of light on the third optical axis OA3 as shown in FIG. 36. The optical imaging lens assembly can be optionally provided with three or more light-folding elements, and the present disclosure is not limited to the type, amount and position of the light-folding elements of the embodiments disclosed in the aforementioned figures.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the optical imaging lens assembly can include one or more optical elements for limiting the form of light passing through the optical imaging lens assembly. Each optical element can be, but not limited to, a filter, a polarizer, etc., and each optical element can be, but not limited to, a single-piece element, a composite component, a thin film, etc. The optical element can be located at the object side or the image side of the optical imaging lens assembly or between any two adjacent lens elements so as to allow light in a specific form to pass through, thereby meeting application requirements.

According to the present disclosure, the optical imaging lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and the image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 1:
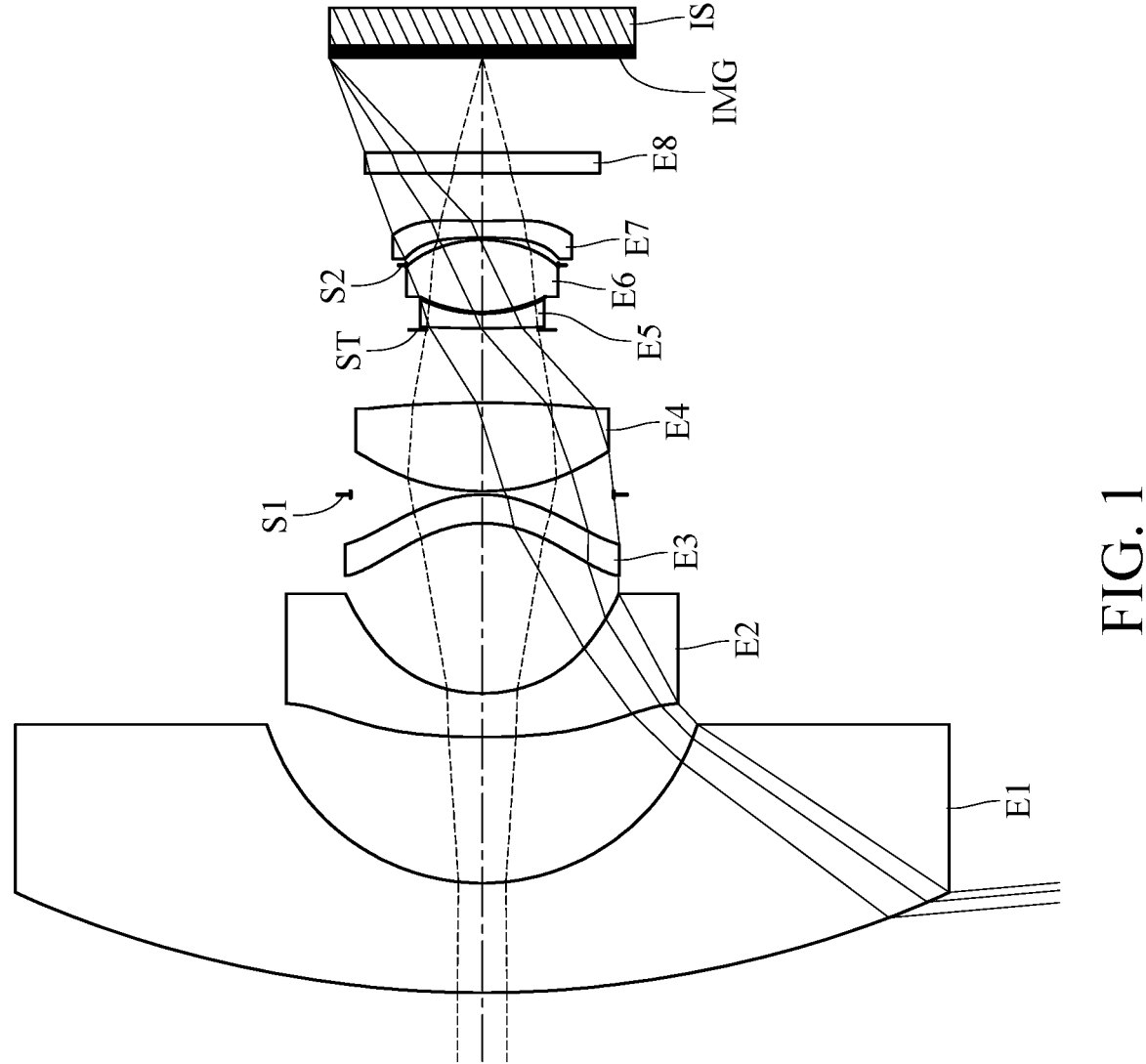
FIG. 1 is a schematic view of an image capturing unit according to the 1st embodiment of the present disclosure.
Figure 2:
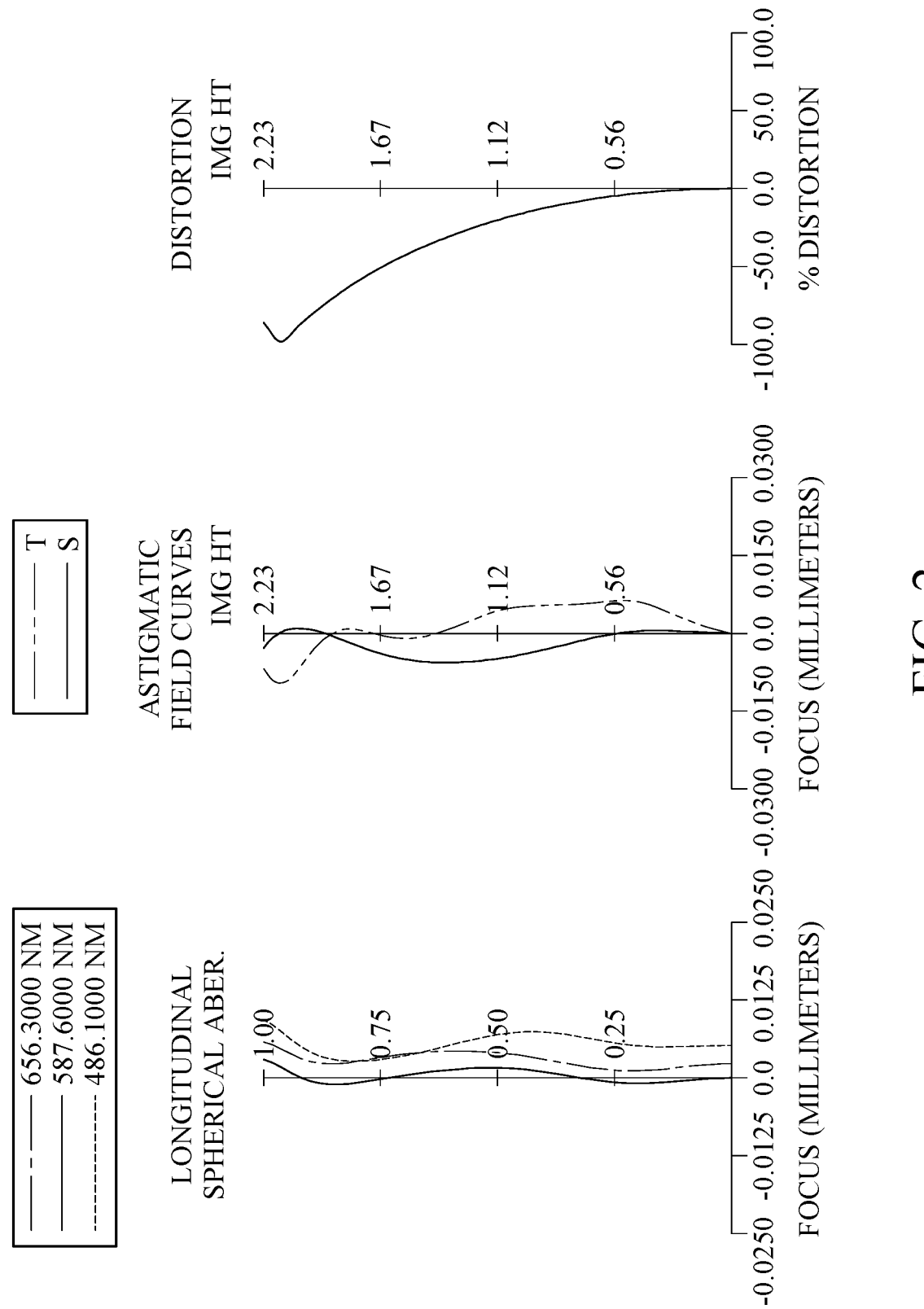
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a stop S1, a fourth lens element E4, an aperture stop ST, a fifth lens element E5, a sixth lens element E6, a stop S2, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of glass material and has the object-side surface and the image-side surface being both aspheric. The object-side surface of the second lens element E2 has one inflection point.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric. The object-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The object-side surface of the sixth lens element E6 is cemented to the image-side surface of the fifth lens element E5.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The equation of the aspheric surface profiles of the aforementioned lens elements of the 1st embodiment is expressed as follows:

$$X(Y) = \left(Y^2/R\right) \Big/ \left(1 + sqrt\left(1 - (1+k) \times \left(Y/R\right)^2\right)\right) + \sum_i (Ai) \times \left(Y^i\right),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22 and 24.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=1.40 millimeters (mm), Fno=1.93, HFOV=95.0 degrees (deg.).

When half of the maximum field of view of the optical imaging lens assembly is HFOV, the following condition is satisfied: 1/|tan(HFOV)|=0.087.

When an axial distance between the object-side surface of the first lens element E1 and the image surface IMG is TL, and an axial distance between the aperture stop ST and the image surface IMG is SL, the following condition is satisfied: TL/SL=3.44.

When the focal length of the optical imaging lens assembly is f, a focal length of the second lens element E2 is f2, a focal length of the fifth lens element E5 is f5, and a focal length of the seventh lens element E7 is f7, the following condition is satisfied: (|f/f2|+|f/f5|)/|f/f7|=2.72.

When the focal length of the optical imaging lens assembly is f, a focal length of the first lens element E1 is f1, the focal length of the second lens element E2 is f2, a focal length of the third lens element E3 is f3, a focal length of the fourth lens element E4 is f4, the focal length of the fifth lens element E5 is f5, a focal length of the sixth lens element E6 is f6, the focal length of the seventh lens element E7 is f7, and a focal length of the i-th lens element is fi, the following condition is satisfied: Σ|f/fi|=2.31, wherein i=1, 2, 3, 4, 5, 6 and 7.

When the focal length of the second lens element E2 is f2, and the focal length of the fourth lens element E4 is f4, the following condition is satisfied: f4/f2=−0.64.

When the focal length of the fourth lens element E4 is f4, and the focal length of the fifth lens element E5 is f5, the following condition is satisfied: f4/f5=−1.05.

When the focal length of the fourth lens element E4 is f4, and the focal length of the sixth lens element E6 is f6, the following condition is satisfied: f4/f6=1.99.

When the focal length of the fifth lens element E5 is f5, and the focal length of the seventh lens element E7 is f7, the following condition is satisfied: f5/f7=0.59.

When the focal length of the fifth lens element E5 is f5, and the focal length of the sixth lens element E6 is f6, the following condition is satisfied: |f6/f5|=0.53.

When a curvature radius of the object-side surface of the first lens element E1 is R1, and a curvature radius of the object-side surface of the third lens element E3 is R5, and the following condition is satisfied: (R1+R5)/(R1−R5) =0.80.

When the curvature radius of the object-side surface of the third lens element E3 is R5, and a curvature radius of the image-side surface of the seventh lens element E7 is R14, the following condition is satisfied: (R5+R14)/(R5−R14)=−0.52.

When a curvature radius of the object-side surface of the fourth lens element E4 is R7, and a curvature radius of the object-side surface of the seventh lens element E7 is R13, the following condition is satisfied: (R7+R13)/(R7−R13)= −0.57.

When the curvature radius of the object-side surface of the third lens element E3 is R5, and a curvature radius of the image-side surface of the fifth lens element E5 is R10, the following condition is satisfied: |R5/R10|=0.91.

When the curvature radius of the object-side surface of the fourth lens element E4 is R7, and a curvature radius of the object-side surface of the sixth lens element E6 is R11, the following condition is satisfied: R11/R7=0.58.

When the curvature radius of the image-side surface of the fifth lens element E5 is R10, the curvature radius of the object-side surface of the sixth lens element E6 is R11, and the focal length of the optical imaging lens assembly is f, the following condition is satisfied: |R10−R11|×10/f=0.21.

When a sum of central thicknesses of all lens elements of the optical imaging lens assembly is ΣCT, and a sum of axial distances between each of all adjacent lens elements of the optical imaging lens assembly is ΣAT, the following condition is satisfied: ΣCT/ΣAT=0.94. In this embodiment, ΣCT is a sum of central thicknesses of the first lens element E1, the second lens element E2, the third lens element E3, the fourth lens element E4, the fifth lens element E5, the sixth lens element E6, and the seventh lens element E7. In this embodiment, ΣAT is a sum of axial distances between the first lens element E1 and the second lens element E2, the second lens element E2 and the third lens element E3, the third lens element E3 and the fourth lens element E4, the fourth lens element E4 and the fifth lens element E5, the fifth lens element E5 and the sixth lens element E6, and the sixth lens element E6 and the seventh lens element E7. In this embodiment, an axial distance between two adjacent lens elements is a distance in a paraxial region between two adjacent lens surfaces of the two adjacent lens elements.

When an axial distance between the object-side surface of the first lens element E1 and the image-side surface of the fourth lens element E4 is Dr1r8, and an axial distance between the object-side surface of the fifth lens element E5 and the image-side surface of the seventh lens element E7 is Dr9r14, the following condition is satisfied: Dr1r8/Dr9r14=5.50.

When the axial distance between the object-side surface of the fifth lens element E5 and the image-side surface of the seventh lens element E7 is Dr9r14, and an axial distance between the second lens element E2 and the third lens element E3 is T23, the following condition is satisfied: Dr9r14/T23=0.63.

When the axial distance between the second lens element E2 and the third lens element E3 is T23, and an axial distance between the image-side surface of the seventh lens element E7 and the image surface IMG is BL, the following condition is satisfied: T23/BL=1.04.

When a central thickness of the first lens element E1 is CT1, and a central thickness of the seventh lens element E7 is CT7, the following condition is satisfied: CT1/CT7=6.58.

When a central thickness of the third lens element E3 is CT3, and the axial distance between the second lens element E2 and the third lens element E3 is T23, the following condition is satisfied: CT3/T23=0.17.

When the central thickness of the third lens element E3 is CT3, and a central thickness of the fourth lens element E4 is CT4, the following condition is satisfied: CT3/CT4=0.32.

When the central thickness of the third lens element E3 is CT3, and an axial distance between the fourth lens element E4 and the fifth lens element E5 is T45, the following condition is satisfied: CT3/T45=0.39.

When the central thickness of the first lens element E1 is CT1, and a central thickness of the fifth lens element E5 is CT5, the following condition is satisfied: CT5/CT1=0.13.

When an axial distance between the third lens element E3 and the fourth lens element E4 is T34, and the axial distance between the fourth lens element E4 and the fifth lens element E5 is T45, the following condition is satisfied: T34/T45=0.05.

When an axial distance between the fifth lens element E5 and the sixth lens element E6 is T56, the following condition is satisfied: T56=0.029 mm.

When an Abbe number of the third lens element E3 is V3, and an Abbe number of the fifth lens element E5 is V5, the following condition is satisfied: V3/V5=2.87.

When an Abbe number of the seventh lens element E7 is V7, the following condition is satisfied: V7=21.8.

When a displacement in parallel with the optical axis from an axial vertex on the object-side surface of the third lens element E3 to a maximum effective radius position on the object-side surface of the third lens element E3 is Sag3R1, and the central thickness of the third lens element E3 is CT3, the following condition is satisfied: Sag3R1/CT3=−1.83.

When a displacement in parallel with the optical axis from an axial vertex on the object-side surface of the seventh lens element E7 to a maximum effective radius position on the object-side surface of the seventh lens element E7 is Sag7R1, and a central thickness of the sixth lens element E6 is CT6, the following condition is satisfied: Sag7R1/CT6=−0.30.

When a maximum image height of the optical imaging lens assembly is ImgH, and a maximum effective radius of the image-side surface of the seventh lens element E7 is Y7R2, the following condition is satisfied: ImgH/Y7R2=1.71.

The detailed optical data of the 1st embodiment are shown in Table 1A and the aspheric surface data are shown in Table 1B below.

TABLE 1A

| 1st Embodiment f = 1.40 mm, Fno = 1.93, HFOV = 95.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 16.0100 (ASP) | 1.600 | Glass | 1.804 | 46.6 | −5.32 |
| 2 | | 3.2248 (ASP) | 2.134 | | | | |
| 3 | Lens 2 | 10.7731 (ASP) | 0.639 | Glass | 1.487 | 70.4 | −5.74 |
| 4 | | 2.1769 (ASP) | 2.485 | | | | |
| 5 | Lens 3 | −1.8051 (ASP) | 0.419 | Plastic | 1.544 | 56.0 | 45.87 |
| 6 | | −1.8210 (ASP) | 0.000 | | | | |
| 7 | Stop | Plano | 0.050 | | | | |
| 8 | Lens 4 | 3.3535 (ASP) | 1.292 | Glass | 1.786 | 43.9 | 3.68 |

TABLE 1A-continued

1st Embodiment
f = 1.40 mm, Fno = 1.93, HFOV = 95.0 deg.

| Surface # | | Curvature Radius | | Thickness | Material | Index | Abbe # | Focal Length |
|---|---|---|---|---|---|---|---|---|
| 9 | | −17.5864 | (ASP) | 1.062 | | | | |
| 10 | Ape. Stop | Plano | | 0.024 | | | | |
| 11 | Lens 5 | 12.9232 | (ASP) | 0.213 | Plastic | 1.669 | 19.5 | −3.52 |
| 12 | | 1.9770 | (ASP) | 0.029 | Cemented | 1.485 | 53.2 | — |
| 13 | Lens 6 | 1.9480 | (ASP) | 1.053 | Plastic | 1.544 | 56.0 | 1.85 |
| 14 | | −1.6793 | (ASP) | −0.370 | | | | |
| 15 | Stop | Plano | | 0.400 | | | | |
| 16 | Lens 7 | −12.1175 | (ASP) | 0.243 | Plastic | 1.650 | 21.8 | −5.94 |
| 17 | | 5.7032 | (ASP) | 0.700 | | | | |
| 18 | Filter | Plano | | 0.300 | Glass | 1.517 | 64.2 | — |
| 19 | | Plano | | 1.382 | | | | |
| 20 | Image | Plano | | — | | | | |

Note:
Reference wavelength is 587.6 nm (d-line).
An effective radius of the stop S1 (Surface 7) is 1.920 mm.
An effective radius of the stop S2 (Surface 15) is 1.108 mm.

TABLE 1B

Aspheric Coefficients

| Surface # | 1 | 2 | 3 | 4 |
|---|---|---|---|---|
| k= | −1.5205100E+00 | −5.1739400E−02 | 9.6571400E+00 | 7.8794000E−03 |
| A4= | 2.5720551E−06 | −6.8846386E−04 | 4.1117557E−03 | 9.9331404E−03 |
| A6= | −8.4874679E−07 | −1.7351068E−05 | 1.6845227E−03 | 2.6030111E−03 |
| A8= | 4.5128944E−08 | 2.2480013E−05 | −5.4144218E−04 | 8.7381891E−04 |
| A10= | −3.7717658E−10 | −1.5069268E−06 | 4.2949130E−05 | −6.1303832E−04 |
| A12= | — | — | −1.2040191E−06 | 5.4100608E−05 |

| Surface # | 5 | 6 | 8 | 9 |
|---|---|---|---|---|
| k= | −3.5350300E+00 | −4.6082500E+00 | 0.0000000E+00 | 0.0000000E+00 |
| A4= | −8.0037815E−02 | −5.8136035E−02 | 2.1115319E−02 | −3.8802283E−03 |
| A6= | 7.8711993E−02 | 4.9340252E−02 | −1.7223569E−02 | 3.5788866E−03 |
| A8= | −5.9313811E−02 | −3.5966194E−02 | 8.5949677E−03 | −2.1110446E−03 |
| A10= | 3.5631269E−02 | 2.2559688E−02 | −2.7043089E−03 | 8.4809748E−04 |
| A12= | −1.6299105E−02 | −1.1265180E−02 | 4.9484965E−04 | −2.0115387E−04 |
| A14= | 5.7049115E−03 | 4.4920143E−03 | −4.2016153E−05 | 1.6380679E−05 |
| A16= | −1.4812283E−03 | −1.3791883E−03 | — | — |
| A18= | 2.6500344E−04 | 3.0460495E−04 | — | — |
| A20= | −2.8634824E−05 | −4.4277624E−05 | — | — |
| A22= | 1.3896496E−06 | 3.7097372E−06 | — | — |
| A24= | — | −1.3345996E−07 | — | — |

| Surface # | 11 | 12 | 13 | 14 |
|---|---|---|---|---|
| k= | −8.8331600E+01 | −2.8329500E+01 | 6.1253300E−01 | −1.6218400E+01 |
| A4= | −3.3273603E−03 | 5.4613651E−01 | 3.2235650E−01 | −3.4259633E−01 |
| A6= | −3.2096406E−02 | −1.9339713E+00 | −2.4862798E+00 | 8.7823860E−01 |
| A8= | 5.6770839E−02 | 4.6963411E+00 | 6.8488847E+00 | −2.2214597E+00 |
| A10= | −6.7619615E−02 | −6.1704000E+00 | −8.6167385E+00 | 4.0579121E+00 |
| A12= | 2.5997924E−02 | 2.8820890E+00 | 3.6997987E+00 | −5.0912308E+00 |
| A14= | — | 2.4296083E+00 | 1.0573497E+00 | 4.1495474E+00 |
| A16= | — | −3.6517670E+00 | 6.9354688E−01 | −2.0509571E+00 |
| A18= | — | 1.4638516E+00 | −2.7282091E+00 | 5.3236010E−01 |
| A20= | — | −1.4436461E−01 | 1.1686377E+00 | −4.8664287E−02 |

| Surface # | 16 | 17 |
|---|---|---|
| k= | 8.9659500E+00 | −5.4122400E+01 |
| A4= | −1.7368377E−01 | −1.8860777E−01 |
| A6= | 8.2008030E−02 | 1.6703978E−01 |
| A8= | 3.7061159E−01 | −5.7464353E−02 |
| A10= | −2.6903157E+00 | −4.4245958E−01 |
| A12= | 7.8435005E+00 | 1.2300744E+00 |
| A14= | −1.3699744E+01 | −1.7289847E+00 |
| A16= | 1.5460371E+01 | 1.5084044E+00 |

TABLE 1B-continued

| Aspheric Coefficients | | |
| --- | --- | --- |
| A18= | −1.1430179E+01 | −8.4566465E−01 |
| A20= | 5.3794420E+00 | 2.9690716E−01 |
| A22= | −1.4730512E+00 | −5.9434314E−02 |
| A24= | 1.8073467E−01 | 5.1731513E−03 |

In Table 1A, the curvature radius, the thickness and the focal length are shown in millimeters (mm). Surface numbers 0-20 represent the surfaces sequentially arranged from the object side to the image side along the optical axis. In Table 1B, k represents the conic coefficient of the equation of the aspheric surface profiles. A4-A24 represent the aspheric coefficients ranging from the 4th order to the 24th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
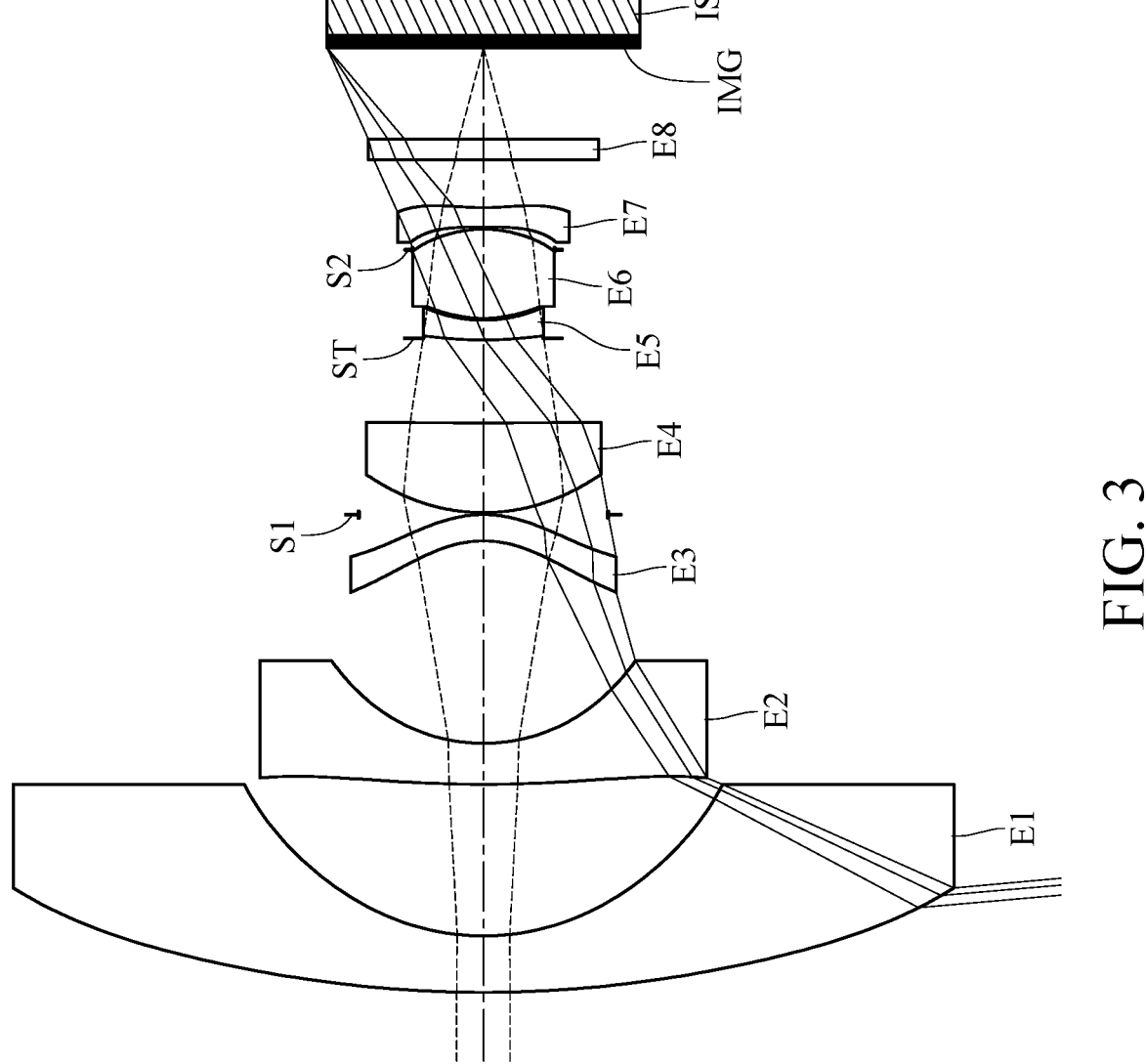
FIG. 3 is a schematic view of an image capturing unit according to the 2nd embodiment of the present disclosure.
Figure 4:
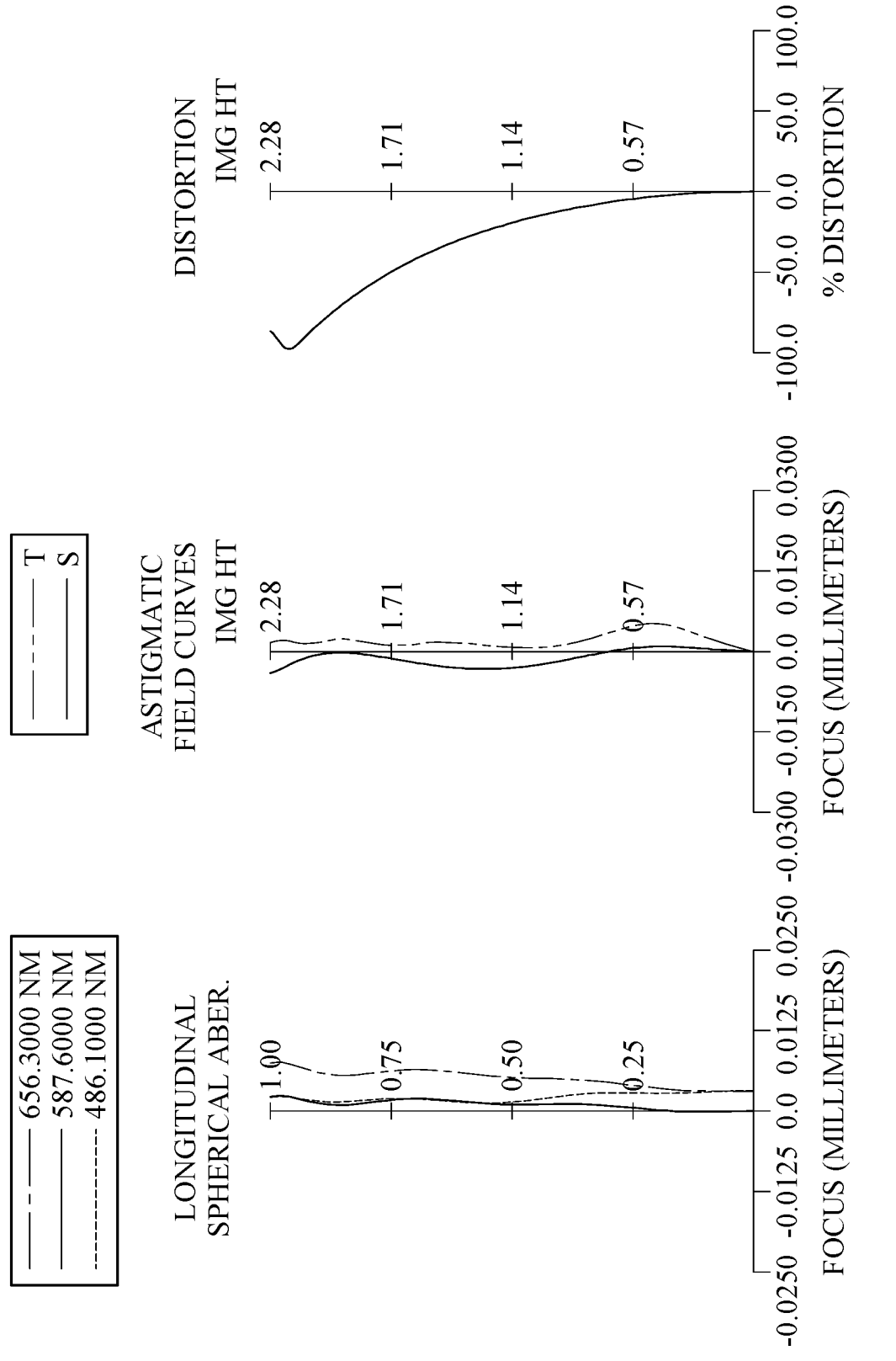
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a stop S1, a fourth lens element E4, an aperture stop ST, a fifth lens element E5, a sixth lens element E6, a stop S2, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of glass material and has the object-side surface and the image-side surface being both aspheric. The object-side surface of the second lens element E2 has one inflection point. The object-side surface of the second lens element E2 has one concave critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points.

The fourth lens element E4 with positive refractive power has an object-side surface being convex in a paraxial region thereof and an image-side surface being concave in a paraxial region thereof. The fourth lens element E4 is made of glass material and has the object-side surface and the image-side surface being both aspheric. The object-side surface of the fourth lens element E4 has one inflection point. The image-side surface of the fourth lens element E4 has one inflection point. The image-side surface of the fourth lens element E4 has one convex critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 is cemented to the image-side surface of the fifth lens element E5.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The detailed optical data of the 2nd embodiment are shown in Table 2A and the aspheric surface data are shown in Table 2B below.

TABLE 2A

| | | | | | | | |
|---|---|---|---|---|---|---|---|
| | | | 2nd Embodiment |  |  |  | |
| | | | f = 1.51 mm, Fno = 1.93, HFOV = 95.1 deg. | | | | |
| Surface # | | Curvature Radius | Thickness | Material | Index | Abbe # | Focal Length |
| 0 | Object | Plano | Infinity | | | | |
| 1 | Lens 1 | 17.6162 (ASP) | 0.824 | Glass | 1.611 | 55.8 | −7.36 |
| 2 | | 3.5211 (ASP) | 2.213 | | | | |
| 3 | Lens 2 | 16.1276 (ASP) | 0.600 | Glass | 1.620 | 60.3 | −4.99 |
| 4 | | 2.5608 (ASP) | 2.958 | | | | |
| 5 | Lens 3 | −1.5482 (ASP) | 0.383 | Plastic | 1.544 | 56.0 | −65.17 |
| 6 | | −1.7600 (ASP) | 0.000 | | | | |
| 7 | Stop | Plano | 0.030 | | | | |
| 8 | Lens 4 | 2.8358 (ASP) | 1.309 | Glass | 1.773 | 49.5 | 3.83 |
| 9 | | 55.5556 (ASP) | 1.235 | | | | |
| 10 | Ape. Stop | Plano | −0.023 | | | | |
| 11 | Lens 5 | 5.3893 (ASP) | 0.288 | Plastic | 1.669 | 19.5 | −4.66 |
| 12 | | 1.9322 (ASP) | 0.029 | Cemented | 1.485 | 53.2 | — |
| 13 | Lens 6 | 1.7278 (ASP) | 1.303 | Plastic | 1.544 | 56.0 | 1.83 |
| 14 | | −1.7224 (ASP) | −0.300 | | | | |
| 15 | Stop | Plano | 0.333 | | | | |
| 16 | Lens 7 | −13.4957 (ASP) | 0.281 | Plastic | 1.639 | 23.5 | −4.49 |
| 17 | | 3.6713 (ASP) | 0.700 | | | | |
| 18 | Filter | Plano | 0.300 | Glass | 1.517 | 64.2 | — |
| 19 | | Plano | 1.336 | | | | |
| 20 | Image | Plano | — | | | | |

Note:
Reference wavelength is 587.6 nm (d-line).
An effective radius of the stop S1 (Surface 7) is 1.820 mm.
An effective radius of the stop S2 (Surface 15) is 1.037 mm.

TABLE 2B

| | | | | |
|---|---|---|---|---|
| | | Aspheric Coefficients | | |
| Surface # | 1 | 2 | 3 | 4 |
| k= | −7.4308600E−01 | −1.2270000E−01 | −8.1397200E+01 | −7.0505900E−02 |
| A4= | 1.1436432E−04 | −2.6286740E−04 | −9.1083622E−04 | −1.7918539E−03 |
| A6= | −1.6669375E−05 | −4.5807474E−05 | 2.0724335E−04 | 6.9245038E−04 |
| A8= | 7.2240792E−07 | −9.6693873E−06 | −3.4383460E−05 | 4.1843877E−05 |
| A10= | −1.1502149E−08 | 1.8357176E−07 | −9.7031904E−08 | −1.9722915E−05 |
| A12= | 7.0890199E−11 | −5.7654776E−09 | 2.1844449E−07 | −5.9979239E−06 |
| A14= | — | — | −8.3097711E−09 | 6.4439682E−07 |
| Surface # | 5 | 6 | 8 | 9 |
| k= | −4.4631800E+00 | −5.7632500E+00 | 0.0000000E+00 | 0.0000000E+00 |
| A4= | −8.6496508E−02 | −7.3768699E−02 | 3.4037623E−03 | −7.5841415E−03 |
| A6= | 9.3339632E−02 | 7.9042988E−02 | −6.1955315E−03 | 8.5188363E−03 |
| A8= | −7.7044469E−02 | −6.4155940E−02 | 5.8821656E−03 | −5.6365564E−03 |
| A10= | 5.5358632E−02 | 4.6429350E−02 | −3.9057014E−03 | 2.2011556E−03 |
| A12= | −3.1014957E−02 | −2.6380331E−02 | 1.6769439E−03 | −4.0271132E−04 |
| A14= | 1.2602252E−02 | 1.0912047E−02 | −4.5765030E−04 | −9.1474141E−05 |
| A16= | −3.5262168E−03 | −3.1276654E−03 | 7.0589781E−05 | 4.4425974E−05 |
| A18= | 6.3853067E−04 | 5.8884117E−04 | −5.0879209E−06 | −4.4707250E−06 |
| A20= | −6.7082676E−05 | −6.6916128E−05 | — | — |
| A22= | 3.0979415E−06 | 3.8379097E−06 | — | — |
| A24= | — | −6.3290573E−08 | — | — |
| Surface # | 11 | 12 | 13 | 14 |
| k= | 5.3711500E−01 | −2.8144900E+01 | −4.1159500E−02 | −1.9613400E+01 |
| A4= | −1.0417357E−02 | 4.2304950E−01 | −1.4710056E−01 | −4.1598882E−01 |
| A6= | −9.7916374E−03 | −1.4235976E+00 | −4.6439734E−01 | 1.2806596E+00 |
| A8= | 3.9859936E−03 | 4.7863109E+00 | 4.9022352E+00 | −3.5533170E+00 |
| A10= | −1.6091532E−02 | −1.3137366E+01 | −2.2461605E+01 | 7.0867697E+00 |
| A12= | 7.0675838E−03 | 2.7854575E+01 | 6.5353865E+01 | −9.8995223E+00 |
| A14= | — | −4.1987502E+01 | −1.1834081E+02 | 9.3439865E+00 |
| A16= | — | 4.0343165E+01 | 1.2626903E+02 | −5.6616169E+00 |
| A18= | — | −2.1580530E+01 | −7.2158817E+01 | 1.9843670E+00 |
| A20= | — | 4.8409773E+00 | 1.6984141E+01 | −3.0597155E−01 |

TABLE 2B-continued

| | Aspheric Coefficients | |
|---|---|---|
| Surface # | 16 | 17 |
| k= | −8.5568400E+01 | −1.3085500E+01 |
| A4= | −2.1073351E−01 | −2.0985065E−01 |
| A6= | 3.5106066E−01 | 2.9127945E−01 |
| A8= | −8.2158986E−01 | −4.7427381E−01 |
| A10= | 1.1069874E+00 | 6.1004775E−01 |
| A12= | −6.6878409E−01 | −5.7285183E−01 |
| A14= | −3.0672820E−01 | 3.6765034E−01 |
| A16= | 7.9186267E−01 | −1.5046171E−01 |
| A18= | −4.9581238E−01 | 3.4984069E−02 |
| A20= | 1.0922437E−01 | −3.4839944E−03 |

In the 2nd embodiment, the equation of the aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| | Schematic Parameters | | |
|---|---|---|---|
| f [mm] | 1.51 | |R10 − R11| × 10/f | 1.36 |
| Fno | 1.93 | ΣCT/ΣAT | 0.77 |
| HFOV [deg.] | 95.1 | Dr1r8/Dr9r14 | 4.30 |
| 1/|tan(HFOV)| | 0.089 | Dr9r14/T23 | 0.65 |
| TL/SL | 3.25 | T23/BL | 1.27 |
| (|f/f2| + |f/f5|)/|f/f7| | 1.86 | CT1/CT7 | 2.93 |
| Σ|f/fi| | 2.41 | CT3/T23 | 0.13 |
| f4/f2 | −0.77 | CT3/CT4 | 0.29 |
| f4/f5 | −0.82 | CT3/T45 | 0.32 |
| f4/f6 | 2.09 | CT5/CT1 | 0.35 |
| f5/f7 | 1.04 | T34/T45 | 0.02 |
| |f6/f5| | 0.39 | T56 [mm] | 0.029 |
| (R1 + R5)/(R1 − R5) | 0.84 | V3/V5 | 2.87 |
| (R5 + R14)/(R5 − R14) | −0.41 | V7 | 23.5 |
| (R7 + R13)/(R7 − R13) | −0.65 | Sag3R1/CT3 | −1.96 |
| |R5/R10| | 0.80 | Sag7R1/CT6 | −0.17 |
| R11/R7 | 0.61 | ImgH/Y7R2 | 1.82 |

3rd Embodiment

Figure 5:
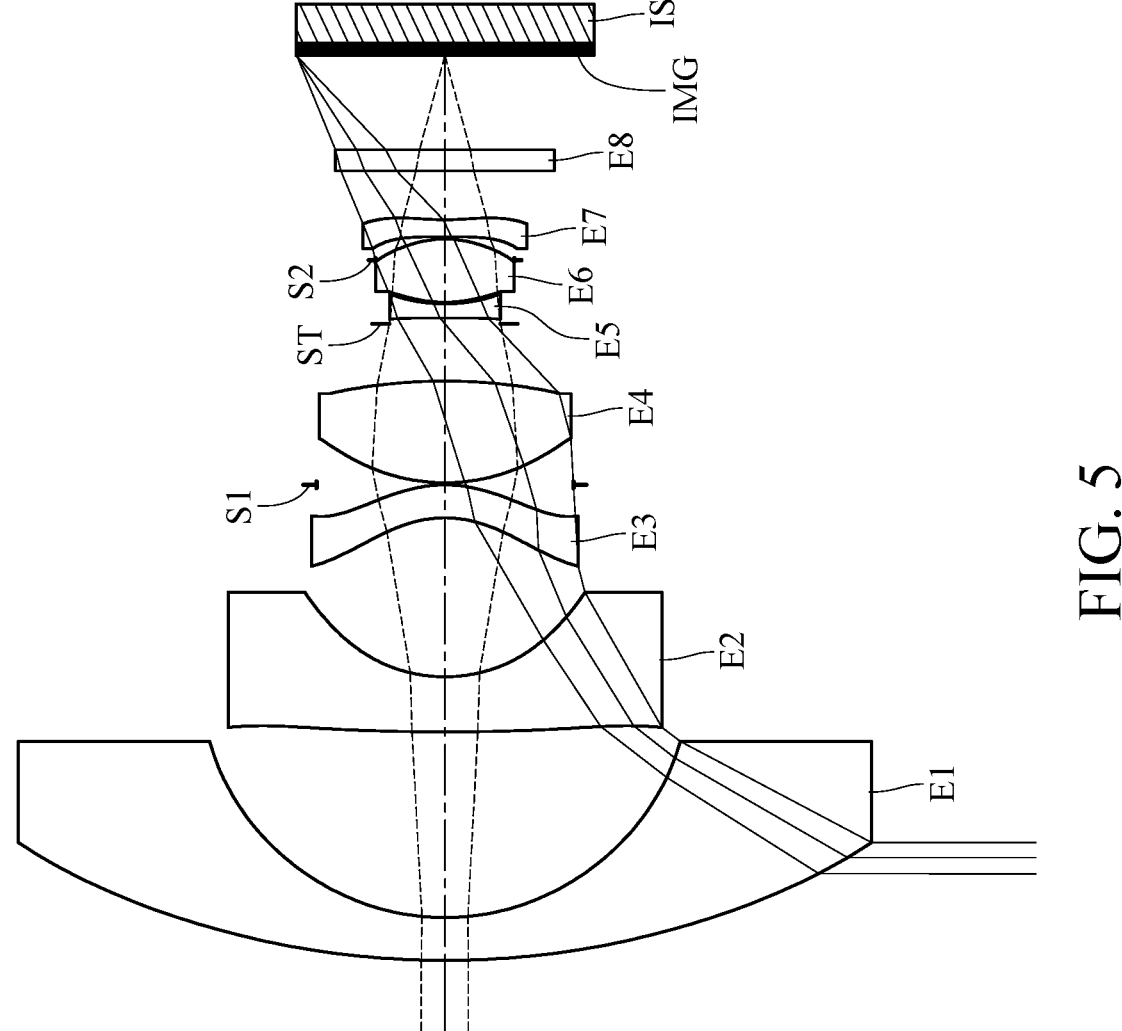
FIG. 5 is a schematic view of an image capturing unit according to the 3rd embodiment of the present disclosure.
Figure 6:
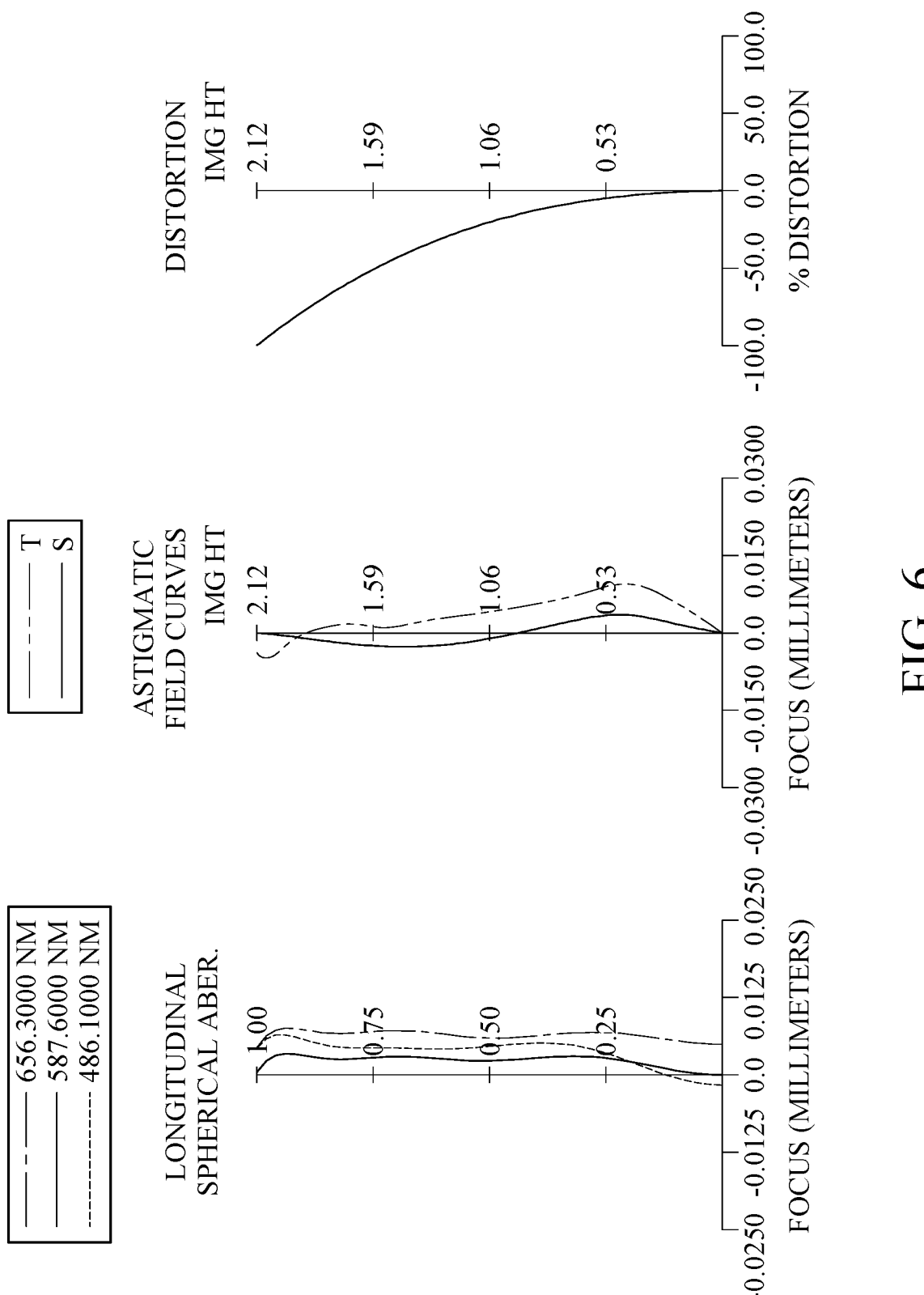
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a stop S1, a fourth lens element E4, an aperture stop ST, a fifth lens element E5, a sixth lens element E6, a stop S2, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of glass material and has the object-side surface and the image-side surface being both aspheric. The object-side surface of the second lens element E2 has one inflection point. The object-side surface of the second lens element E2 has one concave critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The image-side surface of the third lens element E3 has one concave critical point in an off-axis region thereof.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric. The object-side surface of the fourth lens element E4 has one inflection point.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 is cemented to the image-side surface of the fifth lens element E5.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The detailed optical data of the 3rd embodiment are shown in Table 3A and the aspheric surface data are shown in Table 3B below.

TABLE 3A

| | | | 3rd Embodiment<br>f = 1.30 mm, Fno = 1.93, HFOV = 89.9 deg. | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 12.4192 (ASP) | 0.610 | Glass | 1.757 | 47.7 | −6.36 |
| 2 | | 3.3954 (ASP) | 2.650 | | | | |
| 3 | Lens 2 | 25.4633 (ASP) | 0.788 | Glass | 1.487 | 70.4 | −4.84 |
| 4 | | 2.1386 (ASP) | 2.269 | | | | |
| 5 | Lens 3 | −1.6108 (ASP) | 0.470 | Plastic | 1.544 | 56.0 | −59.70 |
| 6 | | −1.8691 (ASP) | 0.000 | | | | |
| 7 | Stop | Plano | 0.030 | | | | |
| 8 | Lens 4 | 2.7330 (ASP) | 1.452 | Glass | 1.702 | 41.1 | 3.05 |
| 9 | | −7.6800 (ASP) | 0.815 | | | | |
| 10 | Ape. Stop | Plano | 0.086 | | | | |
| 11 | Lens 5 | −28.5714 (ASP) | 0.200 | Plastic | 1.680 | 18.2 | −3.24 |
| 12 | | 2.3910 (ASP) | 0.025 | Cemented | 1.485 | 53.2 | — |
| 13 | Lens 6 | 2.0708 (ASP) | 0.901 | Plastic | 1.544 | 56.0 | 1.72 |
| 14 | | −1.4455 (ASP) | −0.300 | | | | |
| 15 | Stop | Plano | 0.333 | | | | |
| 16 | Lens 7 | −464.9833 (ASP) | 0.242 | Plastic | 1.587 | 28.3 | −5.38 |
| 17 | | 3.1843 (ASP) | 0.700 | | | | |
| 18 | Filter | Plano | 0.300 | Glass | 1.517 | 64.2 | — |
| 19 | | Plano | 1.346 | | | | |
| 20 | Image | Plano | — | | | | |

Note:
Reference wavelength is 587.6 nm (d-line).
An effective radius of the stop S1 (Surface 7) is 1.833 mm.
An effective radius of the stop S2 (Surface 15) is 0.988 mm.

TABLE 3B

| | | Aspheric Coefficients | | |
|---|---|---|---|---|
| Surface # | 1 | 2 | 3 | 4 |
| k= | 1.4308200E+00 | −4.3306900E−01 | −7.5899300E+01 | −3.1229500E−01 |
| A4= | 2.9263010E−04 | 1.5507832E−03 | −5.1777184E−03 | 1.2841745E−03 |
| A6= | −1.3890092E−04 | −9.3005576E−04 | 3.2240464E−03 | 1.4579162E−03 |
| A8= | 4.3764051E−05 | 5.3851906E−04 | −7.9463276E−04 | 3.2336524E−03 |
| A10= | −8.2685761E−06 | −1.7272607E−04 | 9.1680671E−05 | −2.1451821E−03 |
| A12= | 9.3165825E−07 | 3.8198329E−05 | −5.1976198E−06 | 4.5031268E−04 |
| A14= | −6.6868121E−08 | −5.8643398E−06 | 1.1718196E−07 | −3.2088898E−05 |
| A16= | 3.1908247E−09 | 5.8633306E−07 | — | — |
| A18= | −1.0292527E−10 | −3.3269270E−08 | — | — |
| A20= | 2.2252155E−12 | 8.0223991E−10 | — | — |
| A22= | −3.0964619E−14 | — | — | — |
| A24= | 2.5109814E−16 | — | — | — |
| A26= | −9.0287113E−19 | — | — | — |

| Surface # | 5 | 6 | 8 | 9 |
|---|---|---|---|---|
| k= | −4.2096500E+00 | −6.7087300E+00 | 0.0000000E+00 | 0.0000000E+00 |
| A4= | −8.7269742E−02 | −7.4315430E−02 | 1.2256649E−02 | −2.7264697E−03 |
| A6= | 9.2761679E−02 | 7.9222186E−02 | −1.7746712E−02 | 3.6640464E−03 |
| A8= | −7.7455948E−02 | −6.4317517E−02 | 1.2427611E−02 | −1.5840775E−03 |
| A10= | 5.4864427E−02 | 4.6074045E−02 | −5.0640297E−03 | 5.7755883E−04 |
| A12= | −2.8203030E−02 | −2.3591759E−02 | 1.1176538E−03 | −2.0808859E−04 |
| A14= | 1.0102808E−02 | 8.0277426E−03 | −1.1152179E−04 | 2.3326344E−05 |
| A16= | −2.4806641E−03 | −1.5815488E−03 | — | — |
| A18= | 4.0134606E−04 | 7.0040789E−05 | — | — |
| A20= | −3.8756447E−05 | 4.4431432E−05 | — | — |
| A22= | 1.6952029E−06 | −1.0203208E−05 | — | — |
| A24= | — | 7.2414856E−07 | — | — |

TABLE 3B-continued

| Aspheric Coefficients | | | | |
|---|---|---|---|---|
| Surface # | 11 | 12 | 13 | 14 |
| k= | −9.0000000E+01 | −4.9375600E+01 | 4.0025000E−02 | −1.9955100E+01 |
| A4= | 1.1383764E−02 | 6.2079202E−01 | 3.6718843E−01 | −6.5102064E−01 |
| A6= | −8.2233750E−02 | −2.0599747E+00 | −1.6748399E+00 | 2.5840811E+00 |
| A8= | 1.7819446E−01 | 2.3861163E+00 | −6.4358876E+00 | −8.5966702E+00 |
| A10= | −3.2876632E−01 | 1.2786958E+01 | 6.9984830E+01 | 2.0580866E+01 |
| A12= | 3.4447163E−01 | −6.5204615E+01 | −2.4449905E+02 | −3.4344651E+01 |
| A14= | −1.9895247E−01 | 1.3749289E+02 | 4.5804269E+02 | 3.8666101E+01 |
| A16= | 5.2048425E−02 | −1.5640496E+02 | −4.9138908E+02 | −2.7942157E+01 |
| A18= | — | 9.3629139E+01 | 2.8451705E+02 | 1.1688162E+01 |
| A20= | — | −2.3069800E+01 | −6.8899317E+01 | −2.1510600E+00 |

| Surface # | 16 | 17 |
|---|---|---|
| k= | 9.0000000E+01 | −2.8571100E+01 |
| A4= | −2.2243004E−01 | −2.5150908E−01 |
| A6= | 1.6715145E−02 | 4.8648146E−01 |
| A8= | 3.7710577E+00 | −1.1310647E+00 |
| A10= | −3.1534049E+01 | 1.8878780E+00 |
| A12= | 1.5166745E+02 | −3.7557912E−01 |
| A14= | −5.0322170E+02 | −1.0255997E+01 |
| A16= | 1.2135568E+03 | 3.7722570E+01 |
| A18= | −2.1594049E+03 | −7.6517857E+01 |
| A20= | 2.8269935E+03 | 1.0146160E+02 |
| A22= | −2.6799197E+03 | −9.1106450E+01 |
| A24= | 1.7834320E+03 | 5.5002700E+01 |
| A26= | −7.8773755E+02 | −2.1400610E+01 |
| A28= | 2.0682540E+02 | 4.8487100E+00 |
| A30= | −2.4370559E+01 | −4.8593261E−01 |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Schematic Parameters | | | |
|---|---|---|---|
| f [mm] | 1.30 | \|R10 − R11\| × 10/f | 2.47 |
| Fno | 1.93 | ΣCT/ΣAT | 0.79 |
| HFOV [deg.] | 89.9 | Dr1r8/Dr9r14 | 5.90 |
| 1/\|tan(HFOV)\| | 0.002 | Dr9r14/T23 | 0.62 |
| TL/SL | 3.37 | T23/BL | 0.97 |
| (\|f/f2\| + \|f/f5\|)/\|f/f7\| | 2.78 | CT1/CT7 | 2.52 |
| Σ\|f/fi\| | 2.31 | CT3/T23 | 0.21 |
| f4/f2 | −0.63 | CT3/CT4 | 0.32 |
| f4/f5 | −0.94 | CT3/T45 | 0.52 |
| f4/f6 | 1.77 | CT5/CT1 | 0.33 |
| f5/f7 | 0.60 | T34/T45 | 0.03 |
| \|f6/f5\| | 0.53 | T56 [mm] | 0.025 |
| (R1 + R5)/(R1 − R5) | 0.77 | V3/V5 | 3.08 |
| (R5 + R14)/(R5 − R14) | −0.33 | V7 | 28.3 |
| (R7 + R13)/(R7 − R13) | −0.99 | Sag3R1/CT3 | −1.47 |
| \|R5/R10\| | 0.67 | Sag7R1/CT6 | −0.19 |
| R11/R7 | 0.76 | ImgH/Y7R2 | 1.82 |

4th Embodiment

Figure 7:
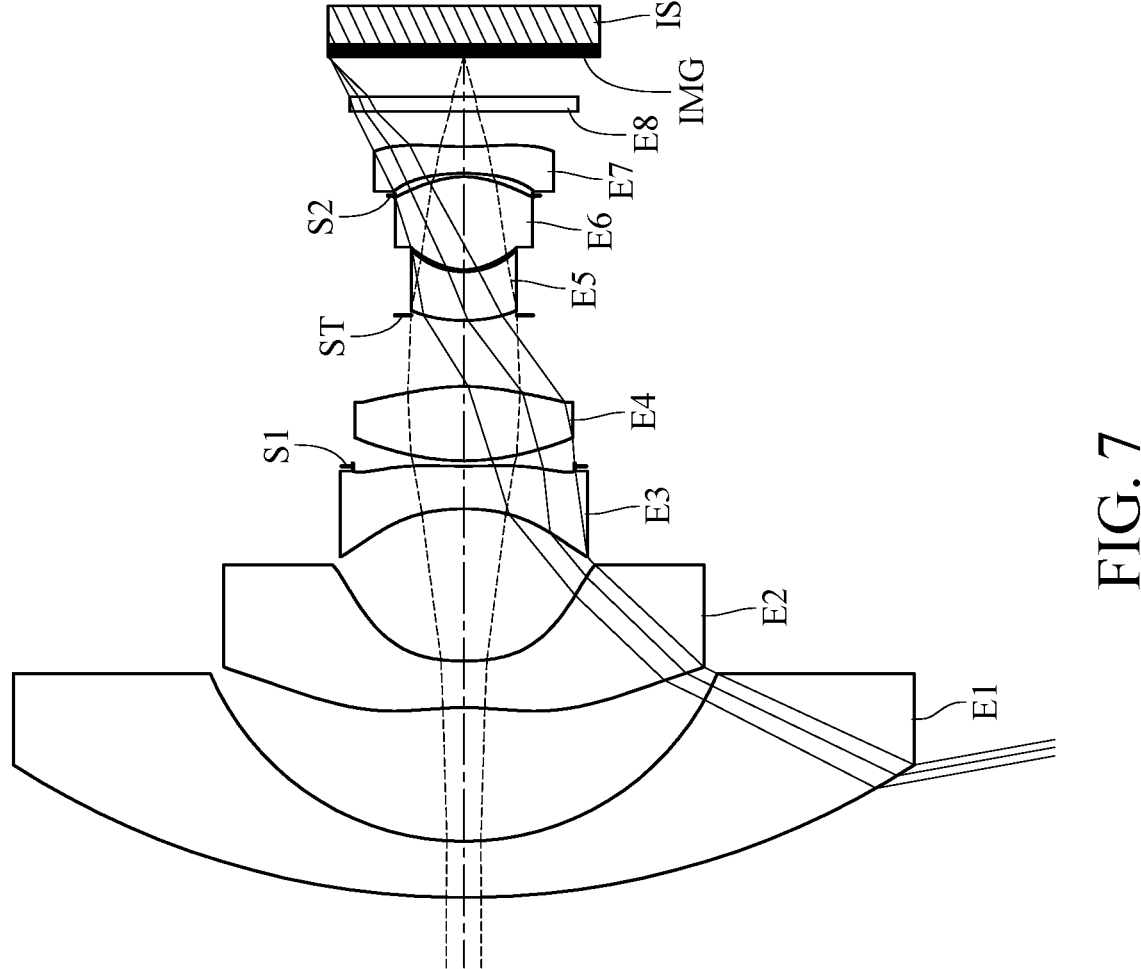
FIG. 7 is a schematic view of an image capturing unit according to the 4th embodiment of the present disclosure.
Figure 8:
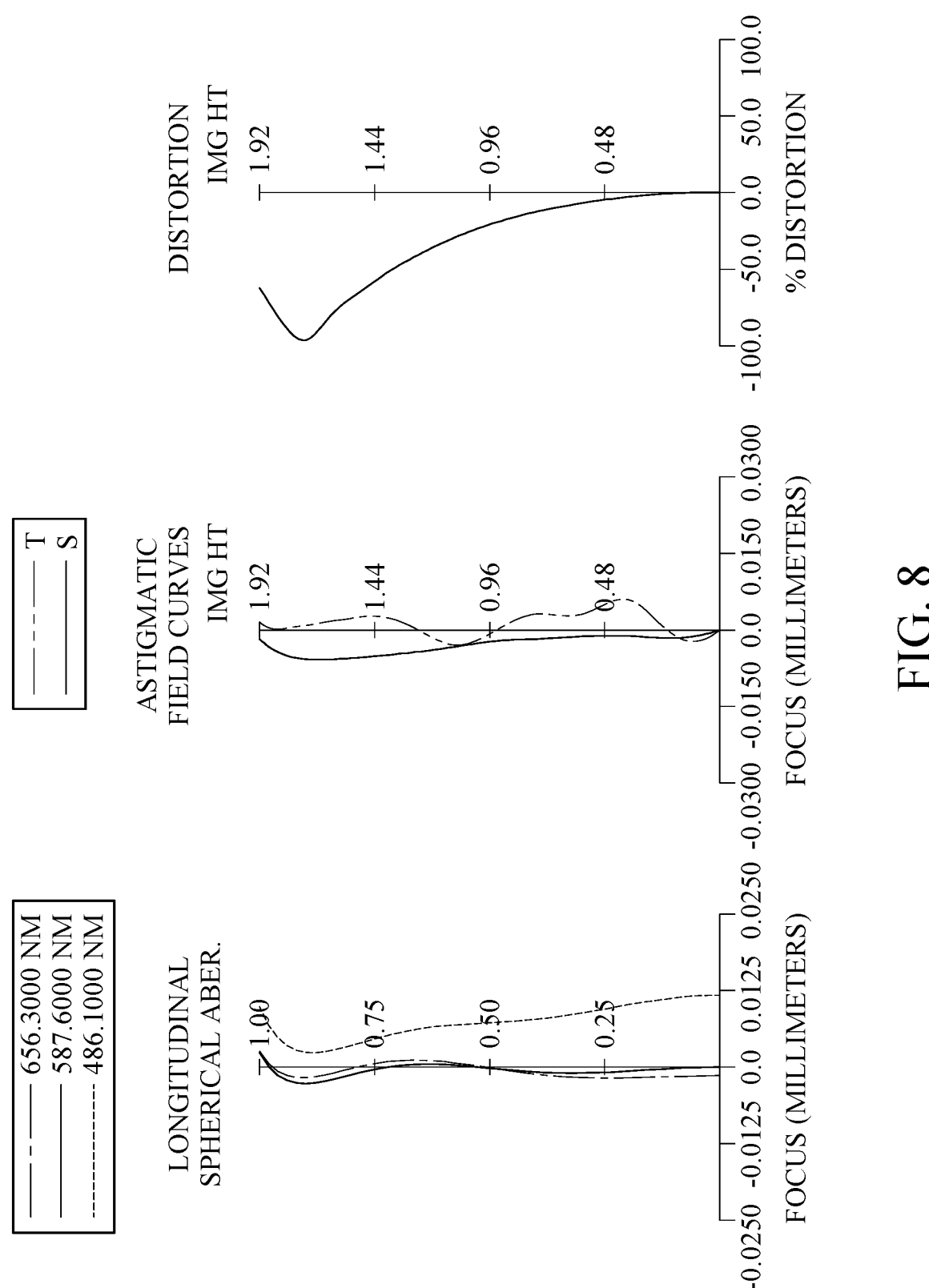
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a stop S1, a fourth lens element E4, an aperture stop ST, a fifth lens element E5, a sixth lens element E6, a stop S2, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has three inflection points. The image-side surface of the second lens element E2 has one inflection point. The object-side surface of the second lens element E2 has one convex critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The image-side surface of the third lens element E3 has two inflection points. The image-side surface of the third lens element E3 has one concave critical point and one convex critical point in an off-axis region thereof.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The image-side surface of the sixth lens element E6 has one inflection point. The object-side surface of the sixth lens element E6 is cemented to the image-side surface of the fifth lens element E5.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The detailed optical data of the 4th embodiment are shown in Table 4A and the aspheric surface data are shown in Table 4B below.

TABLE 4A

| 4th Embodiment f = 0.92 mm, Fno = 1.85, HFOV = 100.3 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 11.8482 (SPH) | 0.800 | Glass | 1.729 | 54.7 | −8.40 |
| 2 | | 3.9233 (SPH) | 1.912 | | | | |
| 3 | Lens 2 | −3.7535 (ASP) | 0.664 | Plastic | 1.544 | 56.0 | −3.19 |
| 4 | | 3.4278 (ASP) | 2.172 | | | | |
| 5 | Lens 3 | −3.1573 (ASP) | 0.609 | Plastic | 1.544 | 56.0 | −4.29 |
| 6 | | 9.5638 (ASP) | 0.000 | | | | |
| 7 | Stop | Plano | 0.078 | | | | |
| 8 | Lens 4 | 3.3731 (ASP) | 1.061 | Glass | 1.693 | 53.2 | 2.43 |
| 9 | | −2.9315 (ASP) | 1.016 | | | | |
| 10 | Ape. Stop | Plano | −0.075 | | | | |
| 11 | Lens 5 | 2.2870 (ASP) | 0.695 | Plastic | 1.669 | 19.5 | −4.19 |
| 12 | | 1.1056 (ASP) | 0.030 | Cemented | 1.485 | 53.2 | — |
| 13 | Lens 6 | 0.8044 (ASP) | 1.327 | Plastic | 1.544 | 56.0 | 1.14 |
| 14 | | −1.1221 (ASP) | −0.270 | | | | |
| 15 | Stop | Plano | 0.320 | | | | |
| 16 | Lens 7 | −2.3075 (ASP) | 0.380 | Plastic | 1.669 | 19.5 | −2.42 |
| 17 | | 5.7782 (ASP) | 0.500 | | | | |
| 18 | Filter | Plano | 0.210 | Glass | 1.517 | 64.2 | — |
| 19 | | Plano | 0.569 | | | | |
| 20 | Image | Plano | — | | | | |

Note:
Reference wavelength is 587.6 nm (d-line).
An effective radius of the stop S1 (Surface 7) is 1.583 mm.
An effective radius of the stop S2 (Surface 15) is 0.985 mm.

TABLE 4B

| Aspheric Coefficients | | | | |
|---|---|---|---|---|
| Surface # | 3 | 4 | 5 | 6 |
| k= | −4.7816400E+01 | 5.8363500E−01 | 9.3213800E−01 | 2.3975800E+01 |
| A4= | 4.6660200E−02 | 1.5211300E−01 | −8.6436100E−02 | −1.0984000E−01 |
| A6= | −1.1399900E−02 | −9.6386600E−02 | 6.0362800E−02 | 5.1511900E−02 |
| A8= | 1.7871100E−03 | 9.2646400E−02 | −3.2806000E−02 | −3.2297600E−02 |
| A10= | −1.8927300E−04 | −5.9997100E−02 | 1.3768400E−02 | 2.1713700E−02 |
| A12= | 1.2655300E−05 | 2.2656500E−02 | −3.0401200E−03 | −8.9759400E−03 |
| A14= | −4.7557300E−07 | −4.5112900E−03 | 2.7095800E−04 | 2.1072500E−03 |
| A16= | 7.6707700E−09 | 3.5697300E−04 | −1.5405800E−06 | −2.0542300E−04 |
| Surface # | 8 | 9 | 11 | 12 |
| k= | −2.7223400E+00 | 0.0000000E+00 | −5.6811900E+00 | 1.6373200E−01 |
| A4= | 1.4428800E−03 | 6.3309500E−02 | 1.3166300E−01 | 4.5108800E−02 |

TABLE 4B-continued

| | | Aspheric Coefficients | | |
|---|---|---|---|---|
| A6= | −6.3739600E−03 | −1.7389700E−02 | −8.6795900E−02 | 1.5672600E−01 |
| A8= | 3.8749400E−03 | 1.7341500E−03 | 1.0882500E−01 | −7.9462800E−01 |
| A10= | −6.0678800E−04 | 3.3999000E−05 | −1.6964800E−01 | 1.5366300E+00 |
| A12= | — | — | 1.6429000E−01 | −1.3314300E+00 |
| A14= | — | — | −7.6766200E−02 | 2.1328400E−01 |

| Surface # | 13 | 14 | 16 | 17 |
|---|---|---|---|---|
| k= | −3.6710300E+00 | −6.1537500E+00 | 8.7088000E−01 | −3.2805900E+01 |
| A4= | 2.5375400E−01 | 3.2729700E−01 | 5.7730800E−01 | −1.6236900E−02 |
| A6= | −2.1740800E−01 | −2.2475700E+00 | −2.9438300E+00 | −3.1106400E−01 |
| A8= | −9.2526900E−01 | 6.2064300E+00 | 7.7543800E+00 | 6.8945200E−01 |
| A10= | 4.6107300E+00 | −9.6393300E+00 | −1.3256500E+01 | −8.5293100E−01 |
| A12= | −5.6423500E+00 | 8.7601800E+00 | 1.5383600E+01 | 6.7276400E−01 |
| A14= | 2.1013100E+00 | −4.3539700E+00 | −1.1900200E+01 | −3.3662100E−01 |
| A16= | — | 9.2165700E−01 | 5.5479800E+00 | 9.6523500E−02 |
| A18= | — | — | −1.1821500E+00 | −1.2051200E−02 |

In the 4th embodiment, the equation of the aspheric surface profiles of the aforementioned lens elements is the same as the equation of the 1st embodiment. Also, the definitions of these parameters shown in Table 4C are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Schematic Parameters | | | |
|---|---|---|---|
| f [mm] | 0.92 | \|R10 − R11\| × 10/f | 3.28 |
| Fno | 1.85 | ΣCT/ΣAT | 1.07 |
| HFOV [deg.] | 100.3 | Dr1r8/Dr9r14 | 2.94 |
| 1/\|tan(HFOV)\| | 0.182 | Dr9r14/T23 | 1.14 |
| TL/SL | 3.25 | T23/BL | 1.70 |
| (\|f/f2\| + \|f/f5\|)/\|f/f7\| | 1.34 | CT1/CT7 | 2.11 |
| Σ\|f/fi\| | 2.40 | CT3/T23 | 0.28 |
| f4/f2 | −0.76 | CT3/CT4 | 0.57 |
| f4/f5 | −0.58 | CT3/T45 | 0.65 |
| f4/f6 | 2.13 | CT5/CT1 | 0.87 |
| f5/f7 | 1.73 | T34/T45 | 0.08 |
| \|f6/f5\| | 0.27 | T56 [mm] | 0.030 |
| (R1 + R5)/(R1 − R5) | 0.58 | V3/V5 | 2.87 |
| (R5 + R14)/(R5 − R14) | −0.29 | V7 | 19.5 |
| (R7 + R13)/(R7 − R13) | 0.19 | Sag3R1/CT3 | −1.13 |
| \|R5/R10\| | 2.86 | Sag7R1/CT6 | −0.20 |
| R11/R7 | 0.24 | ImgH/Y7R2 | 1.50 |

5th Embodiment

Figure 9:
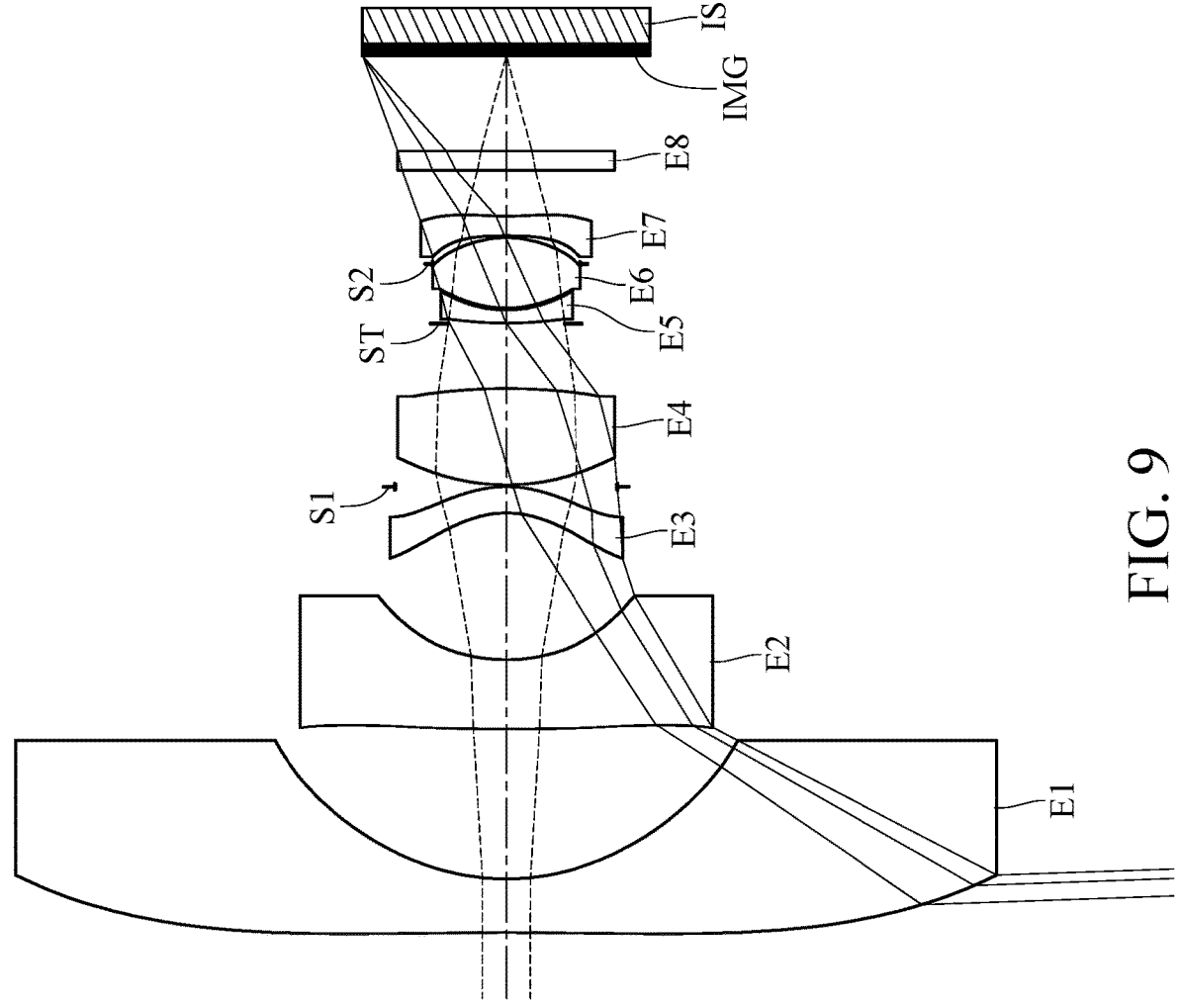
FIG. 9 is a schematic view of an image capturing unit according to the 5th embodiment of the present disclosure.
Figure 10:
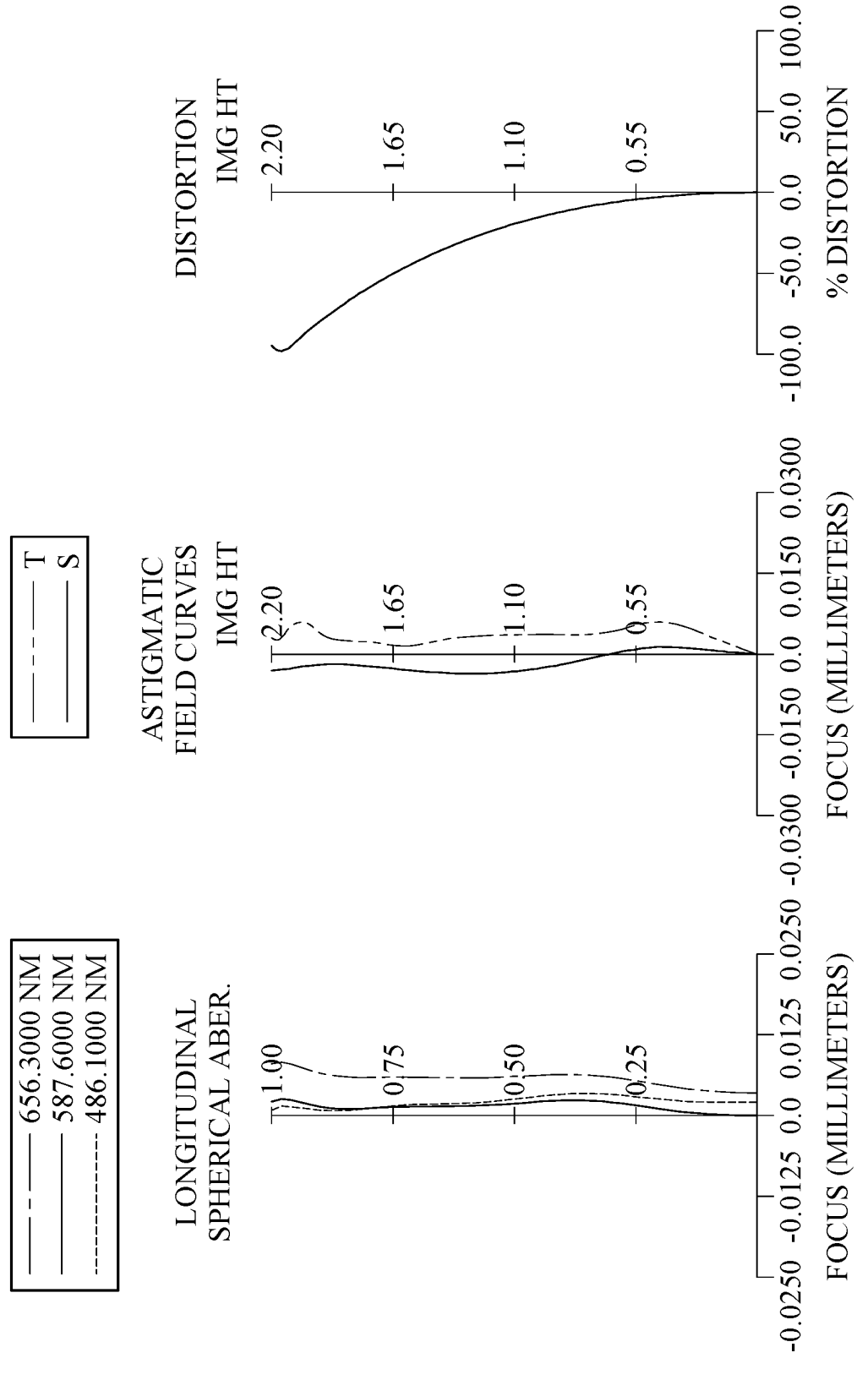
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a stop S1, a fourth lens element E4, an aperture stop ST, a fifth lens element E5, a sixth lens element E6, a stop S2, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The object-side surface of the first lens element E1 has one convex critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The object-side surface of the second lens element E2 has one concave critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric. The object-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 is cemented to the image-side surface of the fifth lens element E5.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The detailed optical data of the 5th embodiment are shown in Table 5A and the aspheric surface data are shown in Table 5B below.

TABLE 5A

5th Embodiment
f = 1.42 mm, Fno = 1.93, HFOV = 92.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −66.6667 | (ASP) | 0.820 | Plastic | 1.544 | 56.0 | −6.15 |
| 2 | | 3.5384 | (ASP) | 2.292 | | | | |
| 3 | Lens 2 | 26.1562 | (ASP) | 1.067 | Plastic | 1.544 | 56.0 | −5.62 |
| 4 | | 2.6998 | (ASP) | 2.241 | | | | |
| 5 | Lens 3 | −1.5510 | (ASP) | 0.400 | Plastic | 1.544 | 56.0 | −37.59 |
| 6 | | −1.8308 | (ASP) | 0.000 | | | | |
| 7 | Stop | Plano | | 0.030 | | | | |
| 8 | Lens 4 | 3.4859 | (ASP) | 1.481 | Glass | 1.762 | 40.1 | 3.46 |
| 9 | | −8.8485 | (ASP) | 0.988 | | | | |
| 10 | Ape. Stop | Plano | | 0.009 | | | | |
| 11 | Lens 5 | 6.0251 | (ASP) | 0.200 | Plastic | 1.660 | 20.4 | −3.88 |
| 12 | | 1.7744 | (ASP) | 0.031 | Cemented | 1.485 | 53.2 | — |
| 13 | Lens 6 | 1.7243 | (ASP) | 1.074 | Plastic | 1.544 | 56.0 | 1.76 |
| 14 | | −1.6709 | (ASP) | −0.400 | | | | |
| 15 | Stop | Plano | | 0.430 | | | | |
| 16 | Lens 7 | −7.5646 | (ASP) | 0.301 | Plastic | 1.639 | 23.5 | −4.44 |
| 17 | | 4.6046 | (ASP) | 0.700 | | | | |
| 18 | Filter | Plano | | 0.300 | Glass | 1.517 | 64.2 | — |
| 19 | | Plano | | 1.459 | | | | |
| 20 | Image | Plano | | — | | | | |

Note:
Reference wavelength is 587.6 nm (d-line).
An effective radius of the stop S1 (Surface 7) is 1.702 mm.
An effective radius of the stop S2 (Surface 15) is 1.127 mm.

TABLE 5B

Aspheric Coefficients

| Surface # | 1 | 2 | 3 | 4 |
|---|---|---|---|---|
| k= | −9.0000000E+01 | −4.3425000E−01 | −9.1641300E+00 | 1.0646700E−01 |
| A4= | 2.1474649E+00 | −1.9259264E−03 | −5.6779790E−03 | 2.7724428E−03 |
| A6= | 2.0641203E+00 | 3.3155485E−06 | 4.1868655E−03 | 6.8091696E−03 |
| A8= | −4.5748183E+01 | 8.7773110E−05 | −1.3708834E−03 | −1.8071916E−03 |
| A10= | 2.3638328E+02 | −1.9454970E−05 | 2.2216595E−04 | −1.0732631E−04 |
| A12= | −6.8563939E+02 | 1.9335099E−06 | −1.9801315E−05 | 3.5521179E−05 |
| A14= | 1.2740795E+03 | −9.5281831E−08 | 9.3273069E−07 | 1.3956070E−05 |
| A16= | −1.5777398E+03 | 2.0810507E−09 | −1.8160669E−08 | −2.5643029E−06 |
| A18= | 1.2994315E+03 | — | — | — |
| A20= | −6.8442229E+02 | — | — | — |
| A22= | 2.0864407E+02 | — | — | — |
| A24= | −2.7985033E+01 | — | — | — |

| Surface # | 5 | 6 | 8 | 9 |
|---|---|---|---|---|
| k= | −3.8816600E+00 | −6.4115800E+00 | 0.0000000E+00 | 0.0000000E+00 |
| A4= | −9.2941587E−02 | −8.0081966E−02 | 1.1636616E−02 | −1.8381328E−03 |
| A6= | 1.0326555E−01 | 9.6167111E−02 | −1.3011187E−02 | 2.6892907E−03 |
| A8= | −8.6383527E−02 | −8.6801948E−02 | 7.6661212E−03 | −2.0526753E−03 |
| A10= | 5.8006342E−02 | 6.7814596E−02 | −2.7823072E−03 | 8.2410246E−04 |
| A12= | −2.8558713E−02 | −4.1443003E−02 | 5.6228061E−04 | −2.2332656E−04 |
| A14= | 1.0154672E−02 | 1.9464525E−02 | −5.3550950E−05 | 2.2003207E−05 |
| A16= | −2.5609064E−03 | −6.8027620E−03 | — | — |
| A18= | 4.3658282E−04 | 1.6822379E−03 | — | — |
| A20= | −4.5271440E−05 | −2.7313607E−04 | — | — |

TABLE 5B-continued

| | | Aspheric Coefficients | | |
|---|---|---|---|---|
| A22= | 2.1541442E−06 | 2.5583120E−05 | — | — |
| A24= | — | −1.0227341E−06 | — | — |

| Surface # | 11 | 12 | 13 | 14 |
|---|---|---|---|---|
| k= | 9.7880900E+00 | −2.5336400E+01 | 1.8205100E−01 | −2.4637800E+01 |
| A4= | −4.2242727E−03 | 5.1871166E−01 | −6.7937036E−02 | −5.5822923E−01 |
| A6= | 5.6074477E−03 | −1.4421810E+00 | 2.7641642E−01 | 1.8779811E+00 |
| A8= | −4.0678323E−02 | 3.6905776E+00 | −1.8619889E+00 | −5.4920079E+00 |
| A10= | 3.9198023E−02 | −6.8402182E+00 | 7.7503324E+00 | 1.1525370E+01 |
| A12= | −2.1692562E−02 | 8.2522341E+00 | −1.9325513E+01 | −1.6804260E+01 |
| A14= | — | −6.0095131E+00 | 2.9192514E+01 | 1.6388757E+01 |
| A16= | — | 2.2552634E+00 | −2.6263467E+01 | −1.0139133E+01 |
| A18= | — | −2.2523617E−01 | 1.2908325E+01 | 3.5800996E+00 |
| A20= | — | −5.4067603E−02 | −2.6524642E+00 | −5.4730988E−01 |

| Surface # | 16 | 17 |
|---|---|---|
| k= | −6.5448400E+01 | −7.0216900E+00 |
| A4= | −1.7166041E−01 | −1.9518379E−01 |
| A6= | −2.5853963E−01 | 1.7800531E−01 |
| A8= | 3.4996177E+00 | −5.5969484E−03 |
| A10= | −1.9866071E+01 | −7.9073469E−01 |
| A12= | 6.9535892E+01 | 2.3665138E+00 |
| A14= | −1.6390230E+02 | −3.6145482E+00 |
| A16= | 2.6697304E+02 | 2.7390505E+00 |
| A18= | −2.9801046E+02 | 2.4259916E−01 |
| A20= | 2.1548762E+02 | −2.8813026E+00 |
| A22= | −8.1921169E+01 | 3.2411796E+00 |
| A24= | −5.0255003E+00 | −1.9642599E+00 |
| A26= | 2.1345716E+01 | 7.0983039E−01 |
| A28= | −9.2388240E+00 | −1.4436513E−01 |
| A30= | 1.3963272E+00 | 1.2778362E−02 |

In the 5th embodiment, the equation of the aspheric surface profiles of the aforementioned lens elements is the same as the equation of the 1st embodiment. Also, the definitions of these parameters shown in Table 5C are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Schematic Parameters | | | |
|---|---|---|---|
| f [mm] | 1.42 | |R10 − R11| × 10/f | 0.35 |
| Fno | 1.93 | ΣCT/ΣAT | 0.95 |
| HFOV [deg.] | 92.0 | Dr1r8/Dr9r14 | 5.09 |
| 1/|tan(HFOV)| | 0.035 | Dr9r14/T23 | 0.73 |
| TL/SL | 3.27 | T23/BL | 0.91 |
| (|f/f2| + |f/f5|)/|f/f7| | 1.93 | CT1/CT7 | 2.72 |
| Σ|f/fi| | 2.42 | CT3/T23 | 0.18 |
| f4/f2 | −0.62 | CT3/CT4 | 0.27 |
| f4/f5 | −0.89 | CT3/T45 | 0.40 |
| f4/f6 | 1.97 | CT5/CT1 | 0.24 |
| f5/f7 | 0.87 | T34/T45 | 0.03 |
| |f6/f5| | 0.45 | T56 [mm] | 0.031 |
| (R1 + R5)/(R1 − R5) | 1.05 | V3/V5 | 2.75 |
| (R5 + R14)/(R5 − R14) | −0.50 | V7 | 23.5 |
| (R7 + R13)/(R7 − R13) | −0.37 | Sag3R1/CT3 | −1.74 |
| |R5/R10| | 0.87 | Sag7R1/CT6 | −0.30 |
| R11/R7 | 0.49 | ImgH/Y7R2 | 1.68 |

6th Embodiment

Figure 11:
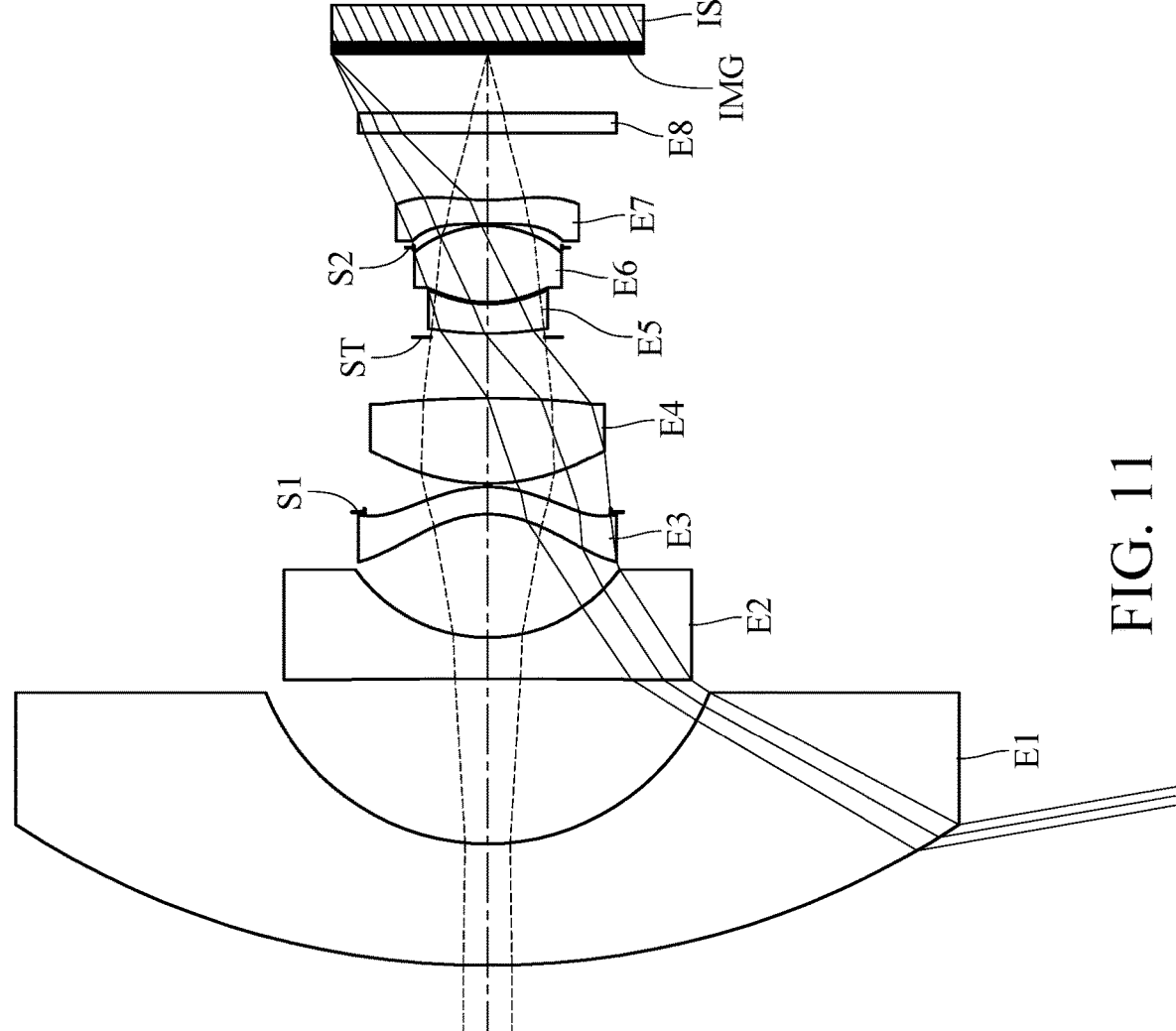
FIG. 11 is a schematic view of an image capturing unit according to the 6th embodiment of the present disclosure.

FIG. 11 is a schematic view of an image capturing unit according to the 6th embodiment of the present disclosure.

Figure 12:
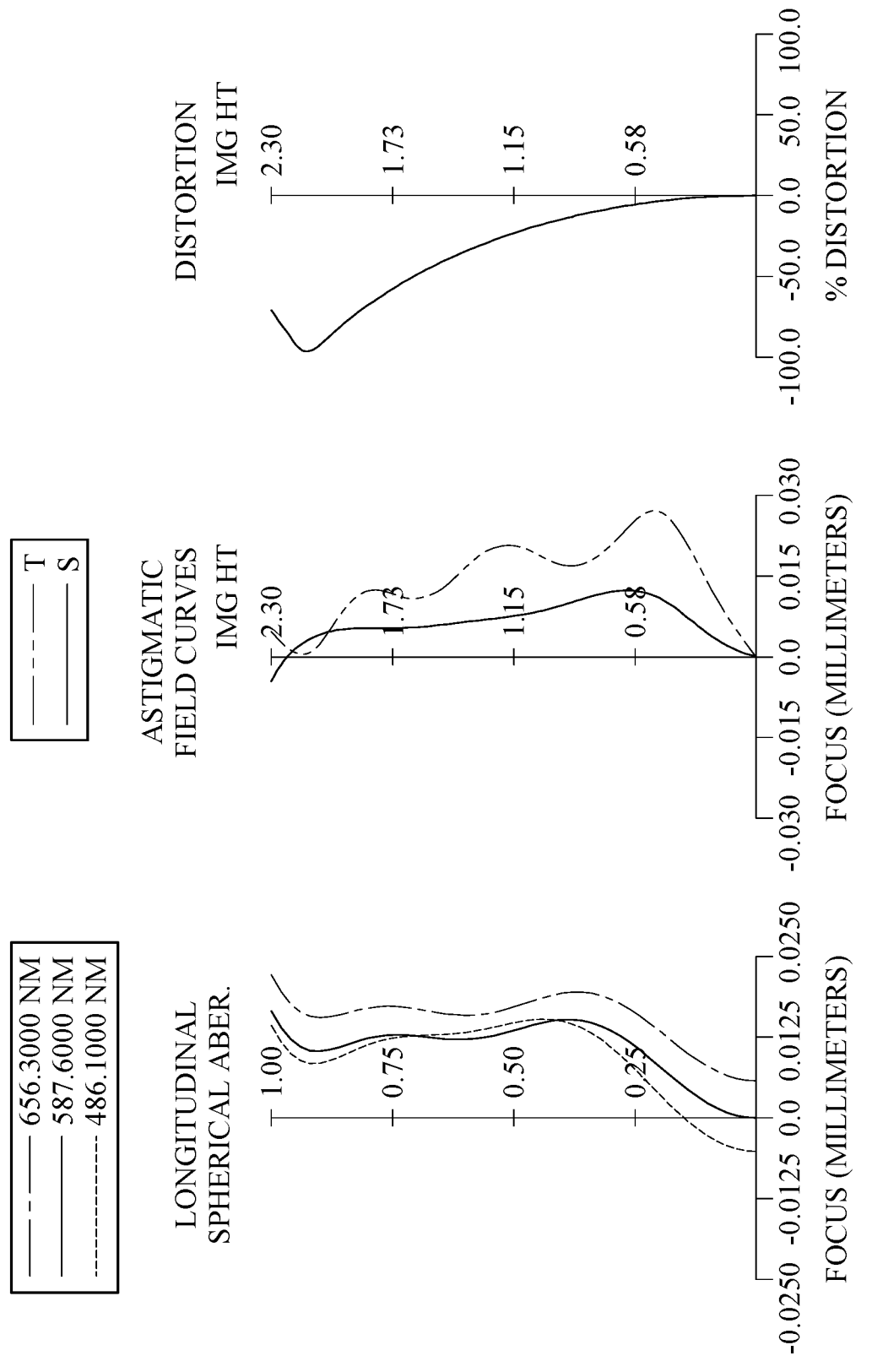
FIG. 12 shows spherical aberration curves, astigmatic field curves and a distortion curve of the image capturing unit according to the 6th embodiment.

FIG. 12 shows, in order from left to right, spherical aberration curves, astigmatic field curves and a distortion curve of the image capturing unit according to the 6th embodiment. In FIG. 11, the image capturing unit 6 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a stop S1, a fourth lens element E4, an aperture stop ST, a fifth lens element E5, a sixth lens element E6, a stop S2, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being concave in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The image-side surface of the third lens element E3 has one concave critical point in an off-axis region thereof.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric. The object-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 is cemented to the image-side surface of the fifth lens element E5.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The detailed optical data of the 6th embodiment are shown in Table 6A and the aspheric surface data are shown in Table 6B below.

TABLE 6A

6th Embodiment
f = 1.38 mm, Fno = 1.93, HFOV = 99.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 12.7293 (SPH) | 1.800 | Glass | 1.911 | 35.2 | −5.91 |
| 2 | | 3.5273 (SPH) | 2.455 | | | | |
| 3 | Lens 2 | −200.0000 (SPH) | 0.600 | Glass | 1.497 | 81.6 | −4.77 |
| 4 | | 2.4000 (SPH) | 1.831 | | | | |
| 5 | Lens 3 | −1.5358 (ASP) | 0.400 | Plastic | 1.544 | 56.0 | −40.55 |
| 6 | | −1.8022 (ASP) | −0.370 | | | | |
| 7 | Stop | Plano | 0.420 | | | | |
| 8 | Lens 4 | 3.2353 (ASP) | 1.269 | Glass | 1.806 | 40.7 | 3.47 |
| 9 | | −17.0216 (ASP) | 0.904 | | | | |
| 10 | Ape. Stop | Plano | 0.055 | | | | |
| 11 | Lens 5 | 4.7678 (ASP) | 0.432 | Plastic | 1.669 | 19.5 | −5.05 |
| 12 | | 1.9054 (ASP) | 0.030 | Cemented | 1.485 | 53.2 | — |
| 13 | Lens 6 | 2.1351 (ASP) | 1.128 | Plastic | 1.544 | 56.0 | 1.86 |
| 14 | | −1.5630 (ASP) | −0.320 | | | | |
| 15 | Stop | Plano | 0.350 | | | | |
| 16 | Lens 7 | −92.3059 (ASP) | 0.350 | Plastic | 1.669 | 19.5 | −4.41 |
| 17 | | 3.0524 (ASP) | 1.000 | | | | |
| 18 | Filter | Plano | 0.300 | Glass | 1.517 | 64.2 | — |
| 19 | | Plano | 0.867 | | | | |
| 20 | Image | Plano | — | | | | |

Note:
Reference wavelength is 587.6 nm (d-line).
An effective radius of the stop S1 (Surface 7) is 1.820 mm.
An effective radius of the stop S2 (Surface 15) is 1.095 mm.

TABLE 6B

Aspheric Coefficients

| Surface # | 5 | 6 | 8 | 9 |
|---|---|---|---|---|
| k= | −4.2394400E+00 | −7.2959000E+00 | 0.0000000E+00 | 0.0000000E+00 |
| A4= | −9.6321372E−02 | −7.9676371E−02 | 1.8477623E−02 | −4.1286793E−03 |
| A6= | 1.2031386E−01 | 1.0312400E−01 | −2.3776448E−02 | 5.7717931E−03 |
| A8= | −1.1353674E−01 | −8.9878375E−02 | 1.5406003E−02 | −6.9737212E−03 |
| A10= | 8.5653727E−02 | 5.1857156E−02 | −6.3982800E−03 | 3.9980339E−03 |
| A12= | −4.7881805E−02 | −8.4502216E−03 | 1.5362486E−03 | −1.0762386E−03 |
| A14= | 1.9308203E−02 | −1.2777460E−02 | −1.6010353E−04 | 1.0130611E−04 |
| A16= | −5.4376381E−03 | 1.2086409E−02 | — | — |
| A18= | 1.0098177E−03 | −5.2652568E−03 | — | — |

TABLE 6B-continued

| Aspheric Coefficients | | | |
|---|---|---|---|
| A20= | −1.1057632E−04 | 1.3002736E−03 | — | — |
| A22= | 5.3799828E−06 | −1.7497958E−04 | — | — |
| A24= | — | 9.9793394E−06 | — | — |

| Surface # | 11 | 12 | 13 | 14 |
|---|---|---|---|---|
| k= | 3.2854600E+00 | −3.4813900E+01 | 1.5800900E+00 | −2.2047300E+01 |
| A4= | −3.9923425E−03 | 6.0620910E−01 | 9.9148918E−03 | −6.5922873E−01 |
| A6= | −2.8137499E−02 | −6.6266708E−01 | 4.1359045E+00 | 2.1745413E+00 |
| A8= | 2.7133653E−02 | −5.0200450E+00 | −3.3353691E+01 | −5.6418398E+00 |
| A10= | −2.6263614E−02 | 2.7591718E+01 | 1.2251810E+02 | 1.0224466E+01 |
| A12= | 5.6473392E−03 | −6.6454239E+01 | −2.5713523E+02 | −1.2572390E+01 |
| A14= | — | 9.0630235E+01 | 3.2560219E+02 | 1.0129636E+01 |
| A16= | — | −7.1867416E+01 | −2.4572654E+02 | −5.0830662E+00 |
| A18= | — | 3.0859070E+01 | 1.0165148E+02 | 1.4302825E+00 |
| A20= | — | −5.5409453E+00 | −1.7717334E+01 | −1.7112696E−01 |

| Surface # | 16 | 17 |
|---|---|---|
| k= | 9.0000000E+01 | −1.0599600E+01 |
| A4= | −2.6093118E−01 | −2.0857189E−01 |
| A6= | 3.5520387E−01 | 2.5670270E−01 |
| A8= | −2.7751580E−01 | −3.3773267E−01 |
| A10= | −1.0063251E+00 | 3.3682699E−01 |
| A12= | 3.5562946E+00 | −2.2968216E−01 |
| A14= | −5.2776041E+00 | 9.4064492E−02 |
| A16= | 4.2234115E+00 | −1.7744656E−02 |
| A18= | −1.7797504E+00 | −4.2635071E−04 |
| A20= | 3.1021992E−01 | 4.8008629E−04 |

In the 6th embodiment, the equation of the aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Schematic Parameters | | | |
|---|---|---|---|
| f [mm] | 1.38 | \|R10 − R11\| × 10/f | 1.66 |
| Fno | 1.93 | ΣCT/ΣAT | 1.12 |
| HFOV [deg.] | 99.9 | Dr1r8/Dr9r14 | 4.27 |
| 1/\|tan(HFOV)\| | 0.175 | Dr9r14/T23 | 1.08 |
| TL/SL | 3.22 | T23/BL | 0.84 |
| (\|f/f2\| + \|f/f5\|)/\|f/f7\| | 1.80 | CT1/CT7 | 5.14 |
| Σ\|f/fi\| | 2.29 | CT3/T23 | 0.22 |
| f4/f2 | −0.73 | CT3/CT4 | 0.32 |
| f4/f5 | −0.69 | CT3/T45 | 0.42 |
| f4/f6 | 1.87 | CT5/CT1 | 0.24 |
| f5/f7 | 1.15 | T34/T45 | 0.05 |
| \|f6/f5\| | 0.37 | T56 [mm] | 0.030 |
| (R1 + R5)/(R1 − R5) | 0.78 | V3/V5 | 2.87 |
| (R5 + R14)/(R5 − R14) | −0.33 | V7 | 19.5 |
| (R7 + R13)/(R7 − R13) | −0.93 | Sag3R1/CT3 | −1.78 |
| \|R5/R10\| | 0.81 | Sag7R1/CT6 | −0.22 |
| R11/R7 | 0.66 | ImgH/Y7R2 | 1.71 |

7th Embodiment

Figure 13:
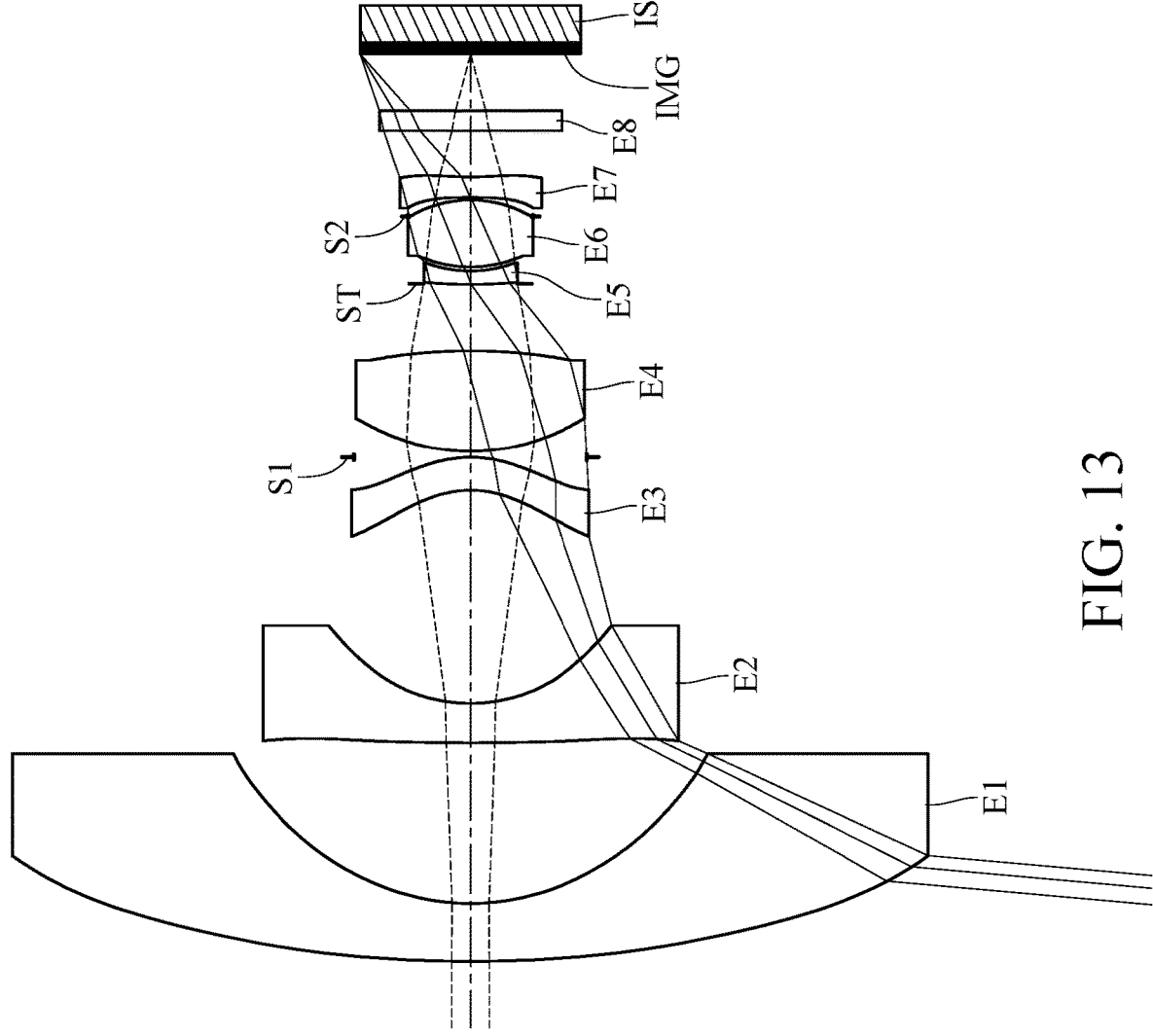
FIG. 13 is a schematic view of an image capturing unit according to the 7th embodiment of the present disclosure.
Figure 14:
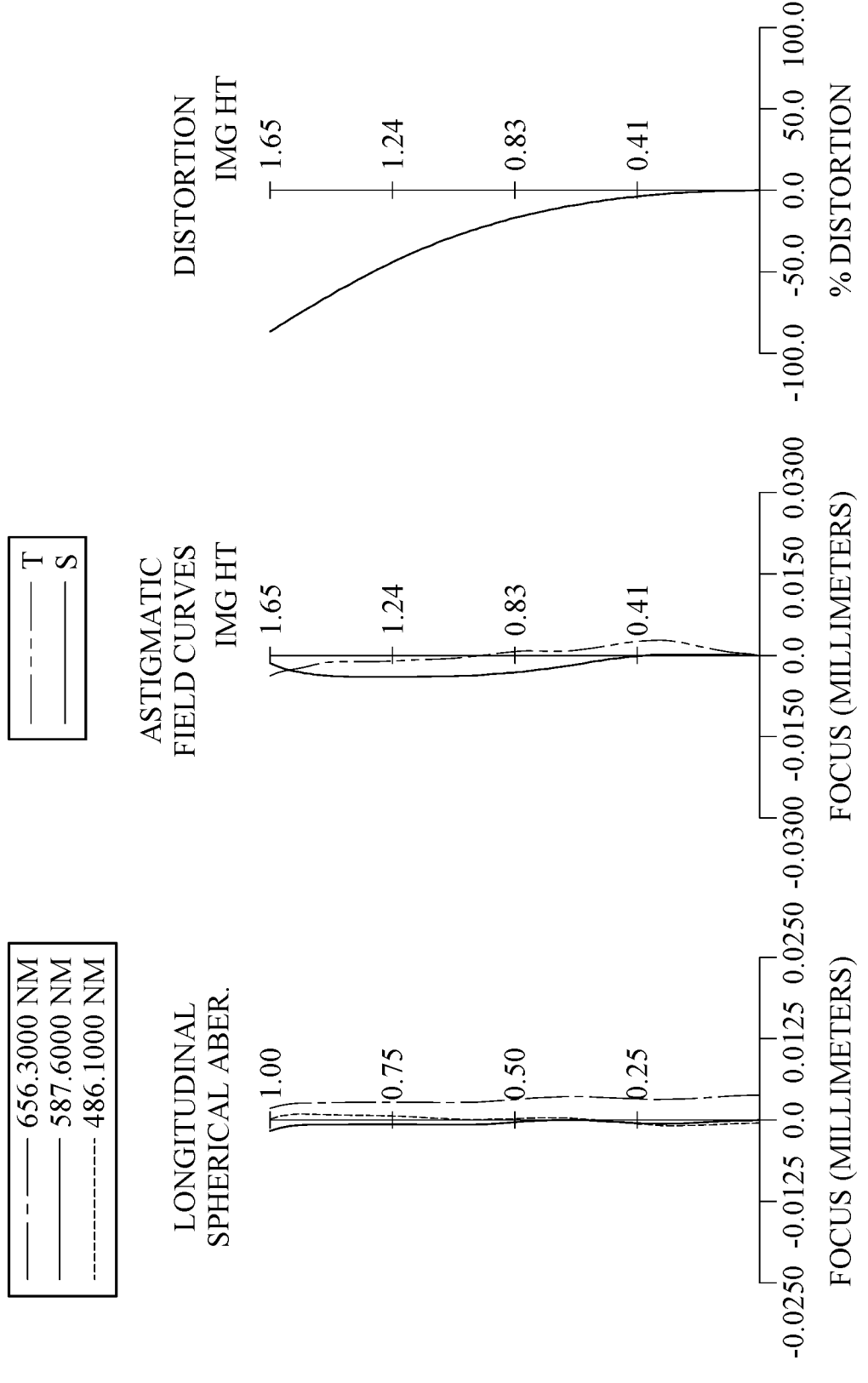
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a stop S1, a fourth lens element E4, an aperture stop ST, a fifth lens element E5, a sixth lens element E6, a stop S2, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of glass material and has the object-side surface and the image-side surface being both aspheric. The object-side surface of the second lens element E2 has one inflection point. The object-side surface of the second lens element E2 has one concave critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric. The object-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The detailed optical data of the 7th embodiment are shown in Table 7A and the aspheric surface data are shown in Table 7B below.

TABLE 7A

7th Embodiment
f = 1.09 mm, Fno = 1.93, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 19.8403 | (ASP) | 0.869 | Glass | 1.552 | 63.4 | −7.79 |
| 2 | | 3.4816 | (ASP) | 2.403 | | | | |
| 3 | Lens 2 | 32.8064 | (ASP) | 0.600 | Glass | 1.651 | 55.9 | −4.09 |
| 4 | | 2.4466 | (ASP) | 3.189 | | | | |
| 5 | Lens 3 | −1.5574 | (ASP) | 0.499 | Plastic | 1.544 | 56.0 | −106.28 |
| 6 | | −1.7812 | (ASP) | 0.000 | | | | |
| 7 | Stop | Plano | | 0.091 | | | | |
| 8 | Lens 4 | 3.2112 | (ASP) | 1.507 | Glass | 1.757 | 47.7 | 3.25 |
| 9 | | −8.3486 | (ASP) | 1.008 | | | | |
| 10 | Ape. Stop | Plano | | −0.011 | | | | |
| 11 | Lens 5 | 7.8561 | (ASP) | 0.200 | Plastic | 1.669 | 19.5 | −3.83 |
| 12 | | 1.9121 | (ASP) | 0.060 | | | | |
| 13 | Lens 6 | 1.9172 | (ASP) | 1.002 | Plastic | 1.544 | 56.0 | 1.83 |
| 14 | | −1.6929 | (ASP) | −0.250 | | | | |
| 15 | Stop | Plano | | 0.287 | | | | |
| 16 | Lens 7 | −13.7675 | (ASP) | 0.308 | Plastic | 1.669 | 19.5 | −4.82 |
| 17 | | 4.2501 | (ASP) | 0.700 | | | | |
| 18 | Filter | Plano | | 0.300 | Glass | 1.517 | 64.2 | — |
| 19 | | Plano | | 0.843 | | | | |
| 20 | Image | Plano | | — | | | | |

Note:
Reference wavelength is 587.6 nm (d-line).
An effective radius of the stop S1 (Surface 7) is 1.745 mm.
An effective radius of the stop S2 (Surface 15) is 0.935 mm.

TABLE 7B

Aspheric Coefficients

| Surface # | 1 | 2 | 3 | 4 |
|---|---|---|---|---|
| k= | 4.4264400E+00 | −4.9606300E−01 | 1.1888700E+01 | −6.0338600E−02 |
| A4= | −3.5346436E−05 | −1.8729855E−03 | −8.6784637E−03 | −2.9185867E−03 |
| A6= | 4.3390188E−05 | 5.1055033E−04 | 6.8269969E−03 | 5.9664767E−03 |
| A8= | −4.9948229E−06 | −1.0995026E−04 | −2.1855654E−03 | 9.6998014E−04 |
| A10= | 2.4933642E−07 | 2.0724704E−05 | 3.5261292E−04 | −2.0024769E−03 |
| A12= | −6.7549913E−09 | −1.9564945E−06 | −3.1486361E−05 | 6.2070210E−04 |
| A14= | 1.0558103E−10 | 6.7122020E−08 | 1.4947260E−06 | −8.0102240E−05 |
| A16= | −9.0613375E−13 | — | −2.9569239E−08 | 3.7184729E−06 |
| A18= | 3.3553165E−15 | — | — | — |

| Surface # | 5 | 6 | 8 | 9 |
|---|---|---|---|---|
| k= | −4.0296400E+00 | −6.0084400E+00 | 0.0000000E+00 | 0.0000000E+00 |
| A4= | −9.0514978E−02 | −7.7302460E−02 | 1.0468418E−02 | −4.1584716E−03 |
| A6= | 9.1870440E−02 | 8.4786648E−02 | −1.0945831E−02 | 5.4174775E−03 |
| A8= | −7.0104627E−02 | −7.0417641E−02 | 6.3684827E−03 | −3.2031382E−03 |

TABLE 7B-continued

| Aspheric Coefficients | | | |
|---|---|---|---|
| A10= | 4.6649980E–02 | 5.4057076E–02 | –2.3458618E–03 | 1.1120642E–03 |
| A12= | –2.4171629E–02 | –3.3306019E–02 | 4.8127205E–04 | –2.7279444E–04 |
| A14= | 9.2948488E–03 | 1.5700072E–02 | –4.7289906E–05 | 2.6365416E–05 |
| A16= | –2.5598862E–03 | –5.4371915E–03 | — | — |
| A18= | 4.7652682E–04 | 1.3150495E–03 | — | — |
| A20= | –5.3663070E–05 | –2.0631077E–04 | — | — |
| A22= | 2.7552269E–06 | 1.8394944E–05 | — | — |
| A24= | — | –6.8025174E–07 | — | — |

| Surface # | 11 | 12 | 13 | 14 |
|---|---|---|---|---|
| k= | 1.1957800E+01 | –2.8236400E+01 | 5.1287000E–01 | –1.9614400E+01 |
| A4= | 1.2093026E–02 | 5.2367453E–01 | 4.4068213E–03 | –4.8294752E–01 |
| A6= | –4.0621900E–02 | –1.7118518E+00 | –1.7211184E–01 | 1.6179953E+00 |
| A8= | 1.4698998E–02 | 5.8783534E+00 | 1.3416633E+00 | –5.0106973E+00 |
| A10= | –1.9742832E–02 | –1.7025444E+01 | –7.5586177E+00 | 1.1106541E+01 |
| A12= | 7.7469070E–03 | 3.5915288E+01 | 2.6904382E+01 | –1.6625306E+01 |
| A14= | — | –5.0601079E+01 | –6.0133121E+01 | 1.5611222E+01 |
| A16= | — | 4.3850179E+01 | 8.1903487E+01 | –8.0490742E+00 |
| A18= | — | –2.0869564E+01 | –6.2255944E+01 | 1.4664219E+00 |
| A20= | — | 4.2749681E+00 | 2.0227441E+01 | 1.9618899E–01 |

| Surface # | 16 | 17 |
|---|---|---|
| k= | 9.0000000E+01 | –1.1902000E+01 |
| A4= | –2.2629281E–01 | –2.0781904E–01 |
| A6= | 4.1971886E–01 | 2.7547331E–01 |
| A8= | –1.2535680E+00 | –5.7211283E–01 |
| A10= | 2.3204301E+00 | 1.1818704E+00 |
| A12= | –2.3925412E+00 | –1.9618189E+00 |
| A14= | 5.3902518E–01 | 2.3162806E+00 |
| A16= | 1.6270595E+00 | –1.7655917E+00 |
| A18= | –1.8149553E+00 | 7.6780514E–01 |
| A20= | 6.1889250E–01 | –1.4313450E–01 |

In the 7th embodiment, the equation of the aspheric surface profiles of the aforementioned lens elements is the same as the equation of the 1st embodiment. Also, the definitions of these parameters shown in Table 7C are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Schematic Parameters | | | |
|---|---|---|---|
| f [mm] | 1.09 | \|R10 – R11\| × 10/f | 0.05 |
| Fno | 1.93 | ΣCT/ΣAT | 0.74 |
| HFOV [deg.] | 85.0 | Dr1r8/Dr9r14 | 5.70 |
| 1/\|tan(HFOV)\| | 0.087 | Dr9r14/T23 | 0.50 |
| TL/SL | 3.96 | T23/BL | 1.73 |
| (\|f/f2\| + \|f/f5\|)/\|f/f7\| | 2.44 | CT1/CT7 | 2.82 |
| Σ\|f/fi\| | 1.85 | CT3/T23 | 0.16 |
| f4/f2 | –0.79 | CT3/CT4 | 0.33 |
| f4/f5 | –0.85 | CT3/T45 | 0.50 |
| f4/f6 | 1.78 | CT5/CT1 | 0.23 |
| f5/f7 | 0.79 | T34/T45 | 0.09 |
| \|f6/f5\| | 0.48 | T56 [mm] | 0.060 |
| (R1 + R5)/(R1 – R5) | 0.85 | V3/V5 | 2.87 |
| (R5 + R14)/(R5 – R14) | –0.46 | V7 | 19.5 |
| (R7 + R13)/(R7 – R13) | –0.62 | Sag3R1/CT3 | –1.39 |
| \|R5/R10\| | 0.81 | Sag7R1/CT6 | –0.16 |
| R11/R7 | 0.60 | ImgH/Y7R2 | 1.56 |

8th Embodiment

Figure 15:
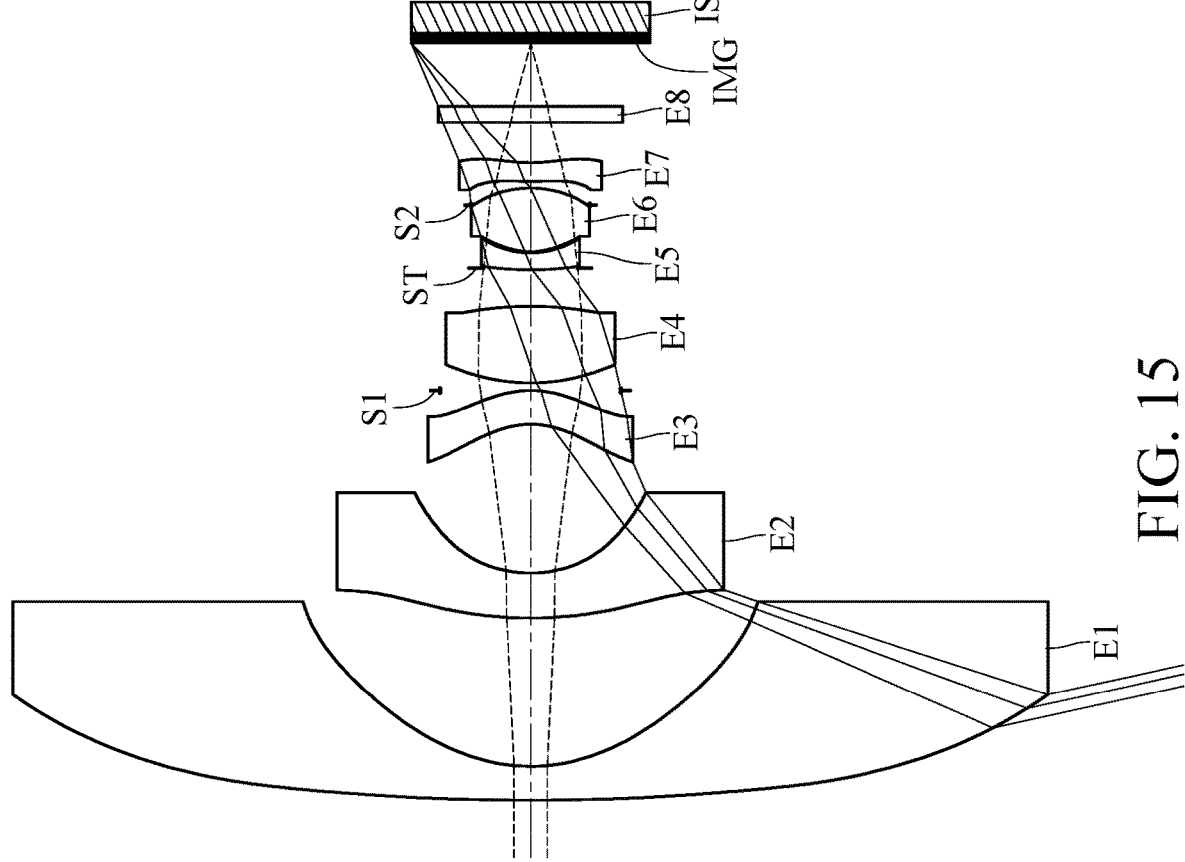
FIG. 15 is a schematic view of an image capturing unit according to the 8th embodiment of the present disclosure.

FIG. 15 is a schematic view of an image capturing unit according to the 8th embodiment of the present disclosure.

Figure 16:
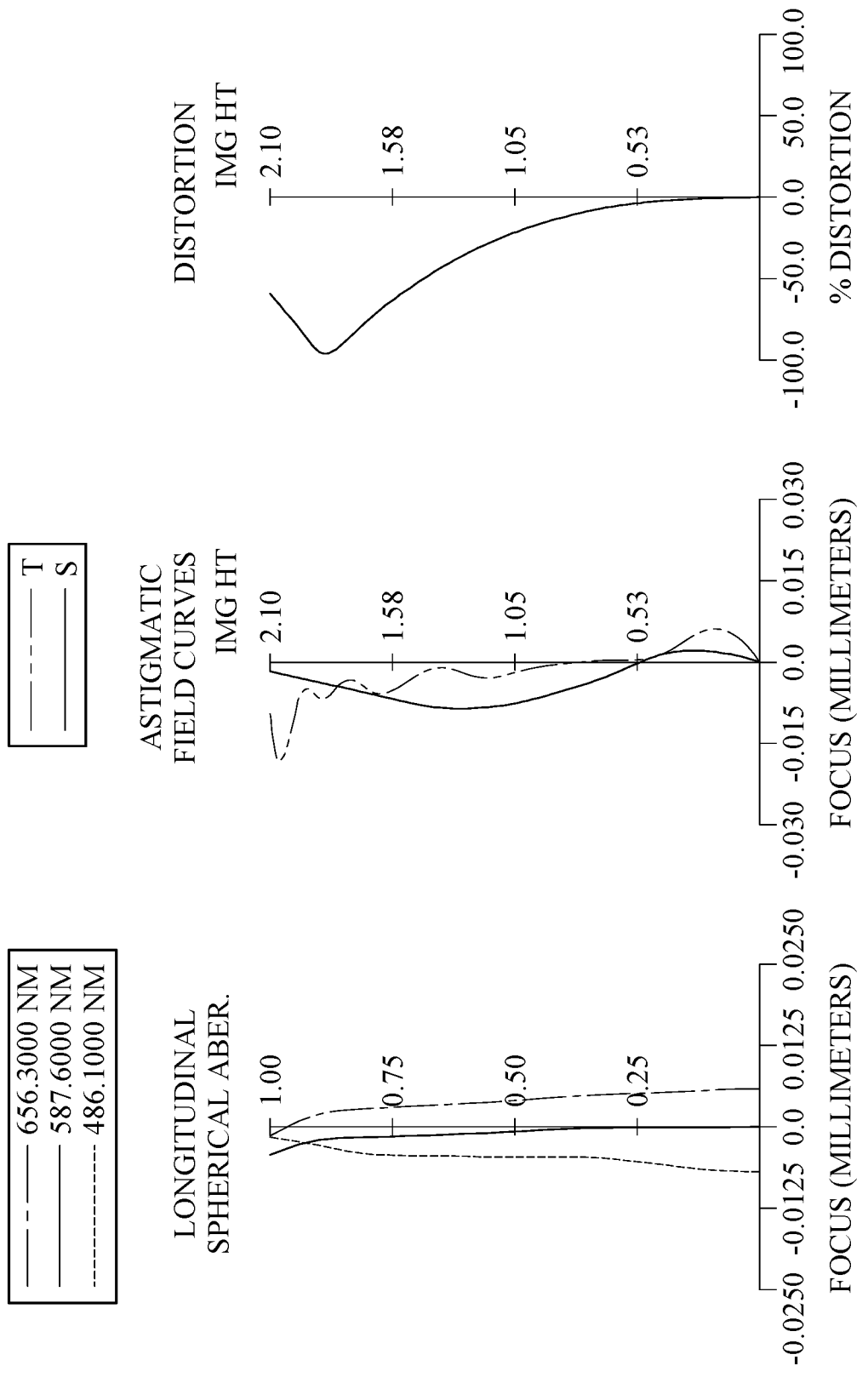
FIG. 16 shows spherical aberration curves, astigmatic field curves and a distortion curve of the image capturing unit according to the 8th embodiment.

FIG. 16 shows, in order from left to right, spherical aberration curves, astigmatic field curves and a distortion curve of the image capturing unit according to the 8th embodiment. In FIG. 15, the image capturing unit 8 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a stop S1, a fourth lens element E4, an aperture stop ST, a fifth lens element E5, a sixth lens element E6, a stop S2, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 is cemented to the image-side surface of the fifth lens element E5.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The detailed optical data of the 8th embodiment are shown in Table 8A and the aspheric surface data are shown in Table 8B below.

TABLE 8A

8th Embodiment
f = 1.14 mm, Fno = 1.93, HFOV = 102.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 51.3043 | (ASP) | 0.600 | Plastic | 1.545 | 56.1 | −6.04 |
| 2 | | 3.0821 | (ASP) | 2.616 | | | | |
| 3 | Lens 2 | 6.1016 | (ASP) | 0.795 | Plastic | 1.544 | 56.0 | −6.78 |
| 4 | | 2.1932 | (ASP) | 2.621 | | | | |
| 5 | Lens 3 | −1.4933 | (ASP) | 0.600 | Plastic | 1.544 | 56.0 | −152.76 |
| 6 | | −1.7359 | (ASP) | 0.000 | | | | |
| 7 | Stop | Plano | | 0.132 | | | | |
| 8 | Lens 4 | 3.5463 | (ASP) | 1.350 | Plastic | 1.587 | 28.3 | 4.06 |
| 9 | | −6.2671 | (ASP) | 0.675 | | | | |
| 10 | Ape. Stop | Plano | | −0.031 | | | | |
| 11 | Lens 5 | 6.3705 | (ASP) | 0.300 | Plastic | 1.669 | 19.5 | −3.13 |
| 12 | | 1.5448 | (ASP) | 0.020 | Cemented | 1.485 | 53.2 | — |
| 13 | Lens 6 | 1.2829 | (ASP) | 1.117 | Plastic | 1.544 | 56.0 | 1.60 |
| 14 | | −1.8858 | (ASP) | −0.300 | | | | |
| 15 | Stop | Plano | | 0.419 | | | | |
| 16 | Lens 7 | 7.1907 | (ASP) | 0.331 | Plastic | 1.660 | 20.4 | −6.63 |
| 17 | | 2.6697 | (ASP) | 0.700 | | | | |
| 18 | Filter | Plano | | 0.300 | Glass | 1.517 | 64.2 | — |
| 19 | | Plano | | 1.108 | | | | |
| 20 | Image | Plano | | — | | | | |

Note:
Reference wavelength is 587.6 nm (d-line).
An effective radius of the stop S1 (Surface 7) is 1.594 mm.
An effective radius of the stop S2 (Surface 15) is 1.047 mm.

TABLE 8B

Aspheric Coefficients

| Surface # | 1 | 2 | 3 | 4 |
|---|---|---|---|---|
| k= | 7.6149500E−01 | −1.2891000E+00 | −8.3333200E+00 | −2.8860100E−01 |
| A4= | 5.8481422E−04 | −7.0422589E−06 | −1.8411136E−02 | −8.5956833E−03 |
| A6= | −5.1376685E−05 | −1.2071011E−03 | 1.7091903E−02 | 2.0863362E−02 |
| A8= | 1.3714113E−06 | 7.5709846E−04 | −6.7914806E−03 | −4.7057846E−03 |
| A10= | 3.9580506E−08 | −1.9639627E−04 | 1.5702414E−03 | −1.7196610E−03 |
| A12= | −3.4184807E−09 | 2.9777198E−05 | −2.3411404E−04 | 8.8269897E−04 |
| A14= | 9.7585691E−11 | −2.8778732E−06 | 2.2774964E−05 | 1.5121671E−04 |
| A16= | −1.5234867E−12 | 1.7489792E−07 | −1.3937701E−06 | −1.7323417E−04 |
| A18= | 1.3850423E−14 | −6.0450127E−09 | 4.8649130E−08 | 3.9757425E−05 |

TABLE 8B-continued

| Aspheric Coefficients | | | | |
|---|---|---|---|---|
| A20= | −6.9076356E−17 | 9.0033141E−11 | −7.3821358E−10 | −3.0192864E−06 |
| A22= | 1.4666095E−19 | — | — | — |

| Surface # | 5 | 6 | 8 | 9 |
|---|---|---|---|---|
| k= | −4.4899700E+00 | −6.6116600E+00 | 0.0000000E+00 | 0.0000000E+00 |
| A4= | −8.7219449E−02 | −6.7071228E−02 | 2.2348880E−02 | −4.7698735E−03 |
| A6= | 9.8532709E−02 | 5.8129739E−02 | −5.9250845E−02 | 1.1189540E−02 |
| A8= | −9.0383618E−02 | −2.9523525E−02 | 8.4926588E−02 | −1.3860674E−02 |
| A10= | 7.1770071E−02 | 7.8788827E−03 | −8.4233437E−02 | 1.8188875E−02 |
| A12= | −4.2604325E−02 | 6.2951815E−03 | 5.8180646E−02 | −1.7826566E−02 |
| A14= | 1.7906615E−02 | −9.4734032E−03 | −2.6878427E−02 | 1.0964492E−02 |
| A16= | −5.1245742E−03 | 6.0383361E−03 | 7.8205956E−03 | −3.9635163E−03 |
| A18= | 9.4300618E−04 | −2.2728126E−03 | −1.2868417E−03 | 7.5777176E−04 |
| A20= | −1.0013902E−04 | 5.1536771E−04 | 9.0668827E−05 | −5.8400099E−05 |
| A22= | 4.6490452E−06 | −6.4967020E−05 | — | — |
| A24= | — | 3.4911471E−06 | — | — |

| Surface # | 11 | 12 | 13 | 14 |
|---|---|---|---|---|
| k= | 2.3328200E+01 | −1.7035200E+01 | −3.4869700E−01 | −2.1315200E+01 |
| A4= | 1.4348387E−02 | 6.9949858E−01 | 2.5645017E−01 | −4.2328600E−01 |
| A6= | −1.8853364E−02 | −2.8114831E+00 | −4.1226086E+00 | 1.0772190E+00 |
| A8= | −2.0802831E−02 | 1.1564795E+01 | 2.3886281E+01 | −2.6690637E+00 |
| A10= | 2.1698466E−02 | −3.5574871E+01 | −8.3555663E+01 | 5.0733304E+00 |
| A12= | −1.4362303E−02 | 7.2788436E+01 | 1.8047775E+02 | −6.9516348E+00 |
| A14= | — | −9.4473637E+01 | −2.3944847E+02 | 6.4897079E+00 |
| A16= | — | 7.4063381E+01 | 1.8915388E+02 | −3.8773976E+00 |
| A18= | — | −3.1768707E+01 | −8.1282535E+01 | 1.3308205E+00 |
| A20= | — | 5.6912522E+00 | 1.4557220E+01 | −2.0021633E−01 |

| Surface # | 16 | 17 |
|---|---|---|
| k= | −6.8759900E+01 | −6.5435400E+00 |
| A4= | −2.0822686E−01 | −1.6220431E−01 |
| A6= | 1.9829108E−01 | 1.3867539E−01 |
| A8= | −3.5186442E−01 | −1.8617276E−01 |
| A10= | 3.4567430E−01 | 2.2622771E−01 |
| A12= | −5.4984470E−02 | −2.0840038E−01 |
| A14= | −3.2786134E−01 | 1.3300807E−01 |
| A16= | 4.0644893E−01 | −5.3742115E−02 |
| A18= | −2.0018679E−01 | 1.2135226E−02 |
| A20= | 3.4985560E−02 | −1.1626154E−03 |

In the 8th embodiment, the equation of the aspheric surface profiles of the aforementioned lens elements is the same as the equation of the 1st embodiment. Also, the definitions of these parameters shown in Table 8C are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| Schematic Parameters | | | |
|---|---|---|---|
| f [mm] | 1.14 | |R10 − R11| × 10/f | 2.31 |
| Fno | 1.93 | ΣCT/ΣAT | 0.83 |
| HFOV [deg.] | 102.4 | Dr1r8/Dr9r14 | 4.62 |
| 1/|tan(HFOV)| | 0.220 | Dr9r14/T23 | 0.72 |
| TL/SL | 3.37 | T23/BL | 1.24 |
| (|f/f2| + |f/f5|)/|f/f7| | 3.10 | CT1/CT7 | 1.81 |
| Σ|f/fi| | 1.89 | CT3/T23 | 0.23 |
| f4/f2 | −0.60 | CT3/CT4 | 0.44 |
| f4/f5 | −1.30 | CT3/T45 | 0.93 |
| f4/f6 | 2.54 | CT5/CT1 | 0.50 |
| f5/f7 | 0.47 | T34/T45 | 0.20 |
| |f6/f5| | 0.51 | T56 [mm] | 0.020 |
| (R1 + R5)/(R1 − R5) | 0.94 | V3/V5 | 2.87 |
| (R5 + R14)/(R5 − R14) | −0.28 | V7 | 20.4 |

TABLE 8C-continued

| Schematic Parameters | | | |
|---|---|---|---|
| (R7 + R13)/(R7 − R13) | −2.95 | Sag3R1/CT3 | −1.12 |
| |R5/R10| | 0.97 | Sag7R1/CT6 | −0.14 |
| R11/R7 | 0.36 | ImgH/Y7R2 | 1.67 |

9th Embodiment

Figure 17:
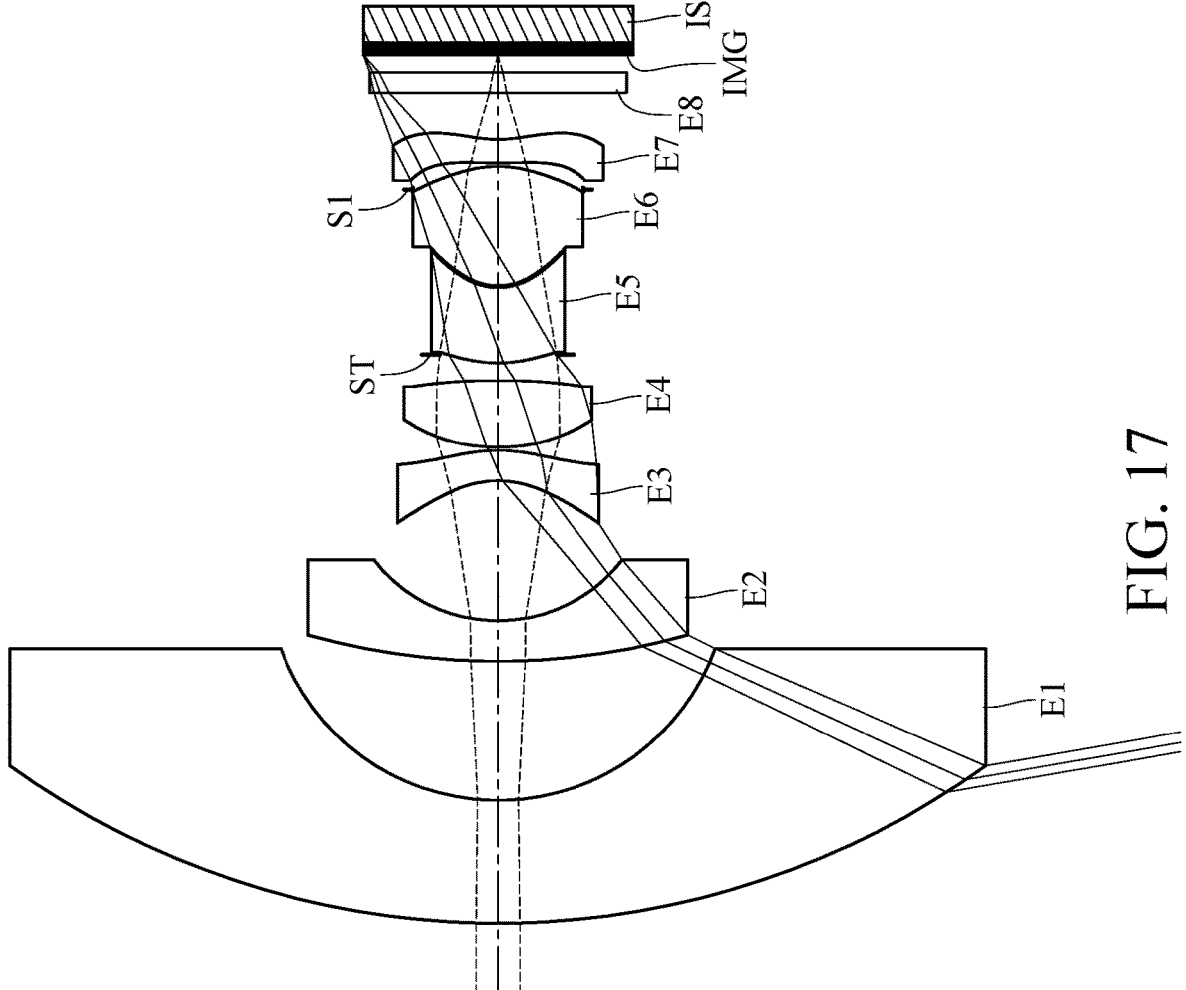
FIG. 17 is a schematic view of an image capturing unit according to the 9th embodiment of the present disclosure.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, a fourth lens element E4, an aperture stop ST, a fifth lens element E5, a sixth lens element E6, a stop S1, a seventh lens element E7, a filter E8 and an image surface IMG. The optical imaging lens assembly includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both aspheric. The object-side surface of the fourth lens element E4 has one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 is cemented to the image-side surface of the fifth lens element E5.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the seventh lens element E7 and the image surface IMG, and will not affect the focal length of the optical imaging lens assembly. The image sensor IS is disposed on or near the image surface IMG of the optical imaging lens assembly.

The detailed optical data of the 9th embodiment are shown in Table 9A and the aspheric surface data are shown in Table 9B below.

TABLE 9A

| 9th Embodiment f = 1.19 mm, Fno = 1.83, HFOV = 99.9 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 12.4776 (SPH) | 1.834 | Glass | 1.761 | 50.7 | −6.88 |
| 2 | | 3.4536 (SPH) | 2.091 | | | | |
| 3 | Lens 2 | 10.5568 (SPH) | 0.600 | Glass | 1.729 | 54.7 | −4.25 |
| 4 | | 2.3401 (SPH) | 2.098 | | | | |
| 5 | Lens 3 | −1.4913 (ASP) | 0.454 | Plastic | 1.544 | 56.0 | −8.68 |
| 6 | | −2.4128 (ASP) | 0.050 | | | | |
| 7 | Lens 4 | 3.0659 (ASP) | 0.995 | Glass | 1.693 | 53.2 | 3.85 |
| 8 | | −18.1001 (ASP) | 0.392 | | | | |
| 9 | Ape. Stop | Plano | −0.126 | | | | |
| 10 | Lens 5 | 1.9416 (ASP) | 1.127 | Plastic | 1.669 | 19.5 | −4.54 |
| 11 | | 0.9090 (ASP) | 0.031 | Cemented | 1.485 | 53.2 | — |
| 12 | Lens 6 | 1.0225 (ASP) | 1.784 | Plastic | 1.544 | 56.0 | 1.51 |
| 13 | | −1.6204 (ASP) | −0.350 | | | | |
| 14 | Stop | Plano | 0.400 | | | | |
| 15 | Lens 7 | 6.1009 (ASP) | 0.360 | Plastic | 1.669 | 19.5 | −3.87 |
| 16 | | 1.7740 (ASP) | 0.700 | | | | |
| 17 | Filter | Plano | 0.300 | Glass | 1.517 | 64.2 | — |
| 18 | | Plano | 0.261 | | | | |
| 19 | Image | Plano | — | | | | |

Note:

Reference wavelength is 587.6 nm (d-line).

An effective radius of the stop S1 (Surface 14) is 1.276 mm.

TABLE 9B

| Aspheric Coefficients | | | |
|---|---|---|---|
| Surface # | 5 | 6 | 7 | 8 |
| k= | −2.8974300E+00 | −7.1019200E+00 | 3.4312600E−01 | −7.9749500E+01 |
| A4= | −8.3521727E−02 | −1.2084973E−03 | 3.8742629E−02 | −5.7858890E−02 |
| A6= | 9.7675693E−02 | 4.3119629E−02 | −1.9400191E−02 | 5.4222162E−02 |
| A8= | −5.6745438E−02 | −1.6692350E−02 | 8.4767197E−03 | −2.7251261E−02 |
| A10= | 9.2861758E−03 | −1.2050230E−02 | −2.4413360E−03 | 6.4121994E−03 |
| A12= | 8.1244415E−03 | 1.5055860E−02 | 7.2752841E−05 | −6.6553444E−04 |
| A14= | −5.5128891E−03 | −6.8153499E−03 | — | — |
| A16= | 1.3724505E−03 | 1.4911683E−03 | — | — |
| A18= | −1.2812311E−04 | −1.3011332E−04 | — | — |

| Surface # | 10 | 11 | 12 | 13 |
|---|---|---|---|---|
| k= | −9.9796400E+00 | −2.2968000E+00 | −9.4748900E−01 | −7.2627400E+00 |
| A4= | 7.8074468E−02 | 3.7352847E−01 | 5.4092804E−01 | −8.4120972E−02 |
| A6= | −1.2456160E−01 | −2.5865678E−01 | −6.7363615E−01 | 1.6857959E−01 |
| A8= | 1.5117122E−01 | −1.1480648E+00 | −2.4006298E+00 | −2.2928110E−01 |
| A10= | −1.2687744E−01 | 3.6934771E+00 | 8.3669733E+00 | 1.8819082E−01 |
| A12= | 4.9092305E−02 | −4.7585911E+00 | −1.0879588E+01 | −9.7735207E−02 |
| A14= | −3.7284028E−03 | 3.1573819E+00 | 7.2182415E+00 | 2.8709929E−02 |
| A16= | — | −1.0647092E+00 | −2.4422512E+00 | −3.3855026E−03 |
| A18= | — | 1.4387739E−01 | 3.3516124E−01 | |

| Surface # | 15 | 16 |
|---|---|---|
| k= | 1.1954400E+01 | −5.7950300E+00 |
| A4= | −2.6550604E−01 | −2.7507328E−01 |
| A6= | 3.2111639E−01 | 3.6635098E−01 |
| A8= | −4.2870887E−01 | −4.3334501E−01 |
| A10= | 3.9882567E−01 | 3.7125765E−01 |
| A12= | −2.6224783E−01 | −2.2435228E−01 |
| A14= | 1.0892515E−01 | 9.1618891E−02 |
| A16= | −2.5047660E−02 | −2.3803661E−02 |
| A18= | 2.3660442E−03 | 3.5244163E−03 |
| A20= | — | −2.2521948E−04 |

In the 9th embodiment, the equation of the aspheric surface profiles of the aforementioned lens elements is the same as the equation of the 1st embodiment. Also, the definitions of these parameters shown in Table 9C are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

| Schematic Parameters | | | |
|---|---|---|---|
| f [mm] | 1.19 | \|R10 − R11\| × 10/f | 0.95 |
| Fno | 1.83 | ΣCT/ΣAT | 1.56 |
| HFOV [deg.] | 99.9 | Dr1r8/Dr9r14 | 2.42 |
| 1/\|tan(HFOV)\| | 0.175 | Dr9r14/T23 | 1.60 |
| TL/SL | 2.90 | T23/BL | 1.66 |
| (\|f/f2\| + \|f/f5\|)/\|f/f7\| | 1.76 | CT1/CT7 | 5.09 |
| Σ\|f/fi\| | 2.26 | CT3/T23 | 0.22 |
| f4/f2 | −0.91 | CT3/CT4 | 0.46 |
| f4/f5 | −0.85 | CT3/T45 | 1.71 |
| f4/f6 | 2.55 | CT5/CT1 | 0.61 |
| f5/f7 | 1.17 | T34/T45 | 0.19 |
| \|f6/f5\| | 0.33 | T56 [mm] | 0.031 |
| (R1 + R5)/(R1 − R5) | 0.79 | V3/V5 | 2.87 |
| (R5 + R14)/(R5 − R14) | −0.09 | V7 | 19.5 |
| (R7 + R13)/(R7 − R13) | −3.02 | Sag3R1/CT3 | −1.39 |
| \|R5/R10\| | 1.64 | Sag7R1/CT6 | −0.15 |
| R11/R7 | 0.33 | ImgH/Y7R2 | 1.28 |

10th Embodiment

FIG. 19 is a perspective view of an image capturing unit according to the 10th embodiment of the present disclosure. In this embodiment, an image capturing unit 100 is a camera module including a lens unit 101, a driving device 102, an image sensor 103 and an image stabilizer 104. The lens unit 101 includes the optical imaging lens assembly disclosed in the 1st embodiment, a barrel and a holder member (their reference numerals are omitted) for holding the optical imaging lens assembly. However, the lens unit 101 may alternatively be provided with the optical imaging lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the optical imaging lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

11th Embodiment

FIG. 20 is one perspective view of an electronic device according to the 11th embodiment of the present disclosure. FIG. 21 is another perspective view of the electronic device in FIG. 20.

In this embodiment, an electronic device 200 is a smartphone including the image capturing unit 100 disclosed in the 10th embodiment, an image capturing unit 100a, an image capturing unit 100b, an image capturing unit 100c and a display unit 201. As shown in FIG. 20, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 21, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the optical imaging lens assembly of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an optical imaging lens assembly such as the optical imaging lens assembly of the present disclosure, a barrel and a holder member for holding the optical imaging lens assembly.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 21, the image capturing unit 100c can have a non-circular opening, and the lens barrel or the lens elements in the image capturing unit 100c can have one or more trimmed edges at outer diameter positions thereof for corresponding to the non-circular opening. Therefore, it is favorable for further reducing the length of the image capturing unit 100c along single axis, thereby reducing the overall size of the lens, increasing the area ratio of the display unit 201 with respect to the electronic device 200, reducing the thickness of the electronic device 200, and achieving compactness of the overall module. In this embodiment, the electronic device 200 includes multiple image capturing units 100, 100a, 100b and 100c, but the present disclosure is not limited to the number and arrangement of image capturing units.

12th Embodiment

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 300 is a smartphone including the image capturing unit 100 disclosed in the 10th embodiment, an image capturing unit 100d, an image capturing unit 100e, an image capturing unit 100f, an image capturing unit 100g, a flash module 301, a focus assist module 302, an image signal processor 303, a display module 304 and an image software processor 305. The image capturing unit 100 and the image capturing unit 100d are disposed on the same side of the electronic device 300. The focus assist module 302 can be a laser rangefinder or a ToF (time of flight) module, but the present disclosure is not limited thereto. The image capturing unit 100e, the image capturing unit 100f, the image capturing unit 100g and the display module 304 are disposed on the opposite side of the electronic device 300, and the display module 304 can be a user interface, such that the image capturing units 100e, 100f, 100g can be front-facing cameras of the electronic device 300 for taking selfies, but the present disclosure is not limited thereto. Furthermore, each of the image capturing units 100d, 100e, 100f and 100g can include the optical imaging lens assembly of the present disclosure and can have a configuration similar to that of the image capturing unit 100. In detail, each of the image capturing units 100d, 100e, 100f and 100g can include a lens unit, a driving device, an image sensor and an image stabilizer, and each of the lens unit can include an optical imaging lens assembly such as the optical imaging lens assembly of the present disclosure, a barrel and a holder member for holding the optical imaging lens assembly.

The image capturing unit 100 is a wide-angle image capturing unit, the image capturing unit 100d is an ultra-wide-angle image capturing unit, the image capturing unit 100e is a wide-angle image capturing unit, the image capturing unit 100f is an ultra-wide-angle image capturing unit, and the image capturing unit 100g is a ToF image capturing unit. In this embodiment, the image capturing units 100 and 100d have different fields of view, such that the electronic device 300 can have various magnification ratios so as to meet the requirement of optical zoom functionality. In addition, the image capturing unit 100g can determine depth information of the imaged object. In this embodiment, the electronic device 300 includes multiple image capturing units 100, 100d, 100e, 100f and 100g, but the present disclosure is not limited to the number and arrangement of image capturing units.

When a user captures images of an object 306, the light rays converge in the image capturing unit 100 or the image capturing unit 100d to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100e, 100f or 100g to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

13th Embodiment

FIG. 25 is one perspective view of an electronic device according to the 13th embodiment of the present disclosure.

In this embodiment, an electronic device 400 is a smartphone including the image capturing unit 100 disclosed in the 10th embodiment, an image capturing unit 100*h*, an image capturing unit 100*i*, a flash module 401, a focus assist module, an image signal processor, a display module and an image software processor (not shown). The image capturing unit 100, the image capturing unit 100*h* and the image capturing unit 100*i* are disposed on the same side of the electronic device 400, while the display module is disposed on the opposite side of the electronic device 400. Furthermore, each of the image capturing units 100*h* and 100*i* can include the optical imaging lens assembly of the present disclosure and can have a configuration similar to that of the image capturing unit 100, and the details in this regard will not be provided again.

The image capturing unit 100 is a wide-angle image capturing unit, the image capturing unit 100*h* is a telephoto image capturing unit, and the image capturing unit 100*i* is an ultra-wide-angle image capturing unit. In this embodiment, the image capturing units 100, 100*h* and 100*i* have different fields of view, such that the electronic device 400 can have various magnification ratios so as to meet the requirement of optical zoom functionality. Moreover, the image capturing unit 100*h* can be a telephoto image capturing unit having a light-folding element configuration, such that the total track length of the image capturing unit 100*h* is not limited by the thickness of the electronic device 400. Moreover, the light-folding element configuration of the image capturing unit 100*h* can be similar to, for example, one of the structures shown in FIG. 34 to FIG. 36, which can be referred to foregoing descriptions corresponding to FIG. 34 to FIG. 36, and the details in this regard will not be provided again. In this embodiment, the electronic device 400 includes multiple image capturing units 100, 100*h* and 100*i*, but the present disclosure is not limited to the number and arrangement of image capturing units. When a user captures images of an object, light rays converge in the image capturing unit 100, 100*h* or 100*i* to generate images, and the flash module 401 is activated for light supplement. Further, the subsequent processes are performed in a manner similar to the abovementioned embodiment, so the details in this regard will not be provided again.

14th Embodiment

FIG. 26 is one perspective view of an electronic device according to the 14th embodiment of the present disclosure.

In this embodiment, an electronic device 500 is a smartphone including the image capturing unit 100 disclosed in the 10th embodiment, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, an image capturing unit 100*s*, a flash module 501, a focus assist module, an image signal processor, a display module and an image software processor (not shown). The image capturing units 100, 100*j*, 100*k*, 100*m*, 100*n*, 100*p*, 100*q*, 100*r* and 100*s* are disposed on the same side of the electronic device 500, while the display module is disposed on the opposite side of the electronic device 500. Furthermore, each of the image capturing units 100*j*, 100*k*, 100*m*, 100*n*, 100*p*, 100*q*, 100*r* and 100*s* can include the optical imaging lens assembly of the present disclosure and can have a configuration similar to that of the image capturing unit 100, and the details in this regard will not be provided again.

The image capturing unit 100 is a wide-angle image capturing unit, the image capturing unit 100*j* is a telephoto image capturing unit, the image capturing unit 100*k* is a telephoto image capturing unit, the image capturing unit 100*m* is a wide-angle image capturing unit, the image capturing unit 100*n* is an ultra-wide-angle image capturing unit, the image capturing unit 100*p* is an ultra-wide-angle image capturing unit, the image capturing unit 100*q* is a telephoto image capturing unit, the image capturing unit 100*r* is a telephoto image capturing unit, and the image capturing unit 100*s* is a ToF image capturing unit. In this embodiment, the image capturing units 100, 100*j*, 100*k*, 100*m*, 100*n*, 100*p*, 100*q* and 100*r* have different fields of view, such that the electronic device 500 can have various magnification ratios so as to meet the requirement of optical zoom functionality. Moreover, each of the image capturing units 100*j* and 100*k* can be a telephoto image capturing unit having a light-folding element configuration. Moreover, the light-folding element configuration of each of the image capturing unit 100*j* and 100*k* can be similar to, for example, one of the structures shown in FIG. 34 to FIG. 36, which can be referred to foregoing descriptions corresponding to FIG. 34 to FIG. 36, and the details in this regard will not be provided again. In addition, the image capturing unit 100*s* can determine depth information of the imaged object. In this embodiment, the electronic device 500 includes multiple image capturing units 100, 100*j*, 100*k*, 100*m*, 100*n*, 100*p*, 100*q*, 100*r* and 100*s*, but the present disclosure is not limited to the number and arrangement of image capturing units. When a user captures images of an object, the light rays converge in the image capturing unit 100, 100*j*, 100*k*, 100*m*, 100*n*, 100*p*, 100*q*, 100*r* or 100*s* to generate images, and the flash module 501 is activated for light supplement. Further, the subsequent processes are performed in a manner similar to the abovementioned embodiments, and the details in this regard will not be provided again.

15th Embodiment

FIG. 27 is a schematic view of an electronic device according to the 15th embodiment of the present disclosure.

In this embodiment, an electronic device 600 may be a small-size camera, such as an action camera. The electronic device 600 includes a display unit 601 and an image capturing unit 602. The image capturing unit 602 is electrically connected to the display unit 601. The image capturing unit 602 includes the optical imaging lens assembly disclosed in the 1st embodiment. The image capturing unit 602 can be a wide-angle image capturing unit. The image capturing unit 602, which is similar to the image capturing unit 100, can further include a barrel, a holder member or a combination thereof. The electronic device 600 captures an image by the image capturing unit 602. Preferably, the electronic device may further include a control unit, a display unit, a storage unit, a random access memory unit (RAM) or a combination thereof.

16th Embodiment

FIG. 28 is a perspective view of an electronic device according to the 16th embodiment of the present disclosure.

FIG. 29 is a side view of the electronic device in FIG. 28. FIG. 30 is a top view of the electronic device in FIG. 28.

In this embodiment, an electronic device 700 is a mobile vehicle, such as a car. The electronic device 700 includes a plurality of image capturing units 701, and each of the image capturing units 701 includes, for example, the optical imaging lens assembly of the present disclosure. The image capturing units 701 can be served as, for example, panoramic view car cameras, dashboard cameras and vehicle backup cameras. The image capturing units 701 can be wide-angle image capturing units.

As shown in FIG. 28 to FIG. 30, the image capturing units 701 are, for example, disposed at the front side, the rear side, the lateral sides, inner side or on the backmirror of the car to capture peripheral images of the car, which is favorable for obtaining external traffic information so as to achieve an advanced driver-assistance function. In addition, the image software processor may stitch the peripheral images into one panoramic view image for the driver's checking every corner surrounding the car, thereby assisting in parking and driving.

As shown in FIG. 29, the image capturing units 701 are, for example, disposed on the lower portion of the side mirrors for capturing image information of the left and right lanes. As shown in FIG. 30, the image capturing units 701 can also be, for example, disposed on the lower portion of the side mirrors and inside the front and rear windshields for providing external information to the driver, and also providing more viewing angles so as to reduce blind spots, thereby improving driving safety. Please be noted the arrangement of the image capturing units 701 in the drawings is only exemplary, and the number, the positions and the image capturing directions of the image capturing units 701 can be adjusted according to actual requirements.

17th Embodiment

FIG. 31 is a schematic view of an electronic device according to the 17th embodiment of the present disclosure.

In this embodiment, an electronic device 800 may be a lightweight unmanned aerial vehicle, such as a drone camera. The electronic device 800 includes an image capturing unit 801. The image capturing unit 801 includes the optical imaging lens assembly disclosed in the 1st embodiment. The image capturing unit 801 can be a wide-angle image capturing unit. The image capturing unit 801, which is similar to the image capturing unit 100, can further include a barrel, a holder member or a combination thereof. The electronic device 800 captures an image by the image capturing unit 801. Preferably, the electronic device may further include a control unit, a display unit, a storage unit, a random access memory unit (RAM) or a combination thereof.

The smartphone, the camera, the mobile vehicle and the unmanned aerial vehicle in several embodiments are only exemplary for showing the image capturing unit of the present disclosure installed in an electronic device, and the present disclosure is not limited thereto. The image capturing unit can be optionally applied to optical systems with a movable focus. Furthermore, the optical imaging lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-9C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, a total number of lens elements of the optical imaging lens assembly is seven, and each of the seven lens elements having an object-side surface facing toward the object side and an image-side surface facing toward the image side;

wherein the second lens element has negative refractive power, the object-side surface of the third lens element is concave in a paraxial region thereof, the fourth lens element has positive refractive power, the image-side surface of the fifth lens element is concave in a paraxial region thereof, the sixth lens element has positive refractive power, and the image-side surface of the sixth lens element is convex in a paraxial region thereof;

wherein an axial distance between the third lens element and the fourth lens element is T34, an axial distance between the fourth lens element and the fifth lens element is T45, a curvature radius of the object-side surface of the first lens element is R1, a curvature radius of the object-side surface of the third lens element is R5, an Abbe number of the seventh lens element is V7, half of a maximum field of view of the optical imaging lens assembly is HFOV, and the following conditions are satisfied:

$$0<T34/T45<0.50;$$

$$0<(R1+R5)/(R1-R5)<10.00;$$

$$5.0<V7<50.0; \text{ and}$$

$$0<1/|\tan(HFOV)|<0.500.$$

2. The optical imaging lens assembly of claim 1, wherein the axial distance between the third lens element and the fourth lens element is T34, the axial distance between the fourth lens element and the fifth lens element is T45, an f-number of the optical imaging lens assembly is Fno, and the following conditions are satisfied:

$$0<T34/T45<0.30; \text{ and}$$

$$1.00<Fno<2.15.$$

3. The optical imaging lens assembly of claim 1, wherein the seventh lens element has negative refractive power, the image-side surface of the seventh lens element is concave in a paraxial region thereof, and at least one of the object-side surface and the image-side surface of the seventh lens element has at least one inflection point.

4. The optical imaging lens assembly of claim 1, wherein a central thickness of the third lens element is CT3, a central thickness of the fourth lens element is CT4, and the following condition is satisfied:

$$0<CT3/CT4<1.00.$$

5. The optical imaging lens assembly of claim 1, wherein a sum of central thicknesses of all lens elements of the optical imaging lens assembly is $\Sigma$CT, a sum of axial distances between each of all adjacent lens elements of the optical imaging lens assembly is $\Sigma$AT, and the following condition is satisfied:

$$0.10<\Sigma CT/\Sigma AT<1.60.$$

6. The optical imaging lens assembly of claim 1, wherein an axial distance between the second lens element and the third lens element is T23, an axial distance between the image-side surface of the seventh lens element and an image surface is BL, and the following condition is satisfied:

$$0.60<T23/BL<2.50.$$

7. The optical imaging lens assembly of claim 1, wherein an axial distance between the object-side surface of the first lens element and the image-side surface of the fourth lens element is Dr1r8, an axial distance between the object-side surface of the fifth lens element and the image-side surface of the seventh lens element is Dr9r14, and the following condition is satisfied:

$$2.60<Dr1r8/Dr9r14<6.20.$$

8. The optical imaging lens assembly of claim 1, wherein a focal length of the fourth lens element is f4, a focal length of the fifth lens element is f5, a focal length of the sixth lens element is f6, a focal length of the seventh lens element is f7, and the following conditions are satisfied:

$$0.30<f5/f7<5.00; \text{ and}$$

$$1.20<f4/f6<5.00.$$

9. The optical imaging lens assembly of claim 1, wherein the curvature radius of the object-side surface of the third lens element is R5, a curvature radius of the image-side surface of the seventh lens element is R14, and the following condition is satisfied:

$$-1.20<(R5+R14)/(R5-R14)<0.$$

10. The optical imaging lens assembly of claim 1, wherein a displacement in parallel with an optical axis from an axial vertex on the object-side surface of the seventh lens element to a maximum effective radius position on the object-side surface of the seventh lens element is Sag7R1, a central thickness of the sixth lens element is CT6, and the following condition is satisfied:

$$-0.50<Sag7R1/CT6<0.$$

11. The optical imaging lens assembly of claim 1, wherein a displacement in parallel with an optical axis from an axial vertex on the object-side surface of the third lens element to a maximum effective radius position on the object-side surface of the third lens element is Sag3R1, a central thickness of the third lens element is CT3, and the following condition is satisfied:

$$-2.50<Sag3R1/CT3<-0.80.$$

12. The optical imaging lens assembly of claim 1, wherein a maximum image height of the optical imaging lens assembly is ImgH, a maximum effective radius of the image-side surface of the seventh lens element is Y7R2, and the following condition is satisfied:

$$1.20<ImgH/Y7R2<2.50.$$

13. An image capturing unit, comprising:
the optical imaging lens assembly of claim 1; and
an image sensor disposed on an image surface of the optical imaging lens assembly.

14. An electronic device, comprising:
the image capturing unit of claim 13.

15. An optical imaging lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, a total number of lens elements of the optical imaging lens assembly is seven, and each of the seven lens elements having an object-side surface facing toward the object side and an image-side surface facing toward the image side;

wherein the first lens element has negative refractive power, the second lens element has negative refractive power, the object-side surface of the third lens element is concave in a paraxial region thereof, the fourth lens element has positive refractive power, the image-side surface of the fifth lens element is concave in a paraxial region thereof, and the sixth lens element has positive refractive power;

wherein an axial distance between the third lens element and the fourth lens element is T34, an axial distance between the fourth lens element and the fifth lens element is T45, a focal length of the fifth lens element is f5, a focal length of the sixth lens element is f6, a central thickness of the first lens element is CT1, a central thickness of the seventh lens element is CT7, a curvature radius of the object-side surface of the fourth lens element is R7, a curvature radius of the object-side surface of the seventh lens element is R13, an Abbe number of the seventh lens element is V7, and the following conditions are satisfied:

$$0<T34/T45<0.50;$$

$$0.08<|f6/f5|<0.90;$$

$$1.50<CT1/CT7<10.00;$$

$$-5.00<(R7+R13)/(R7-R13)<0.80; \text{ and}$$

$$5.0<V7<50.0.$$

16. The optical imaging lens assembly of claim 15, wherein the fifth lens element has negative refractive power, a focal length of the fourth lens element is f4, the focal length of the fifth lens element is f5, and the following condition is satisfied:

$$-1.80<f4/f5<-0.20.$$

17. The optical imaging lens assembly of claim 15, wherein a focal length of the second lens element is f2, a focal length of the fourth lens element is f4, and the following condition is satisfied:

$$-1.00<f4/f2<-0.10.$$

18. The optical imaging lens assembly of claim 15, wherein a central thickness of the third lens element is CT3, the axial distance between the fourth lens element and the fifth lens element is T45, and the following condition is satisfied:

$$0.05 < CT3/T45 < 1.50.$$

19. The optical imaging lens assembly of claim 15, wherein the fifth lens element is cemented to the sixth lens element, the image-side surface of the fifth lens element is aspheric, the object-side surface of the sixth lens element is aspheric, the seventh lens element has negative refractive power, the curvature radius of the object-side surface of the fourth lens element is R7, a curvature radius of the object-side surface of the sixth lens element is R11, and the following condition is satisfied:

$$0 < R11/R7 < 1.30.$$

20. The optical imaging lens assembly of claim 15, further comprising an aperture stop, wherein an axial distance between the object-side surface of the first lens element and an image surface is TL, an axial distance between the aperture stop and the image surface is SL, and the following condition is satisfied:

$$2.50 < TL/SL < 5.00.$$

21. The optical imaging lens assembly of claim 15, wherein an Abbe number of the third lens element is V3, an Abbe number of the fifth lens element is V5, and the following condition is satisfied:

$$2.0 < V3/V5 < 4.0.$$

22. An optical imaging lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, a total number of lens elements of the optical imaging lens assembly is seven, and each of the seven lens elements having an object-side surface facing toward the object side and an image-side surface facing toward the image side;

wherein the first lens element has negative refractive power, the second lens element has negative refractive power, the object-side surface of the third lens element is concave in a paraxial region thereof, the sixth lens element has positive refractive power, the image-side surface of the sixth lens element is convex in a paraxial region thereof, and at least one of the object-side surface and the image-side surface of the seventh lens element has at least one inflection point;

wherein an axial distance between the second lens element and the third lens element is T23, an axial distance between the third lens element and the fourth lens element is T34, an axial distance between the fourth lens element and the fifth lens element is T45, a central thickness of the third lens element is CT3, an Abbe number of the seventh lens element is V7, a curvature radius of the object-side surface of the third lens element is R5, a curvature radius of the image-side surface of the fifth lens element is R10, and the following conditions are satisfied:

$$0 < T34/T45 < 0.50;$$

$$0 < CT3/T23 < 1.00;$$

$$5.0 < V7 < 50.0; \text{ and}$$

$$0.10 < |R5/R10| < 5.00.$$

23. The optical imaging lens assembly of claim 22, wherein at least one of the object-side surface and the image-side surface of the third lens element has at least one inflection point, the Abbe number of the seventh lens element is V7, and the following condition is satisfied:

$$10.0 < V7 < 40.0.$$

24. The optical imaging lens assembly of claim 22, wherein a focal length of the optical imaging lens assembly is f, a focal length of the second lens element is f2, a focal length of the fifth lens element is f5, a focal length of the seventh lens element is f7, and the following condition is satisfied:

$$1.00 < (|f/f2| + |f/f5|)/|f/f7| < 3.60.$$

25. The optical imaging lens assembly of claim 22, wherein an axial distance between the object-side surface of the fifth lens element and the image-side surface of the seventh lens element is Dr9r14, the axial distance between the second lens element and the third lens element is T23, and the following condition is satisfied:

$$0.10 < Dr9r14/T23 < 1.65.$$

26. The optical imaging lens assembly of claim 22, wherein the image-side surface of the seventh lens element has at least one inflection point, an axial distance between the fifth lens element and the sixth lens element is T56, the curvature radius of the image-side surface of the fifth lens element is R10, a curvature radius of the object-side surface of the sixth lens element is R11, a focal length of the optical imaging lens assembly is f, and the following conditions are satisfied:

$$0.010 \text{ mm} < T56 < 0.050 \text{ mm}; \text{ and}$$

$$0.04 < |R10 - R11| \times 10/f < 8.00.$$

27. The optical imaging lens assembly of claim 22, wherein a focal length of the optical imaging lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, and the following condition is satisfied:

$$1.00 < \Sigma|f/fi| < 3.00, \text{ wherein } i = 1, 2, 3, 4, 5, 6 \text{ and } 7.$$

28. The optical imaging lens assembly of claim 22, wherein a central thickness of the first lens element is CT1, a central thickness of the fifth lens element is CT5, and the following condition is satisfied:

$$0.05 < CT5/CT1 < 1.10.$$

29. The optical imaging lens assembly of claim 22, wherein the axial distance between the second lens element and the third lens element is T23, the axial distance between the third lens element and the fourth lens element is T34, the axial distance between the fourth lens element and the fifth lens element is T45, a curvature radius of the object-side surface of the first lens element is R1, the curvature radius of the object-side surface of the third lens element is R5, a curvature radius of the object-side surface of the fourth lens element is R7, the curvature radius of the image-side surface of the fifth lens element is R10, a curvature radius of the object-side surface of the seventh lens element is R13, the Abbe number of the seventh lens element is V7, half of a maximum field of view of the optical imaging lens assembly is HFOV, a focal length of the fifth lens element is f5, a focal length of the sixth lens element is f6, a central thickness of the first lens element is CT1, the central thickness of the third lens element is CT3, a central thickness of the seventh lens element is CT7, and the following conditions are satisfied:

$$0.02 \leq T34/T45 \leq 0.20;$$

$$0.58 \leq (R1+R5)/(R1-R5) \leq 1.05;$$

$$19.5 \leq V7 \leq 28.3;$$

$$0.002 \leq 1/|\tan(HFOV)| \leq 0.220;$$

$$0.27 \leq |f6/f5| \leq 0.53;$$

$$1.81 \leq CT1/CT7 \leq 6.58;$$

$$-3.02 \leq (R7+R13)/(R7-R13) \leq 0.19;$$

$$0.13 \leq CT3/T23 \leq 0.28; \text{ and}$$

$$0.67 \leq |R5/R10| \leq 2.86.$$

* * * * *